United States Patent [19]
Ueda et al.

[11] Patent Number: 5,857,130
[45] Date of Patent: Jan. 5, 1999

[54] IMAGE FORMING APPARATUS

[75] Inventors: Kazuhiro Ueda, Toyokawa; Munehiro Nakatani, Toyohashi; Nobuhiro Mishima, Toyokawa; Eiji Hanada, Aichi-Ken, all of Japan

[73] Assignee: Minolta Co., LTD., Osaka, Japan

[21] Appl. No.: 6,934

[22] Filed: Jan. 14, 1998

Related U.S. Application Data

[63] Continuation of Ser. No. 744,254, Nov. 5, 1996, Pat. No. 5,715,497.

[30] Foreign Application Priority Data

Nov. 6, 1995 [JP] Japan .................................. 7-309719

[51] Int. Cl.⁶ .......................... G03G 15/04; G03G 15/22
[52] U.S. Cl. .............................. 399/17; 271/227; 399/51; 399/367
[58] Field of Search .................................. 399/16, 17, 45, 399/51, 177, 365, 367, 370, 371, 374, 376, 395; 271/226, 227, 233, 234, 248

[56] References Cited

U.S. PATENT DOCUMENTS

| | | | |
|---|---|---|---|
| 4,511,242 | 4/1985 | Ashbee et al. ........................ | 399/395 |
| 4,621,801 | 11/1986 | Sanchez ............................... | 271/248 X |
| 4,971,304 | 11/1990 | Lofthus ................................ | 271/227 |
| 5,169,140 | 12/1992 | Wenthe, Jr. ......................... | 271/227 X |
| 5,401,012 | 3/1995 | Taruki ................................. | 271/233 X |
| 5,533,721 | 7/1996 | Takashimizu ....................... | 271/227 X |
| 5,568,281 | 10/1996 | Kochis et al. ....................... | 399/16 X |

*Primary Examiner*—Sandra Brase
*Attorney, Agent, or Firm*—McDermott, Will & Emery

[57] ABSTRACT

An image forming apparatus records an image on a recording medium after correcting a slant of the image according to a type of document sheet or an operating history of the image forming apparatus. Normally, a slant of the document sheet is corrected by bringing one edge of the sheet in contact with a document scale provided on a document platform. When the sheet is of thin paper or sheets of different sizes are mixed, an image signal obtained by scanning a document image is electrically processed so as to correct a slant of an image to be recorded. When the image signal is electrically processed so as to correct the slant of the image to be recorded, the correction of image slant may be based also on the operating history of the image forming apparatus, for example, the total number of sheets transported, the number of times a paper jam has occurred or the cumulative value of the slant angle of the image.

65 Claims, 49 Drawing Sheets

| WIDTH SIZE SENSOR SE53 | SHEET LENGTH OF DOCUMENT (mm) | DOCUMENT SIZE |
|---|---|---|
| OFF | ~165 | A5Y |
|  | 165~196 | B5Y |
|  | 196~236 | A5T |
|  | 236~277 | B5T |
|  | 277~330 | A4T |
|  | 330~ | B4T |
| ON | ~315 | A4Y |
|  | 315~ | A3T |

IMAGE FORMING APPARATUS

This is a continuation of application Ser. No. 08/744,254, filed Nov. 5, 1996, now U.S. Pat. No. 5,715,497.

BACKGROUND OF THE INVENTION

1. Field of the Invention

This invention relates to an image forming apparatus, and more specifically, to an image forming apparatus which corrects the slant of a document image.

2. Description of the Prior Art

Image forming apparatuses which are based on the principle of electronic photography are required to efficiently process a large number of documents. They therefore comprise an automatic document feeder installed on a document platform which feeds documents automatically onto the platform, and recovers document sheets which have been read. However if these sheets are not straight when they are transported onto the platform, the image formed on a recording medium will also be skewed and uncomfortable to view, hence some means was provided to correct the slant of the original document.

In conventional image forming apparatuses, any slant of a document sheet supplied by the automatic document feeder was first corrected by a width regulating plate of the document tray of the document feeder, and any slant of the document arising during transport onto the document platform was corrected by bringing the front edge of the sheet into contact with a document scale (specification plate) installed on the platform.

However, as the width regulating plate of the document tray of the automatic document feeder extends only up to the vicinity of a feed roller, a sheet which has a short length in contact with the width regulating plate, i.e. a sheet which has a short length in the transport direction relative to the width regulating plate, separates from the plate as soon as it is fed by the roller. Due to slight unevenness (non-uniformity) of the roller diameter, the sheet may therefore be transported on a slant (skew) relative to the transport direction.

When the transport method is such that the sheet transported onto the document platform temporarily stops in front of the correct reading position, and the front edge (or rear edge) is brought in contact with the document scale when the transport belt is restarted, the sheet may for example slip due to restarting of the belt so that it becomes slanted relative to the transport direction.

When positioning is performed by bringing the front edge of the sheet in contact with the document scale and the sheet is slanting relative to the transport direction when it comes in contact with the scale, it may shift to the left or right even if the slant is corrected. In the case of a thin paper document, the front edge of the paper may crumple or bend so that it is not correctly positioned.

Therefore when sheets of ordinary thickness are mixed with thin sheets, it may occur that the sheets of ordinary thickness are correctly positioned, whereas the thin sheets are not.

In the case of a double-sided document, after image processing of the first side is complete, the document is turned over by an inverting mechanism of the automatic document feeder, and is then transported again onto the platform to process the image on the second side. However if an inverting roller of the automatic document feeder inverting mechanism and the document platform are not parallel, the sheet will acquire a slant relative to the transport direction, and when its front edge comes in contact with the document scale, it will slip in an opposite sense to that in which it slipped when image processing of the first side was performed. This makes it difficult to adjust the transport mechanism and inversion mechanism of the automatic document feeder.

Moreover in the case of step feed in which a plurality of (e.g. 2) document sheets are continuously fed onto the document platform, document feed is temporarily stopped on the platform before the front edge of the (leading) sheet comes in contact with the scale, then after feed of the next sheet is complete, transport recommences so that the front edge of the leading sheet comes in contact with the scale. Hence in this case also, the sheet may become skewed relative to the transport direction due for example to slip when the transport belt starts again.

A method has been proposed in which positioning does not depend on a width regulating plate or document scale, the slant of the image being determined and thus corrected by electrical processing of a read image signal. However as electrical processing of the signal was complex and required a considerable time, it was inefficient for copying a plurality of sheets.

Further when a plurality of sheets is fed by an automatic document feeder, the adjustment of mechanical parts may change with time. This gradually leads to sheets becoming skewed relative to the transport direction and more paper jams during transport, which decreased the reliability of a sheet setting in a predetermined position.

SUMMARY OF THE INVENTION

The main object of this invention is therefore to provide an image forming apparatus which records on a recording medium such that any slant of an image is rapidly corrected without fail according to the type of a document sheet or the state of the image forming apparatus.

It is a further object of this invention to provide an image forming apparatus which records on a recording medium such that the position and slant of the image are corrected using an optimum transport method and image slant correction method based on the type of document sheet transported onto a document platform.

It is yet a further object of this invention to provide an image forming apparatus which records on a recording medium such that the position and slant of the image are corrected based on the operating history of the device.

Other objects of this invention will become apparent from the following detailed description with reference to the appended drawings.

BRIEF DESCRIPTION OF THE DRAWINGS

FIG. 50(a), FIG. 51(b), and FIG. 50(c) are flowcharts showing details of a document ejection process.

DETAILED DESCRIPTION OF THE PREFERRED EMBODIMENTS

One embodiment of this invention will now be described with reference to the drawings. In the following description, a copier, automatic document feeder, operating panel and control system are common to the first, second and third embodiments, parts which differ among the various embodiments being described with reference to the embodiments in which they occur.

(Outline of Construction of Copier)

Figure 1:
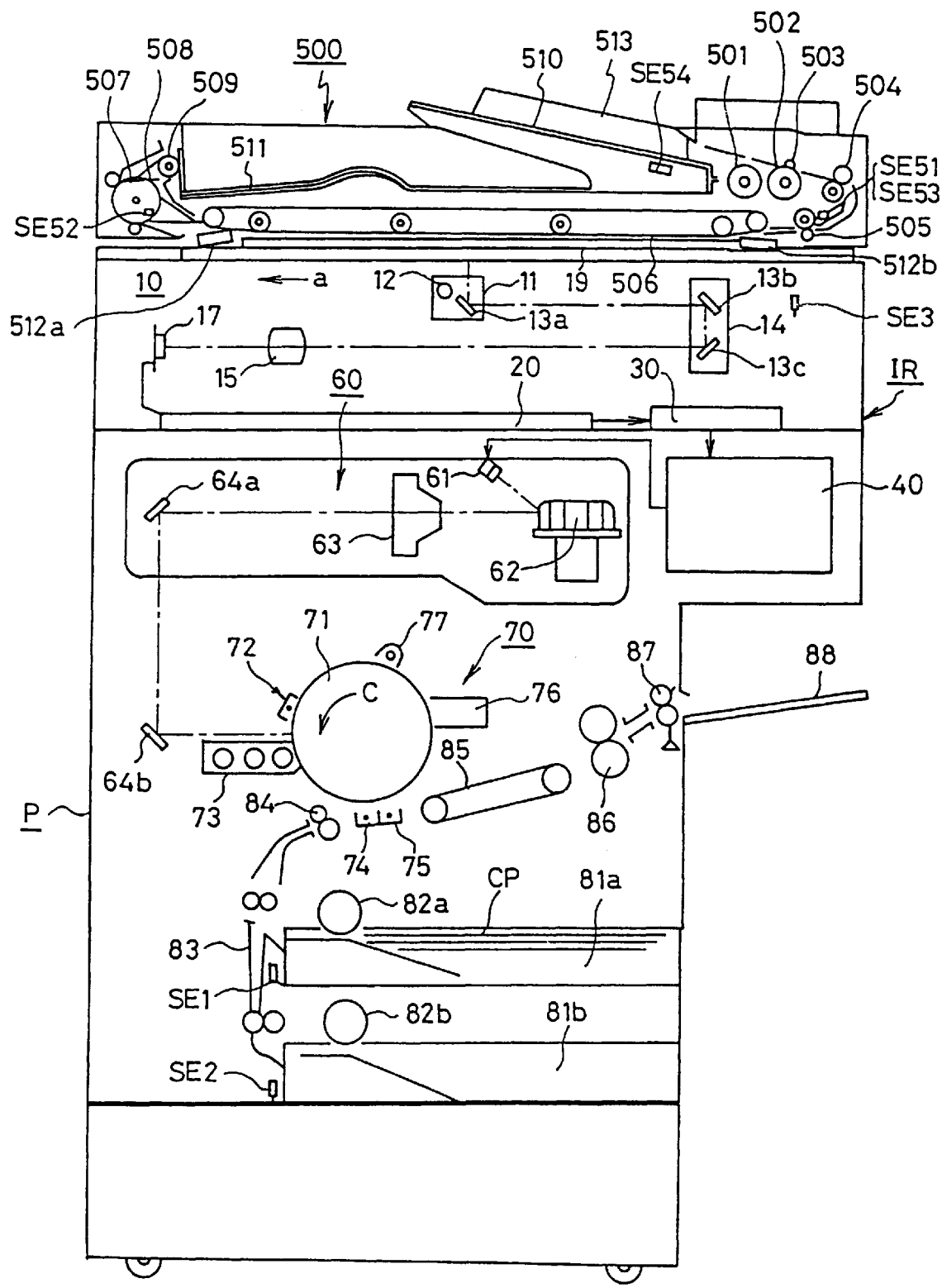
FIG. 1 is a sectional view schematically showing the construction of a digital photocopier to which this invention is applied.

FIG. 1 is a sectional view schematically showing the construction of a digital photocopier to which this invention is applied. The copier 1 broadly comprises an image reader IR and printer P, operating panel OP installed on the body of the copier, and automatic document feeder 500.

The image reader IR reads an image of a document placed on a document platform, and generates image data corresponding to each picture element of the document. The image reader IR comprises a scanner system 10 which converts the image of the document to a read image signal, an image processing unit 20 which processes the image signal output by the scanner system 10, and a rotation control unit 30 which rotates the image data output by the image processing unit 20 and outputs it to the printer.

The printer P forms an image on a recording paper based on the image data, and comprises a print processing unit 40 which drives a laser oscillator 61 based on image data output by the rotation control unit 30 of the image reader IR, a laser optical system 60 which forms an image of a laser beam emitted by the laser oscillator 61 on a photosensitive drum 71, and an imaging system 70 which develops the latent image formed on the photosensitive drum 71, transfers it to recording paper, and fixes it.

The automatic document feeder 500 is installed on the document platform 19 of the copier 1. It feeds a document sheet onto from the document platform, recovers it, and if necessary reverses the front and back sides of the sheet.

The construction and operation of the image reader IR will now be described in outline. The scanner system 10 comprises a first scanner 11 comprising an exposure lamp 12 and first mirror 13a, and second scanner 14 comprising a second mirror 13b and third mirror 13c, the scanner system being displaced by a motor, not shown, in the direction of the arrow a (auxiliary scanning direction) so as to perform auxiliary scanning of the document. 17 is a line sensor comprising a plurality of CCD disposed in the principal scanning direction (direction perpendicular to the paper feeding direction), and reads the image in the principal scanning direction. A document image photographed via the first and second scanners 11, 14 and photographic lens 15, is thereby formed on the line sensor 17, and an image signal corresponding to each picture element of the document image is output by the line sensor 17. A sensor SE3 detects that the first scanner 11 is in a home position.

After image density adjustments and any other required corrections have been performed on the image signal output by the line sensor 17 in the image processing unit 20, it is temporarily stored in a memory in the rotation control unit 30, and after rotation processing it is output to the printer P. When rotation processing is not required, it is output to the printer P without modification.

The construction and operation of the printer P will now be described in outline. The print processing unit 40 modulates the laser beam emitted by the laser oscillator 61 based on the image data output by the rotation control unit 30. The laser beam modulated according to the image data is cast onto the photosensitive drum 71 via a polygon mirror 62, f/θ lens 63, and mirrors 64a, 64b.

A main charger 72, developer 73, transfer charger 74, separating charger 75, cleaner 76 and eraser lamp 77 are disposed around the photosensitive drum 71. The latent image on the drum 71 is developed by a toner according to the usual electronic photography techniques.

A recording paper CP housed in paper feed cassettes 81a, 81b is supplied by paper feed rollers which are rotated, transported by a transport roller, not shown, and temporarily comes to rest at a standby position in which its front edge is in contact with a nip part of a timing roller 84. SE1, SE2 are sensors which detect the size of the recording paper CP stored in the paper feed cassettes 81a, 81b.

The toner image formed on the photosensitive drum 71 moves to a transfer position, the timing roller 84 begins to rotate, and the recording paper CP which has been waiting in the standby position is transported to a transfer position of the transfer charger 74. At the transfer position, the toner image formed on the drum 71 is transferred to the recording paper CP by the action of the transfer charger 74. The recording paper CP separates from the drum 71 due to the action of the separating charger 75, and is transported by the transport belt 85. The toner image on the paper is then heated and pressed by the fixing roller 86, and thereby fixed on the recording paper CP. The photosensitive drum, paper feed roller, transport belt and fixing roller are driven by motors, not shown.

(Construction of Automatic Document Feeder)

The construction and action of the automatic document feeder 500 will now be described in outline. The automatic document feeder 500 comprises a document feed tray 510, document transport belt 506, reversing roller 507, document ejection unit 511, document scale 512a disposed at the front edge of the document platform 19 in the document transport direction (on the left-hand side in FIG. 1), and a document scale 512b disposed at the rear edge of the document platform 19 in the document transport direction (on the right-hand side in FIG. 1). The document scales 512a, 512b straighten document sheets which come into contact with them, either the scale 512a or the scale 512b being used for this purpose.

The way in which document sheets are transported differs according to a document mode and a document sheet mode. The document mode (also including a step mode in the second embodiment) specifies whether a sheet is single-sided or double-sided, this information being input from the operating panel OP described hereinafter. The document sheet mode specifies whether sheets thinner than a standard thickness or of different sizes (including thin paper) are mixed together in the paper supply. When the thin paper mode or mixed paper mode are not selected, the normal mode is set.

This transport will now be described. Whichever document mode or document sheet mode has been selected, one or a plurality of document sheets are placed on the document feed tray 510 with their image surfaces facing upwards so that they can be read, and a width regulating plate 513 of the tray 510 is adjusted to the width of the sheet(s). The sensor SE54 detects whether there are any sheets on the tray. When paper feed begins, the paper feed roller 501 starts feeding from the lowermost sheet. The sheets are separated by a separating roller 502 and separating pad 503, and fed one at a time. After passing over an intermediate roller 504, and their size has been detected by a registration sensor SE51 and width size sensor SE53, any skew of the paper is corrected by a registration roller 505.

In the normal mode, the sheets are transported onto the platform 19 by the registration roller 505 and document transport belt 506. Immediately after the rear end of a sheet has passed the document scale 512b disposed on the rear edge side of the sheet in the sheet transport direction, the belt 506 slightly rotates in the reverse direction, and the roller 505 and belt 506 stop.

This brings the rear edge of the sheet (right edge in FIG. 1) in contact with the document scale 512b (referred to hereinafter as contact processing), and the sheet is thereby set in the precise reading position on the platform 19. At this time, the front edge of the next sheet reaches the roller 505 so that transport time is reduced.

In case of the front edge of the sheet being brought in contact with the document scale 512a disposed on the front side in the sheet transport direction (contact processing), the roller 505 and belt 506 stop when the front edge reaches the scale 512a, and the sheet is set in the precise reading position on the platform 19.

When the sheet is set in the reading position on the platform 19, the scanner system 10 starts scanning of the document. After reading is complete, the sheet is transported to the left of FIG. 1 by the belt 506. When single-sided documents are selected as the document mode, a change-over claw 508 is changed over to a paper ejection side, then the sheet passes over the reversing roller 507 and is ejected by the document ejection unit 511.

When double-sided documents are selected as the document mode and reading of the first side of the sheet is complete, the sheet is transported to the left of FIG. 1 by the belt 506. In this case, the claw 508 is changed over to the reversing side, the sheet is turned over by the reversing roller 507, transported to the platform 19, and set in the reading position in the same way as before. When reading of the second side of the sheet is complete, the claw 508 is changed over to the paper ejection side, then the sheet passes over the reversing roller 507 and is ejected by the document ejection unit 511.

When the thin paper mode or mixed paper mode are selected as the document sheet mode, unlike the normal mode, the belt 506 does not reverse immediately after the rear edge of the sheet has passed the document scale 512b, and the sheet is set at a slight distance away from the document scale 512b.

This is because if the sheet is thin, if it were brought in contact with the document scale 512a (or 512b), the part in contact would crumple or bend so that it could not be set in the precise position. Further if some thin sheets are mixed with the document sheets, the sheets cannot be set in the precise position by bringing them in contact with the document scale 512a (or 512b) as in the case of the thin paper mode.

In the thin paper mode or mixed paper mode, the read image signal is electrically processed so that the image is recorded at a predetermined position on the recording paper. Consequently it does not matter if the position of the sheet on the platform 19 is not precise. This will be described in detail hereinafter.

The surface of the belt 506 on the side of the platform 19 is colored orange (brown), a color to which the line sensor has a low spectral sensitivity. Hence, even when light from the exposure lamp is reflected by the belt 506 so that it impinges on the line sensor, there is no effect on the read document image.

(Layout of Operating Panel)

Figure 2:
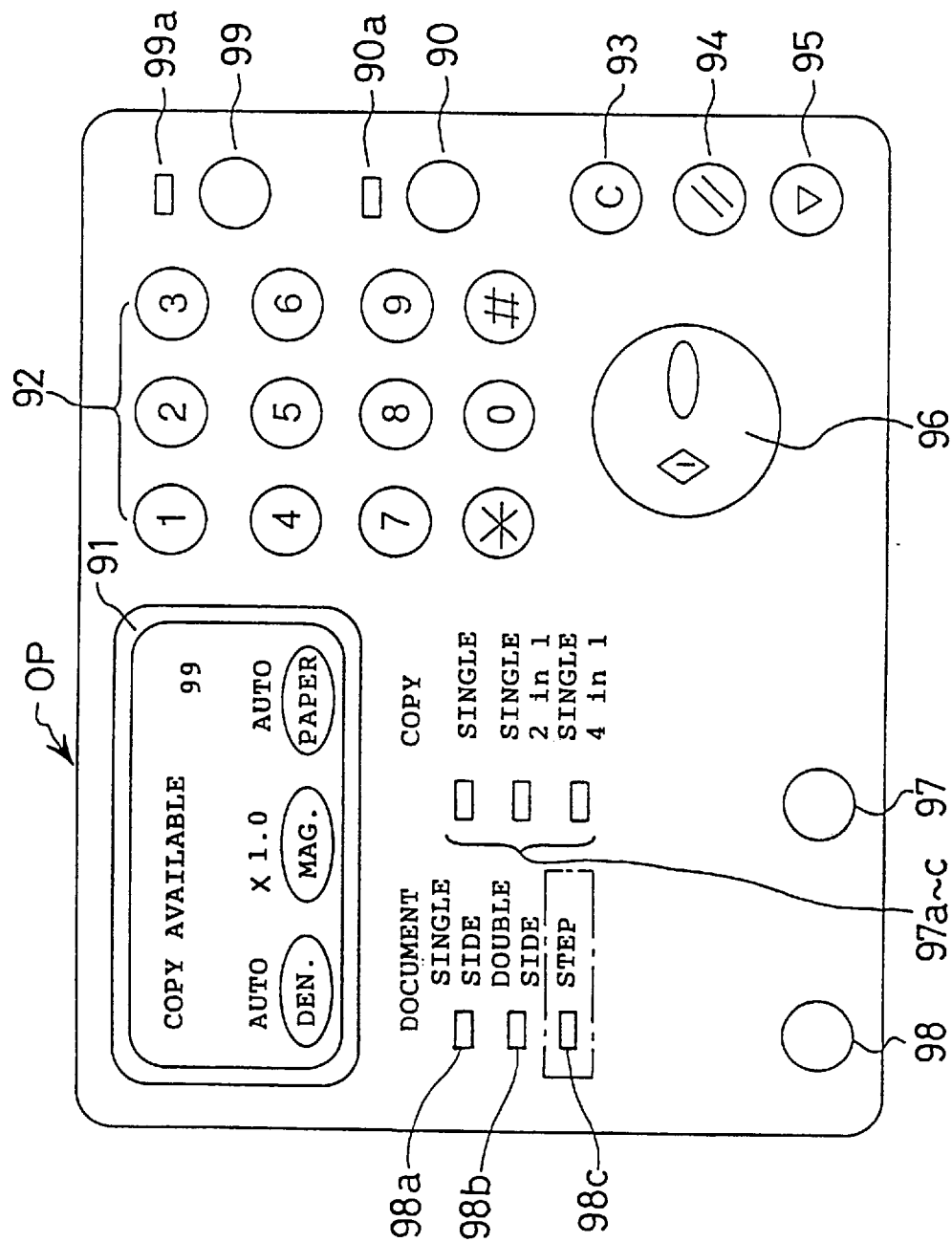
FIG. 2 is a front view of an operating panel.

FIG. 2 is a front view of the operating panel OP. The operating panel OP comprises a liquid crystal touch panel 91, ten-key pad 92 for inputting numbers such as document page number sequences, numbers of copies or magnifications of copies, clear key 93 which returns these numbers to a default value, panel reset key 94, stop key 95, start key 96, thin paper mode key 90 which is selected in the case of thin paper, thin paper mode display 90a which shows that the thin paper mode is selected, mixed paper mode key 99 which is selected when sheets of different size are to be supplied or when thin sheets are mixed with the documents, and mixed paper mode display 99a which shows that the mixed paper mode has been selected.

The operating panel OP further comprises a copy mode set key 97 which selects a single-sided copy mode, a single-sided 2 in 1 mode (a copy mode of recording two document images on one recording paper) or a single-sided 4 in 1 mode (a copy mode of recording four document images on one recording paper), copy mode displays 97a, 97b, 97c which display the selected copy mode, a document mode set key 98 which selects a single-sided document mode, double-sided document mode or a step mode, and document mode displays 98a, 98b, 98c which display the selected document mode. The step mode will be described in the second embodiment and is not a feature of the first embodiment.

The liquid crystal touch panel 91 displays the operating state of the copier such as exposure level, copy magnification and recording paper size, events such as paper jams, maintenance calls, recording paper shortage (empty) and other information. It also allows input of recording density and copy magnification, and specification of an automatic recording paper selection mode.

The liquid crystal touch panel 91 further has a function for alerting the user when the document feeder stops because a document is inclined at or greater than a certain angle, and informing the user of the state of the copier.

(Construction of Control System)

Figure 3:
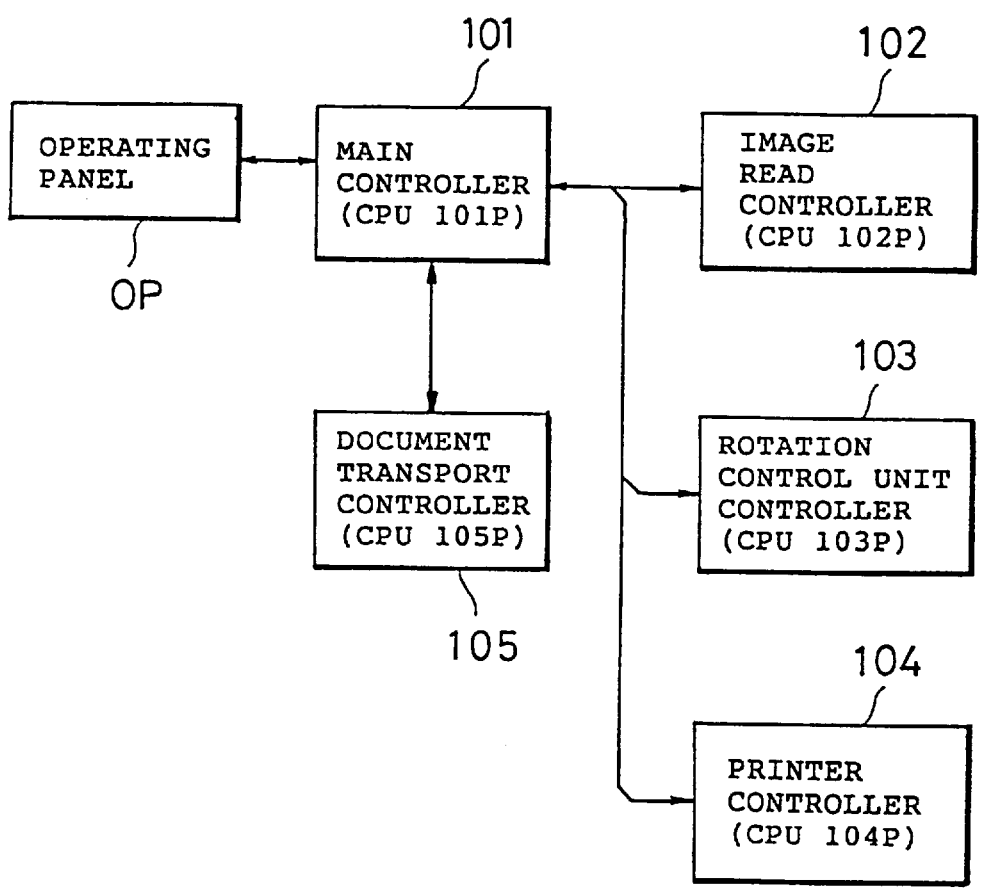
FIG. 3 is a block diagram showing the overall construction of a control system.

FIG. 3 is a block diagram of the overall construction of the control system. The control system comprises a main controller 101 comprising a CPU 101P, an image read controller 102 comprising a CPU 102P connected to the main controller 101P by a signal line, a rotation control unit controller comprising a CPU 103P, a printer controller 104 comprising a CPU 104P, a document transport controller 105 comprising a CPU 105P, and the control panel OP.

Figure 4:
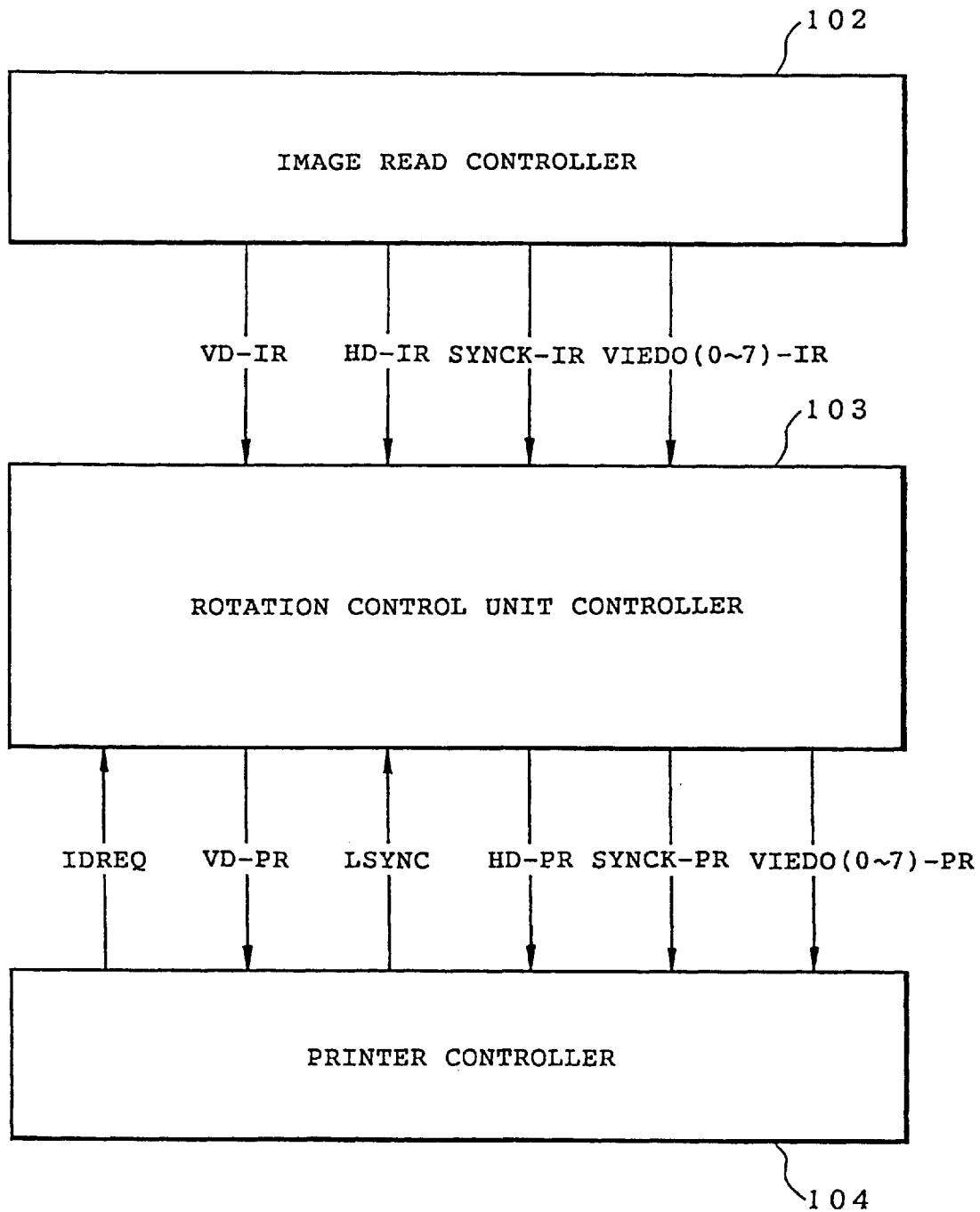
FIG. 4 is a drawing showing the types of signal passing between an image read controller and a rotation control unit controller, and the types of signal passing between the rotation control unit controller and a printer controller.
Figure 5:
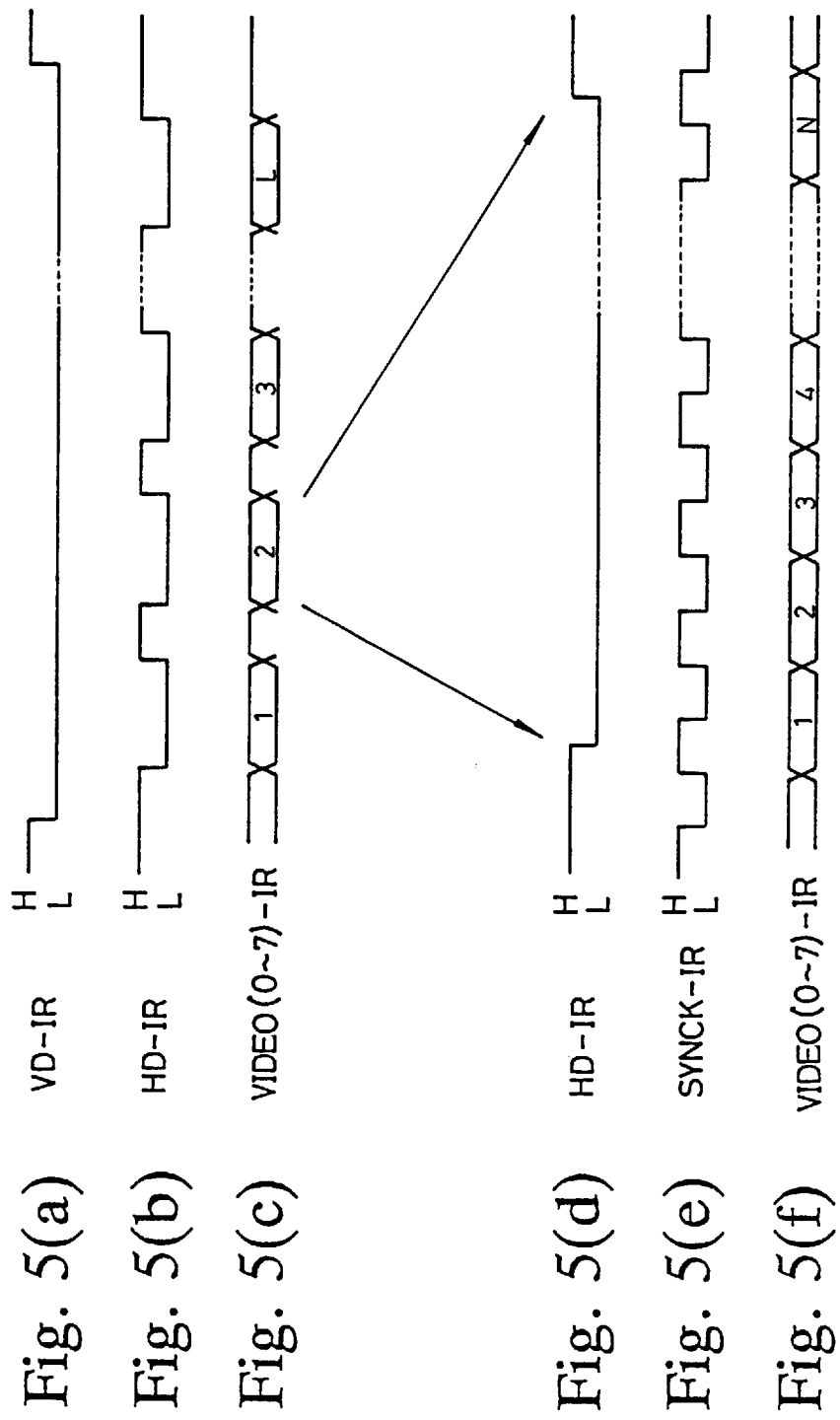
FIG. 5(*a*) to FIG. 5(*f*) are drawings showing the timing of signals passing between the image read controller and rotation control unit controller.
Figure 6:
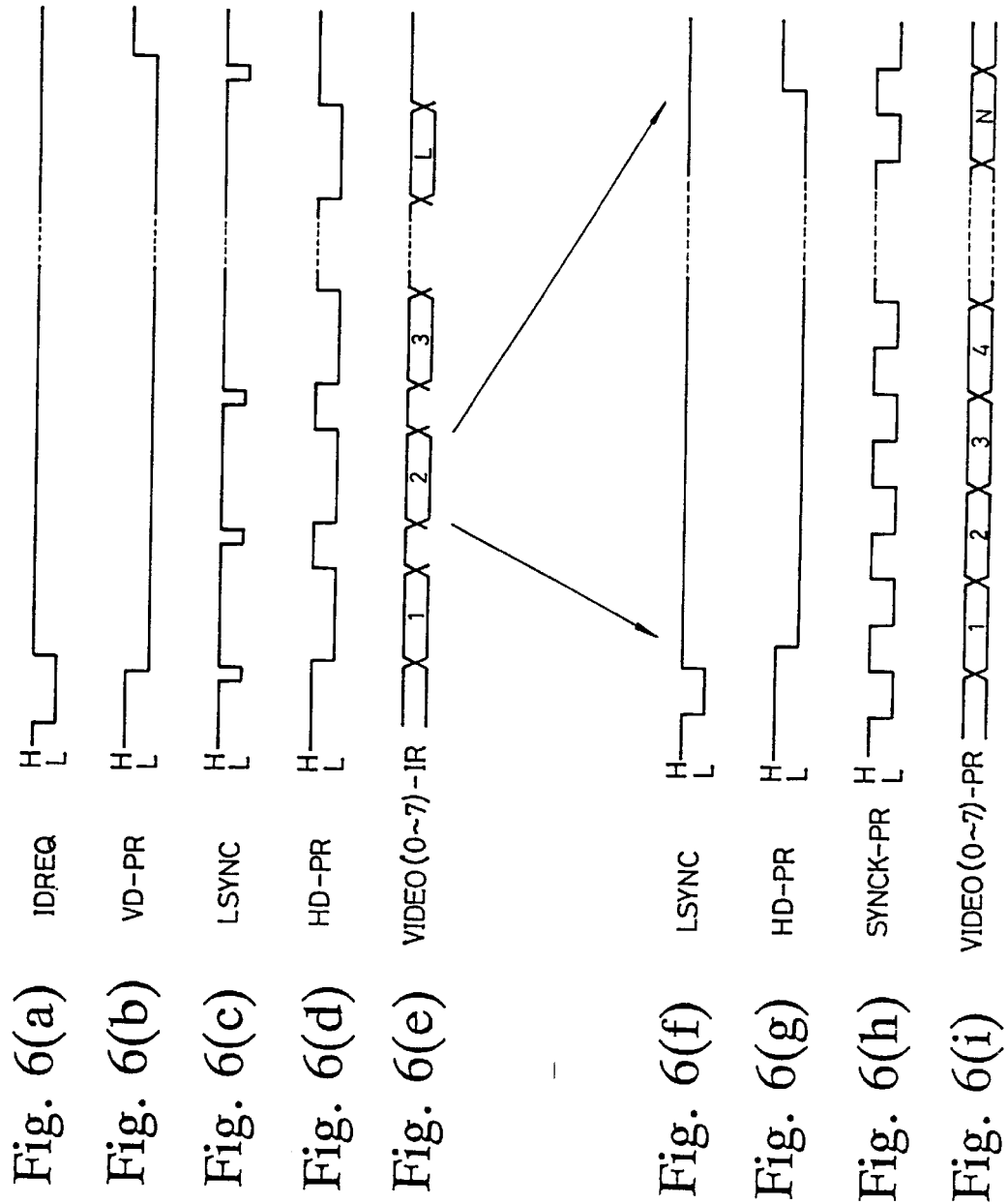
FIG. 6(a) to 6(i) are drawings showing the timing of signals passing between the rotation control unit controller and printer controller.

FIG. 4 shows the types of signal output from the image read controller 102 to a rotation control unit controller 103, and the types of signal exchanged between the rotation control unit controller 103 and the printer controller 104. A page effective area signal VD-IR, line effective area signal HD-IR, synchronism signal SYNCK-IR and effective image data (1 pixel, 8 bit) VIDEO (0–7)-IR are exchanged between the image read controller 102 and rotation control unit controller 103. A page data transfer start request signal IDREQ, page data VD-PR, 1 line start reference signal LSYNC, line data HD-PR, synchronism signal SYNCK-PR and effective image data (1 pixel, 8 bit) VIDEO (0–7)-PR are exchanged between the rotation control unit controller 103 and printer controller 104.

FIG. 5(a) to FIG. 5(f) are timing charts showing the timing of the signals VD-IR, HD-IR, SYNCK-IR and VIDEO (0–7)-IR exchanged between the image read controller 102 and rotation control unit controller 103. The effective image data VIDEO (0–7)-IR is transferred in synchronism with the synchronism signal SYNCK-IR while the page data VD-IR and line data HD-IR are "L", i.e. active.

FIG. 6(a) to FIG. 6(i) are timing charts showing the timing of signals IDREQ, VD-PR, LSYNC, HDPR, SYNCK-PR and VIDEO (0–7)-PR exchanged between the rotation control unit controller 103 and printer controller 104. The image signal is transferred from the rotation control unit controller 103 in synchronism with the page data transfer start request signal IDREQ and 1 line start reference signal LSYNC. The effective image data VIDEO (0–7)-PR is transferred in synchronism with the synchronism signal SYNCK-PR while the page data VD-PR and line data HD-PR are both "L", i.e. active.

Figure 7:
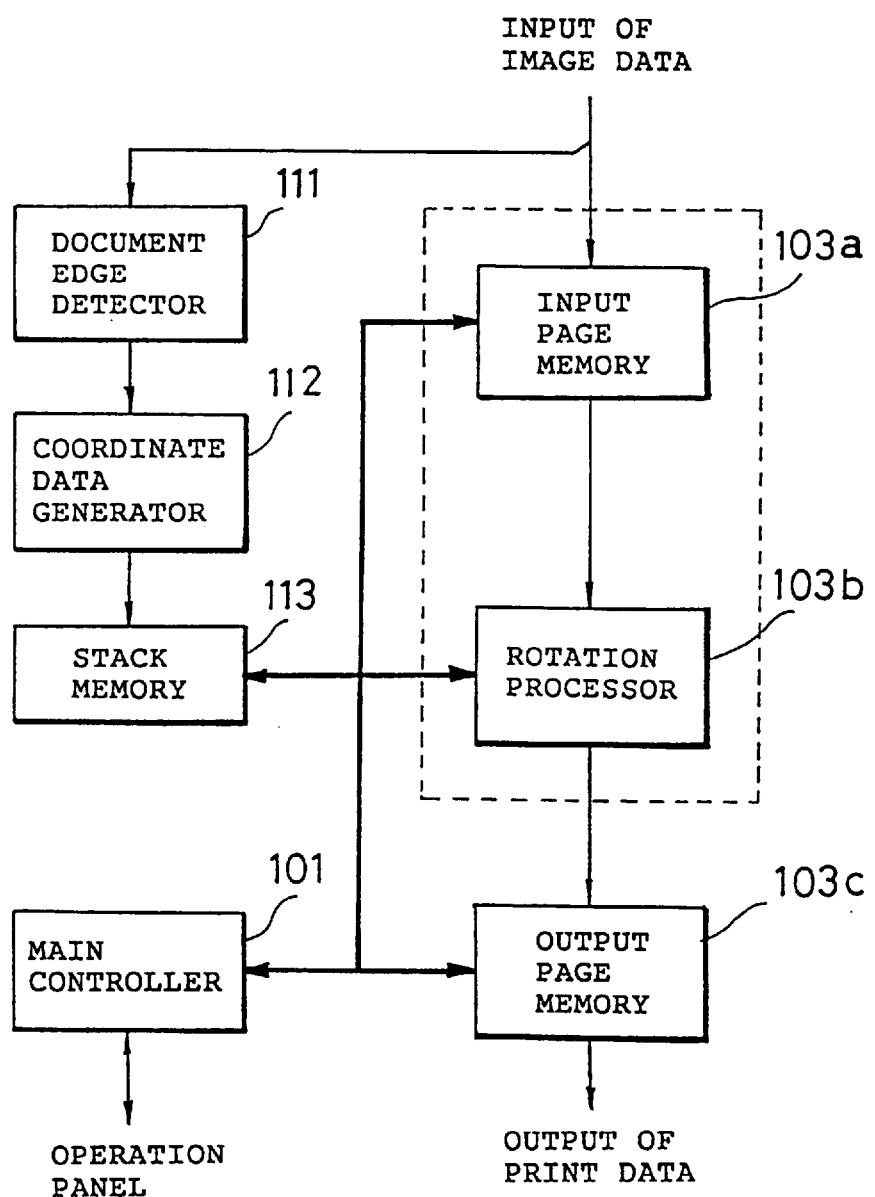
FIG. 7 is a block diagram showing the detailed construction of the rotation control unit controller.

FIG. 7 is a block diagram showing the detailed construction of the rotation control unit controller 103. Image data transferred from the image read controller 102 is temporarily stored in an input page memory 103a, and then input to a document edge detector 111. The image data input to the document edge detector 111 is processed in a coordinate data generator 112 to determine document edge coordinates which are then stored in a stack memory 113.

The image data temporarily stored in the image page memory 103a is organized in 2-dimensional coordinates. A rotation processor 103b gives a predetermined rotation to the image data temporarily stored in the input page memory 103a, based on the document edge coordinate data stored in the stack memory 113, and temporarily stores the result in an output page memory 103c.

Image data input/output, command settings and processing are handled by the CPU of the main controller 101.

Figure 8:
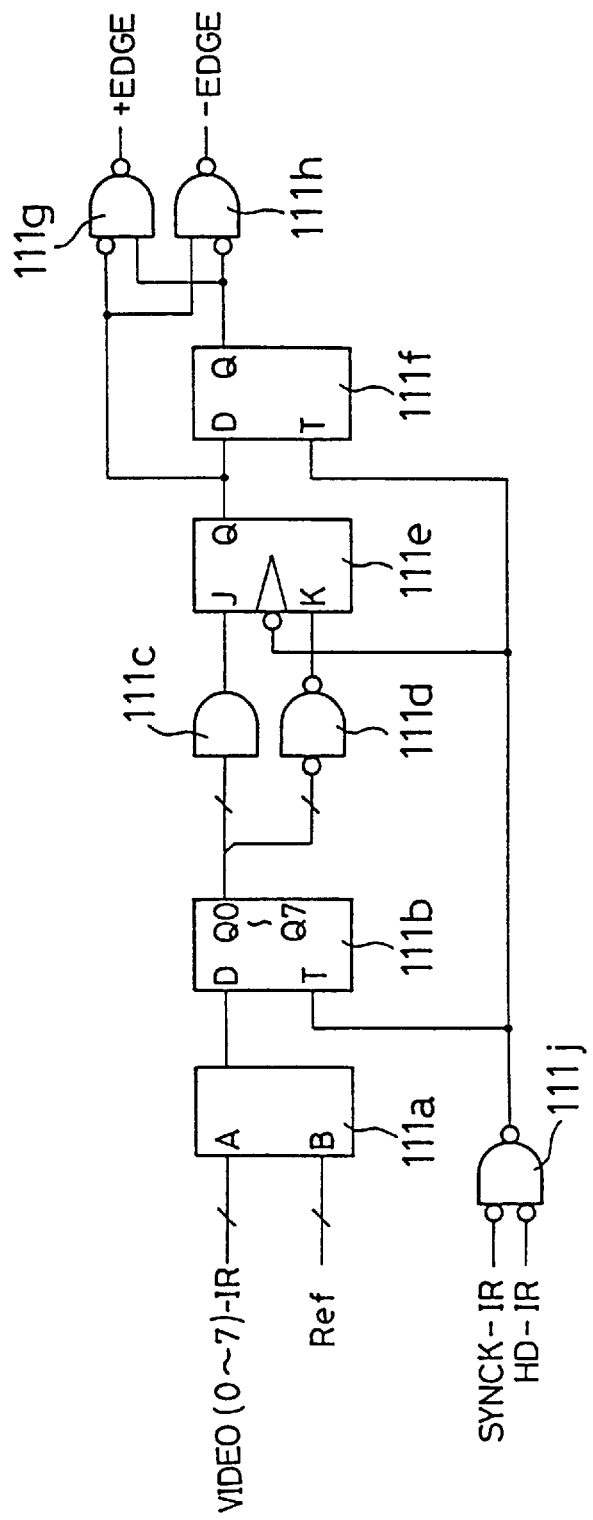
FIG. 8 is a block diagram showing the circuit layout of a document edge detector.

FIG. 8 is a block diagram showing the circuit layout of the document edge detector 111. The image data VIDEO (0–7) -IR transferred from the image read controller 102 and reference data Ref (background density of document and detected density when there is nothing on the document transport belt or document platform) are compared by a comparator 111a, and converted to binary data. The presence or absence of a document can be determined without fail by comparing the image data and reference data.

Noise is eliminated from the converted binary data in 8 bit pixel units in a shift register 111b. Finally, a +EDGE and −EDGE of the document are detected, and a 1 shot detection pulse is output. The timing of these events is controlled by the synchronizing signal SYNCK-IR and line effective area signal HD-IR.

Figure 9:
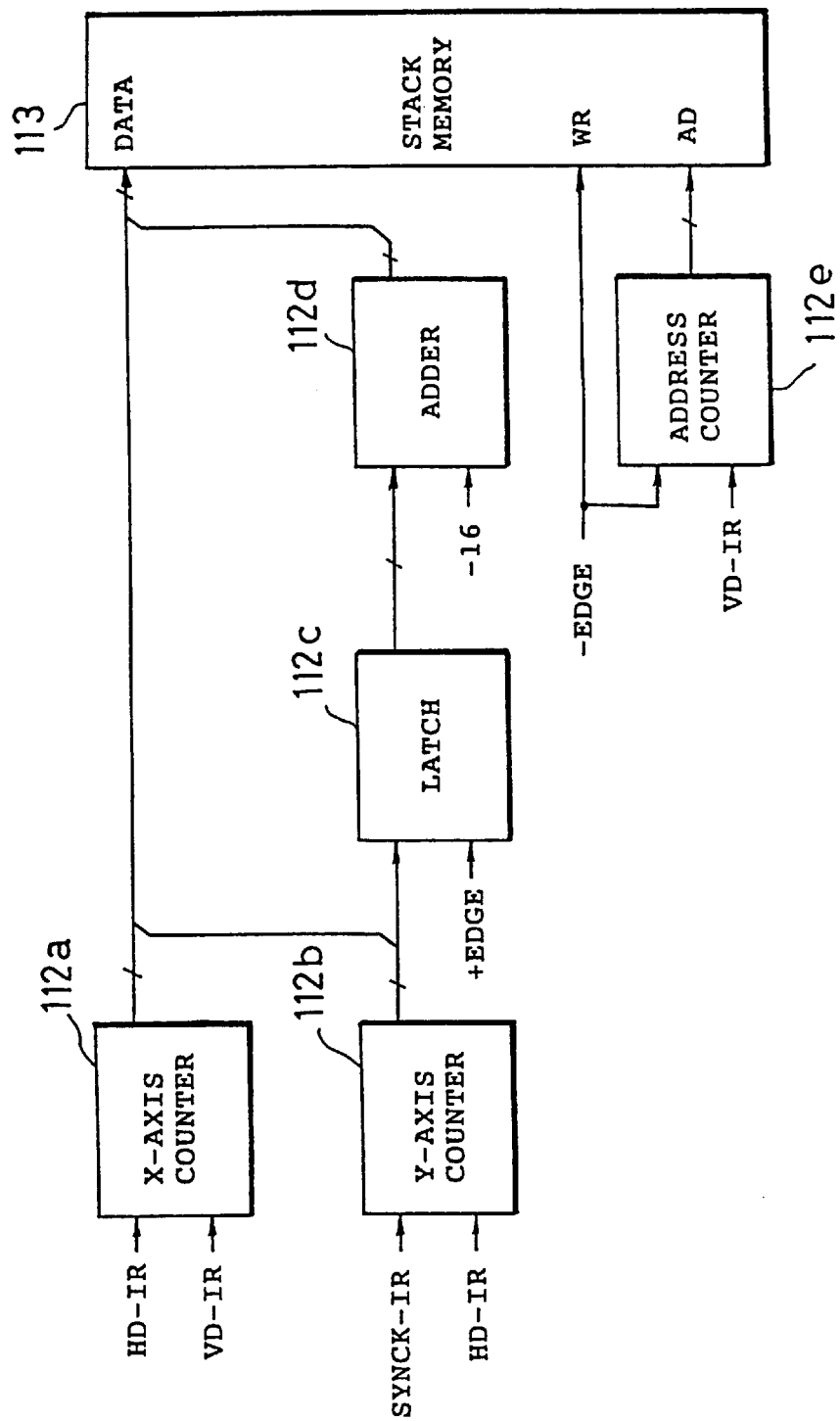
FIG. 9 is a block diagram showing the circuit layout of a coordinate data generator.

FIG. 9 is a block diagram of the coordinate data generator 112. The line effective area signal HD-IR and page effective area signal VD-IR are input to an X axis counter 112a, and an X axis coordinate signal is generated in the auxiliary scanning direction.

Also, the synchronizing signal SYNCK-IR and line effective area signal HD-IR are input to a Y axis counter 112b, and a Y axis coordinate signal is generated in the principal scanning direction.

After the Y coordinate signal in the principal scanning direction is latched in a latch 112c by the +EDGE signal, and constant 16 is subtracted in an adder 112d.

The −EDGE signal and page effective area signal VD-IR are input to an address counter 112e so as to generate an address signal. The X coordinate signal in the auxiliary scanning direction and Y coordinate signal output by the adder 112d are then stored in the stack memory 113 in addresses specified by the aforesaid address signal, the −EDGE signal being a write command signal.

The addresses are progressively updated by the −EDGE signal, and cleared by the page data VD-IR.

Figure 10:
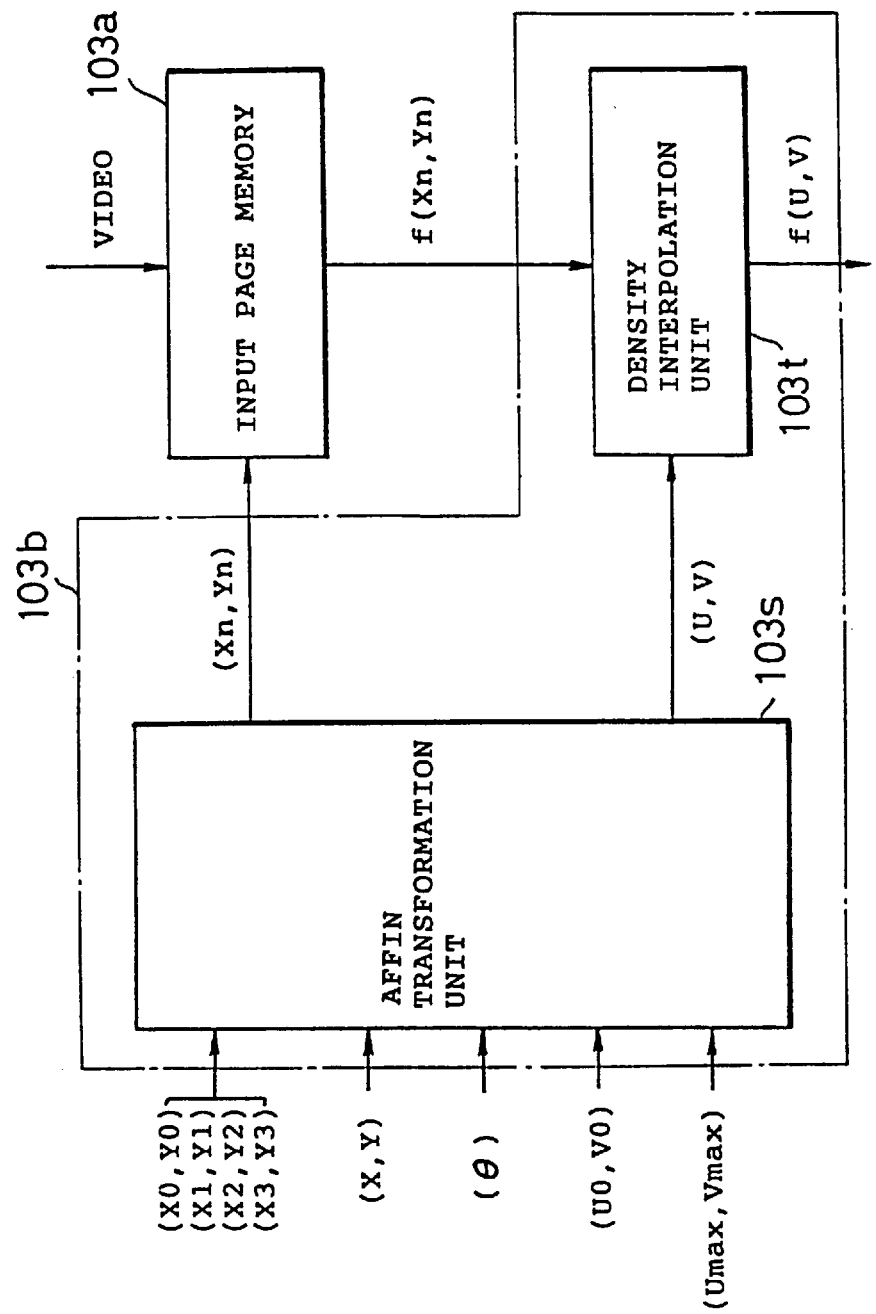
FIG. 10 is a block diagram showing the detailed construction of a rotation processor.

FIG. 10 is a block diagram showing the detailed layout of the rotation processor 103b, rotation of the image being performed by an Affin transformation unit 103s. The Affin transformation is a geometrical conversion between coordinates. For example data (image data) in the x–y coordinate system are transformed into the u–v coordinate system so as to perform operations such as parallel displacement, enlargement, reduction and rotation, and it is generally represented by the following equation (1):

$$\begin{pmatrix} u \\ v \end{pmatrix} = \begin{pmatrix} a_0 \\ b_0 \end{pmatrix} + \begin{pmatrix} a_1 & a_2 \\ b_1 & b_2 \end{pmatrix} \begin{pmatrix} x \\ y \end{pmatrix} \quad (1)$$

Figure 11A:
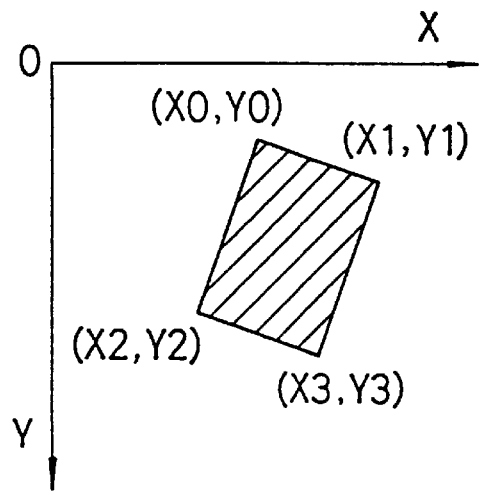
FIG. 11(a), FIG. 11(b), and FIG. 11(c) are drawings showing the relation between an image area and coordinate systems.
Figure 11B:
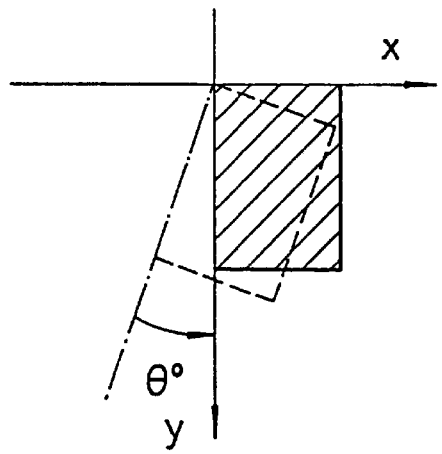
Figure 11C:
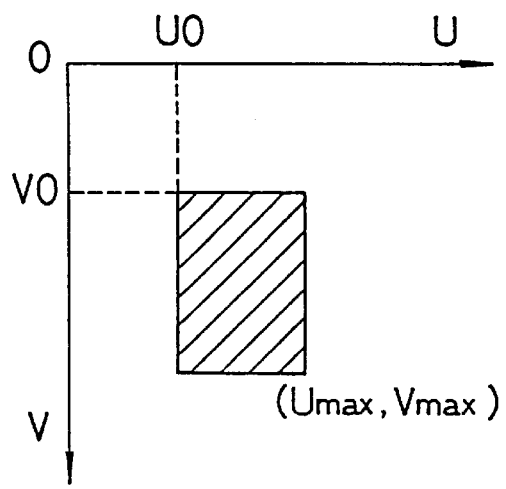

According to this embodiment, the operations performed are those of parallel displacement and rotation. First, the 4 points at the 4 corners of an image processing area in the input page memory 103a are set in the x–y coordinate system, the origin of rotation coordinates when the image is rotated is specified in the x–y coordinate system, and a rotation is given by specifying a rotation angle θ. Next, editing is performed, and the origin of the rotation coordinates of the rotated image is assigned in the u–v coordinate system. FIG. 11(a) shows the setting of the aforesaid image processing area in the x–y coordinate system, FIG. 11(b) shows the aforesaid rotation processing, and FIG. 11(c) shows the aforesaid edit processing.

This processing may be represented by the following equation (2):

$$\begin{pmatrix} u \\ v \end{pmatrix} = \begin{pmatrix} u_0 \\ v_0 \end{pmatrix} + \begin{pmatrix} \cos\theta & -\sin\theta \\ \sin\theta & \cos\theta \end{pmatrix} \begin{pmatrix} X - X_0 \\ Y - Y_0 \end{pmatrix} \quad (2)$$

The origin of the rotated image (origin of rotation coordinates) in the u–v coordinate system may be represented by the coordinate values (U0,V0), and the maximum value of the new image which has been rotated and edited (furthest point from the origin) may be represented by the coordinate values (Umax, Vmax).

Since the coordinates (U,V) which have undergone an Affin transformation will generally not be integers, the density of the new edited image is interpolated using density data f (Xn,Yn) from the original image in a density interpolating unit 103t (FIG. 10). Various techniques may be used for this such as the approximation method, linear interpolation or 3 dimensional spline interpolation, but their details will be omitted.

The interpolated image data is stored in the output page memory 103c together with the density data f (U,V) in 2 dimensional u–v coordinates, and output in line units according to the print timing.

Figure 12:
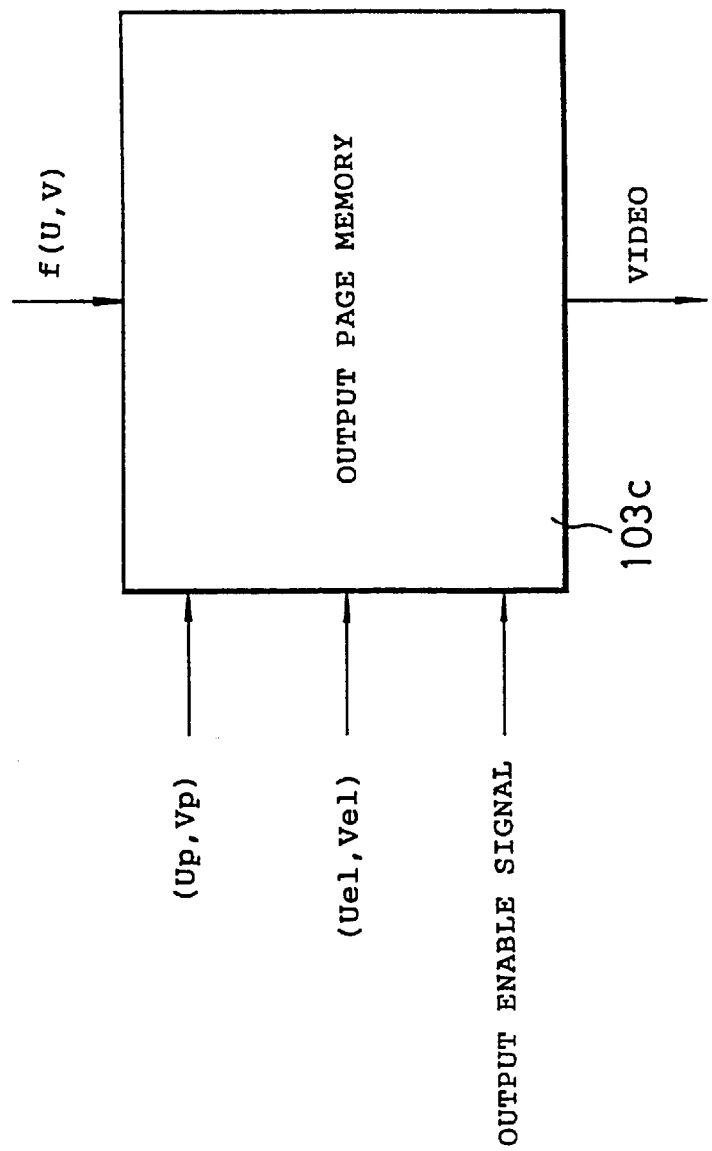
FIG. 12 is a drawing showing I/O signals such as paper size and erase area in an output page memory.
Figure 13A:
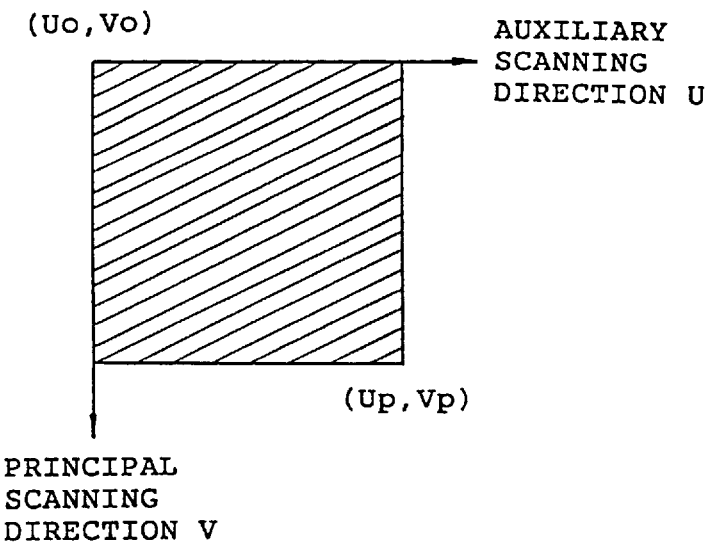
FIG. 13(a) and FIG. 13(b) are drawings showing a paper size setting and erase area setting.
Figure 13B:
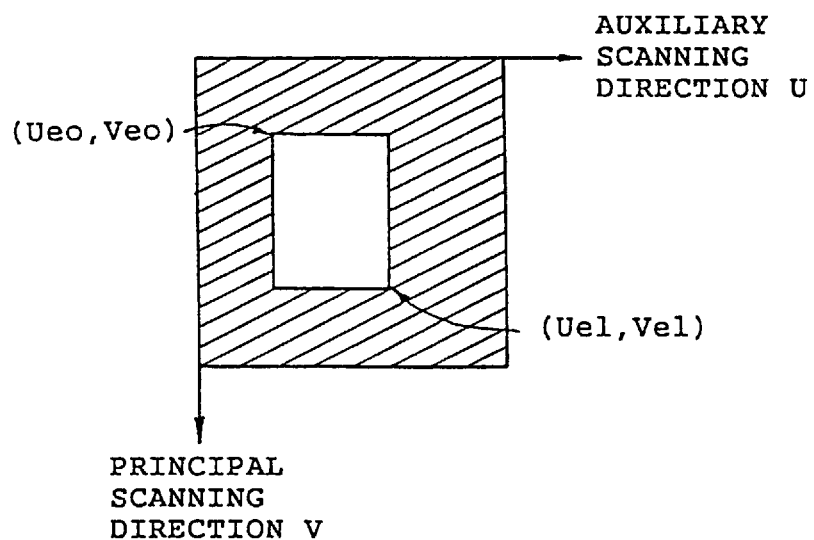

FIG. 12 shows the setting of paper size and erase area in the output page memory 103c, and I/O signals such as permission of image signal output. FIG. 13(a) shows the setting of paper size, a rectangular area having paper size coordinates (U0,V0) (Up,Vp) as diagonals being specified as the image data output area. FIG. 13(b) is a diagram showing erase of the image data output area, a rectangular area having the erase area coordinates (Ue0,Ve0), (Ue1,Ve1) as diagonals being specified as an erase area which remains white during printing. Herein, the V axis direction is the principal scanning direction and the U axis direction is the auxiliary scanning direction in (U,V) coordinates.

(Operation of Control System)

Figure 14:
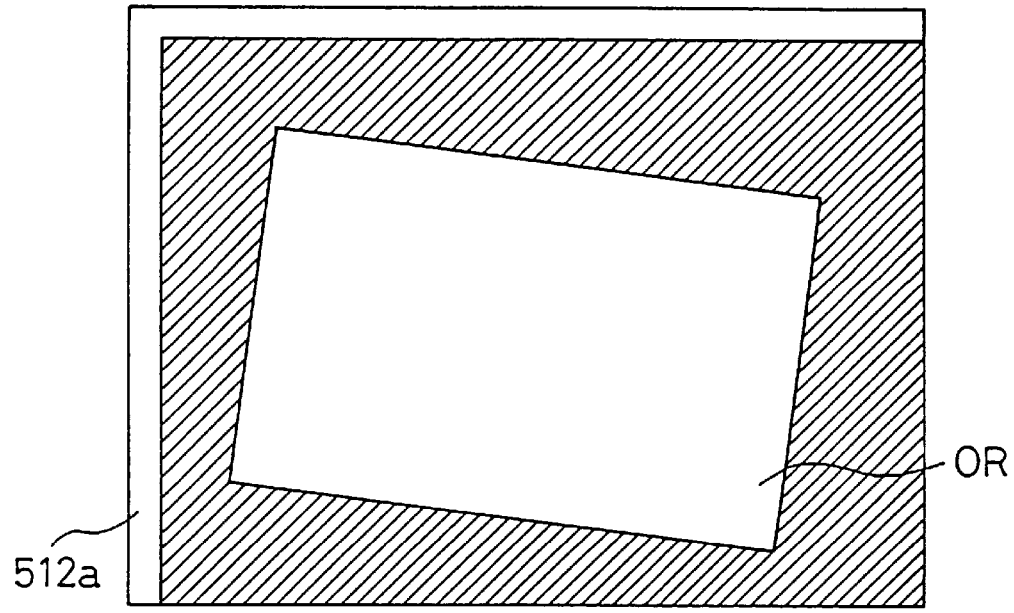
FIG. 14 is a drawing showing a document sheet on a document platform.

First, the operation of the control system will be described for the case when the thin paper mode is specified as the document sheet mode. The thin paper mode is specified by operating the key 90 on the operating panel. FIG. 14 shows the state where a document sheet OR (white part) is supplied to the document platform by the automatic document feeder. In the thin paper mode, as shown in FIG. 14, the document sheet OR is set at a slight distance from the document scale 512a.

Figure 15:
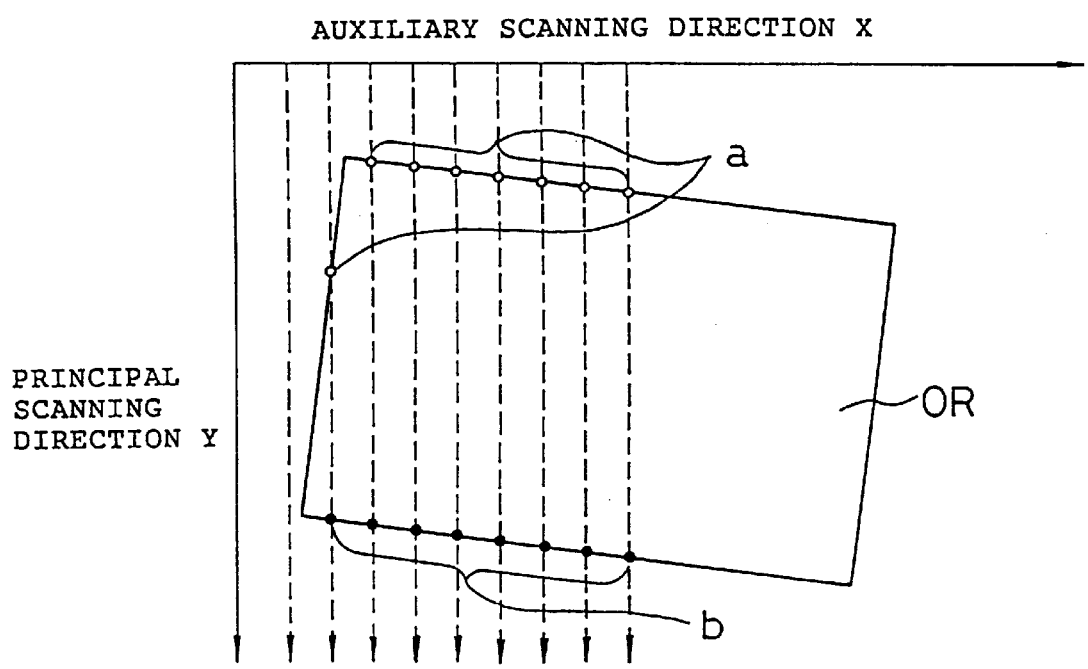
FIG. 15 is a drawing showing the scanning of a document sheet and detection of the document edge.

FIG. 15 is a diagram showing scanning of the document by a scanner. As the scanner moves in the X direction (auxiliary scanning direction), the document sheet OR is scanned in the Y direction (principal scanning direction) by line sensor 17. The image signal is output in line units, and stored in the input page memory 103a.

Simultaneously, the document edge is detected. As shown in FIG. 15, white dots a where the document sheet OR was scanned are detected as a +EDGE in each scanning line, and black dots b where a separation from the sheet OR was scanned are detected as a −EDGE in each scanning line. A scan line number (Xn), +EDGE count value (YWm) corresponding to the distance from the scan line origin to the white dots a and −EDGE count value (YBm) corresponding to the distance from the scan line origin to the black dots b, are stored in the stack memory 113 as a set of document edge detection signals.

The rotation control unit controller 103 determines the coordinates of the 4 corners of the document area in the x–y coordinate system, based on the document edge detection signals for each scanning line stored in the stack memory 113 as described hereinabove, and performs image rotation and editing.

Next, the operation of the control system will be described when the mixed paper mode is specified as the document sheet mode. When the mixed paper mode is specified by operating the key 99 on the control panel, a document sheet is transported by the automatic document feeder and an edge of the sheet OR is set at a position a slight distance away from the document scale 512a, as in the case of the thin paper mode. Scanning of the sheet OR, detection of the document edge, image rotation and editing are performed in the same way as in the case of the thin paper mode.

A sheet OR placed such that its long direction is in the transport direction, is also set at a slight distance away from the document scale 512a, as in the case of the thin paper mode. Scanning of the sheet OR, document edge detection, image rotation and editing are performed in the same way as for the thin paper mode. Determination of whether or not the sheet OR is a long sheet in the transport direction is made by detecting the front and rear edges of the sheet OR when it is transported by the automatic document feeder.

When the document sheet mode is not specified, i.e. in the case of the normal mode, immediately after the rear edge of the sheet OR transported by the automatic document feeder has passed the scale 512b, the transport belt is reversed and the rear edge of the sheet OR is brought in contact with the scale 512b so as to set the document position. Document edge detection, image rotation and editing such as in the case of the thin paper mode are not performed.

Figures 29, 30:
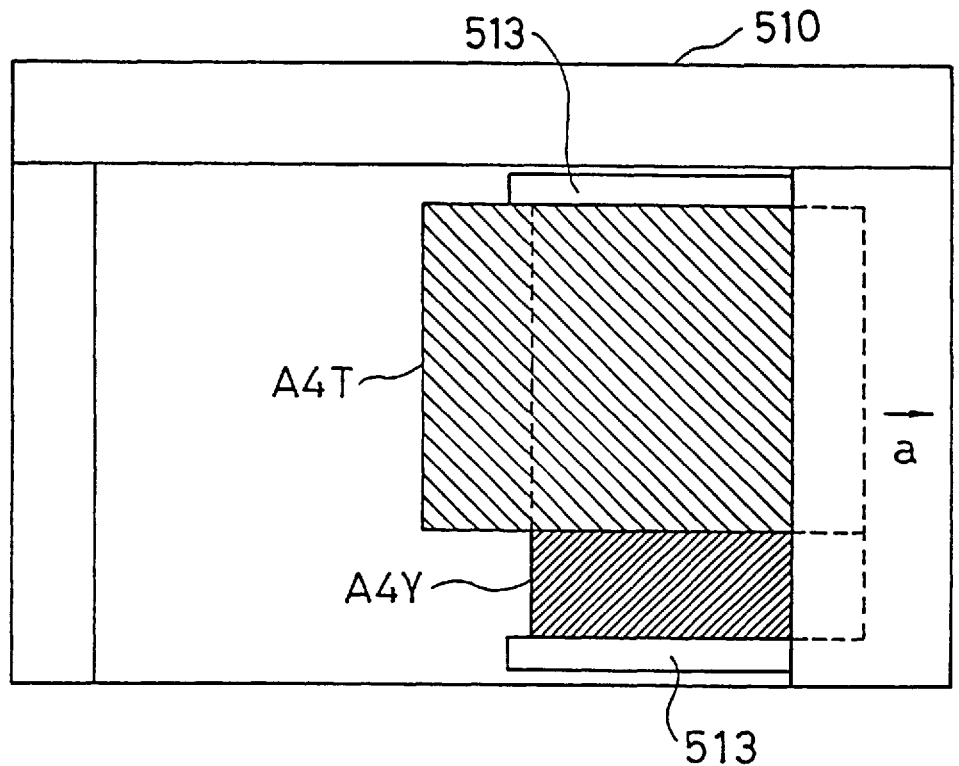
FIG. 29 is a drawing showing how a document tray and a document sheet of an automatic document feeder are installed.
FIG. 30 is a drawing showing the relation between width and length of a document sheet, and document size.

The orientation of the document sheet and document size denoted by symbols in this specification will now be described. FIG. 29 is a plan view of the document tray 510 of the automatic document feeder. The transport direction of the sheet is the direction shown by the arrow a, and 513 is the width regulating plate.

When the long side of the sheet is parallel to the transport direction, the sheet is referred to as "vertical", this being indicated by a "T" added to the symbol denoting the document size. When the short side of the sheet is parallel to the transport direction, the sheet is referred to as "horizontal", this being indicated by a letter "Y" added to the symbol denoting the document size. For example, "A4Y" denotes an A4 size document placed horizontally (with the short side of the sheet parallel to the transport direction), and "A4T" denotes an A4 size document placed vertically (with the long side of the sheet parallel to the transport direction).

FIG. 30 is a table showing the ON/OFF state of the width size sensor SE53 which detects the width dimensions of the sheet, and the relation between sheet length (detected from the elapsed time when the registration sensor SE51 is ON) and document size. The document size is indicated by the aforesaid symbols. This document size table is stored in a memory, not shown, and reference is made to it as necessary in the image data processing described hereinafter.

Figure 16:
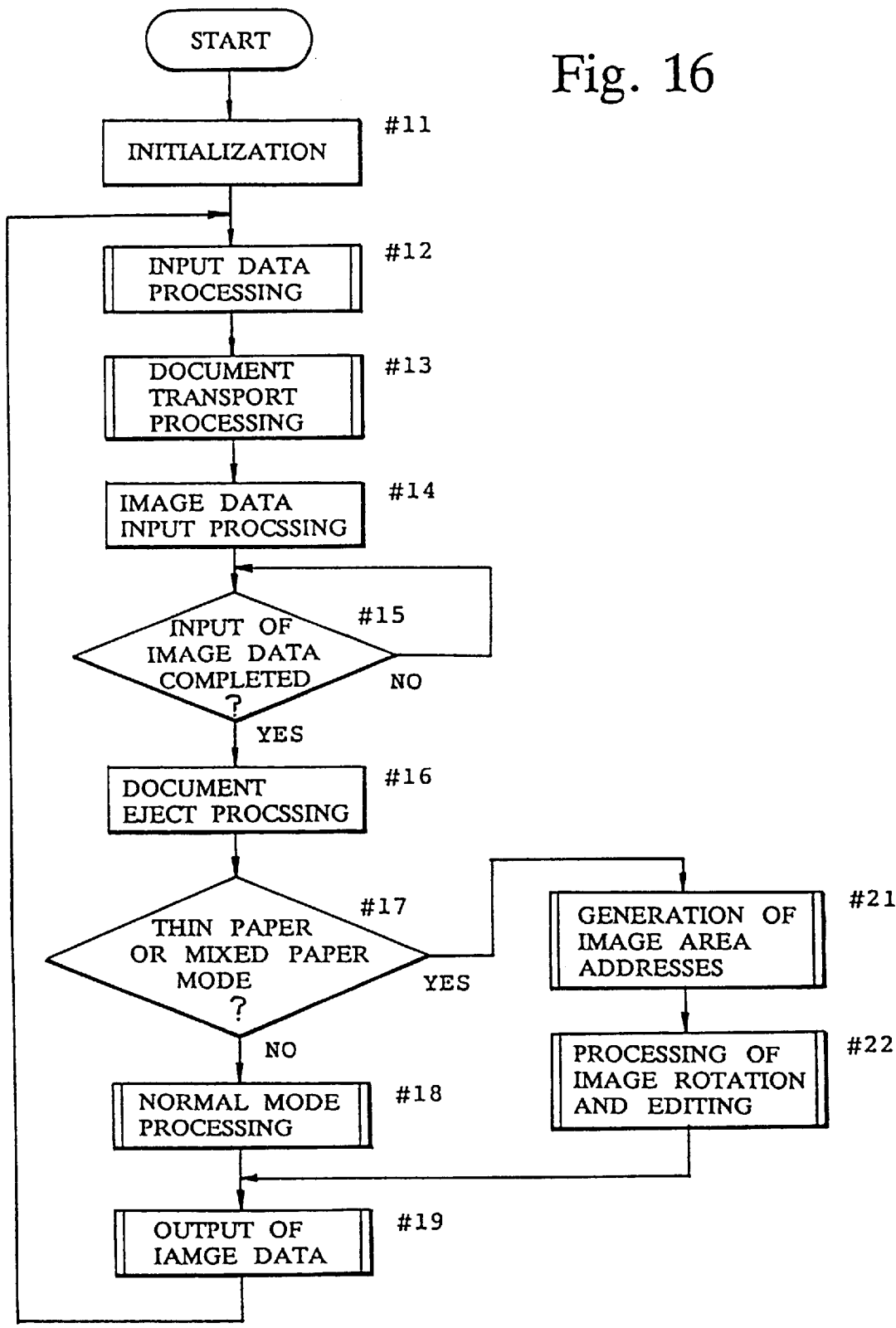
FIG. 16 is a flowchart schematically showing the overall operation of a control system.

FIG. 16 is a flowchart schematically showing the overall operation of the control system. First, the control system is initialized, various input data inputted from the control panel is processed, and a document sheet is transported by the automatic document feeder (steps #11, #12, and #13). The document is scanned, image data input is repeated until input is complete, and when image data input is complete, the sheet is ejected from the document platform (steps #14, #15, and #16).

The keys 90 or 99 on the operating panel are operated, and it is determined whether or not the thin paper mode or mixed paper mode has been selected as the document sheet mode (step #17). When the mode is not the thin paper mode or mixed paper mode, it is the normal mode, so normal processing is executed in which image rotation and editing are not performed (step #18), image data is output (step #19), and the routine returns to the step #12. When the thin paper mode or mixed paper mode is set, an image area address is generated, image rotation and editing are performed (steps #21 and #22), image data is output (step #19), and the routine returns to the step #12.

Figure 17A:
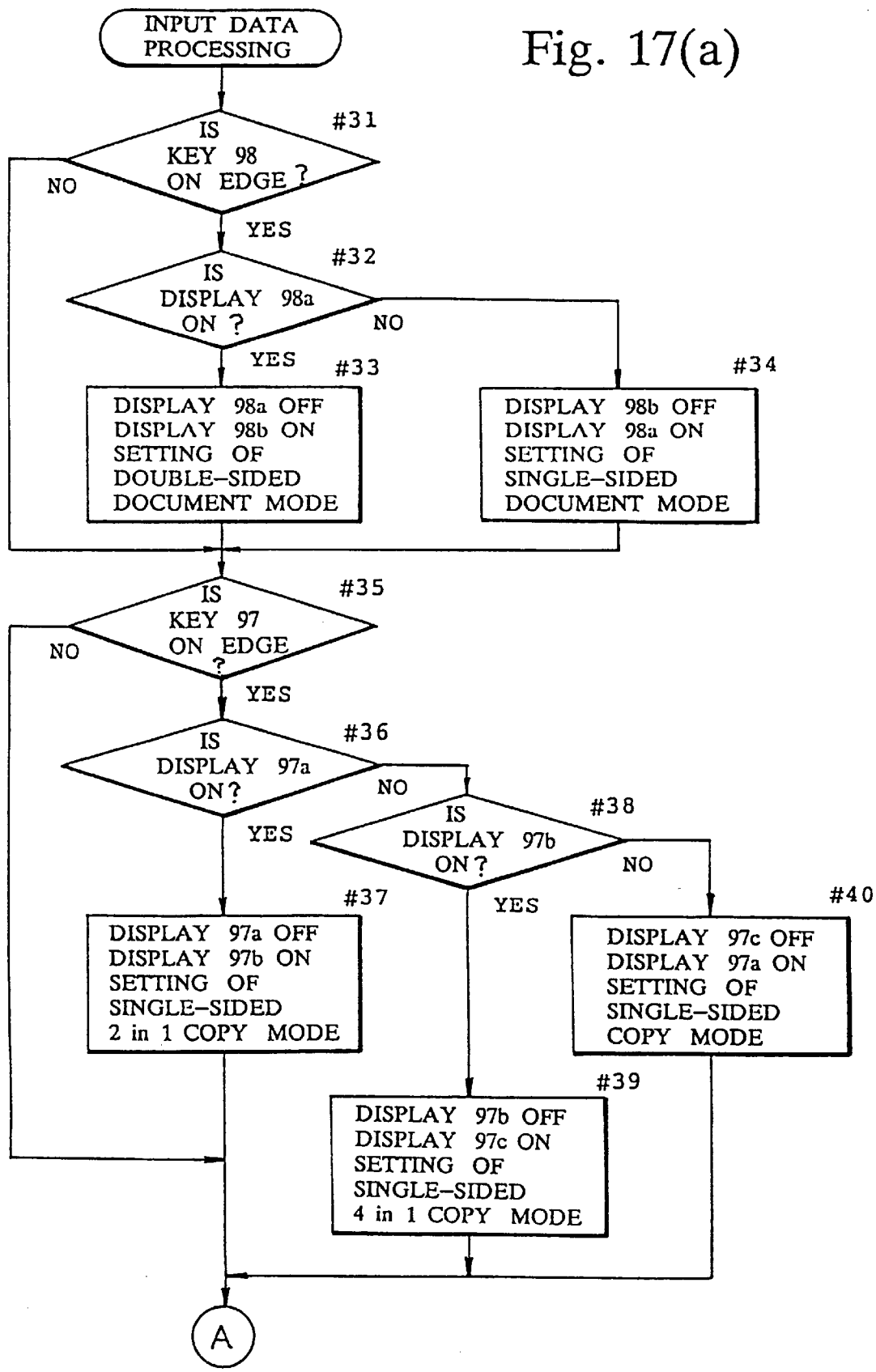
FIG. 17(a) and FIG. 17(b) are flowcharts showing details of an input data process.
Figure 17B:
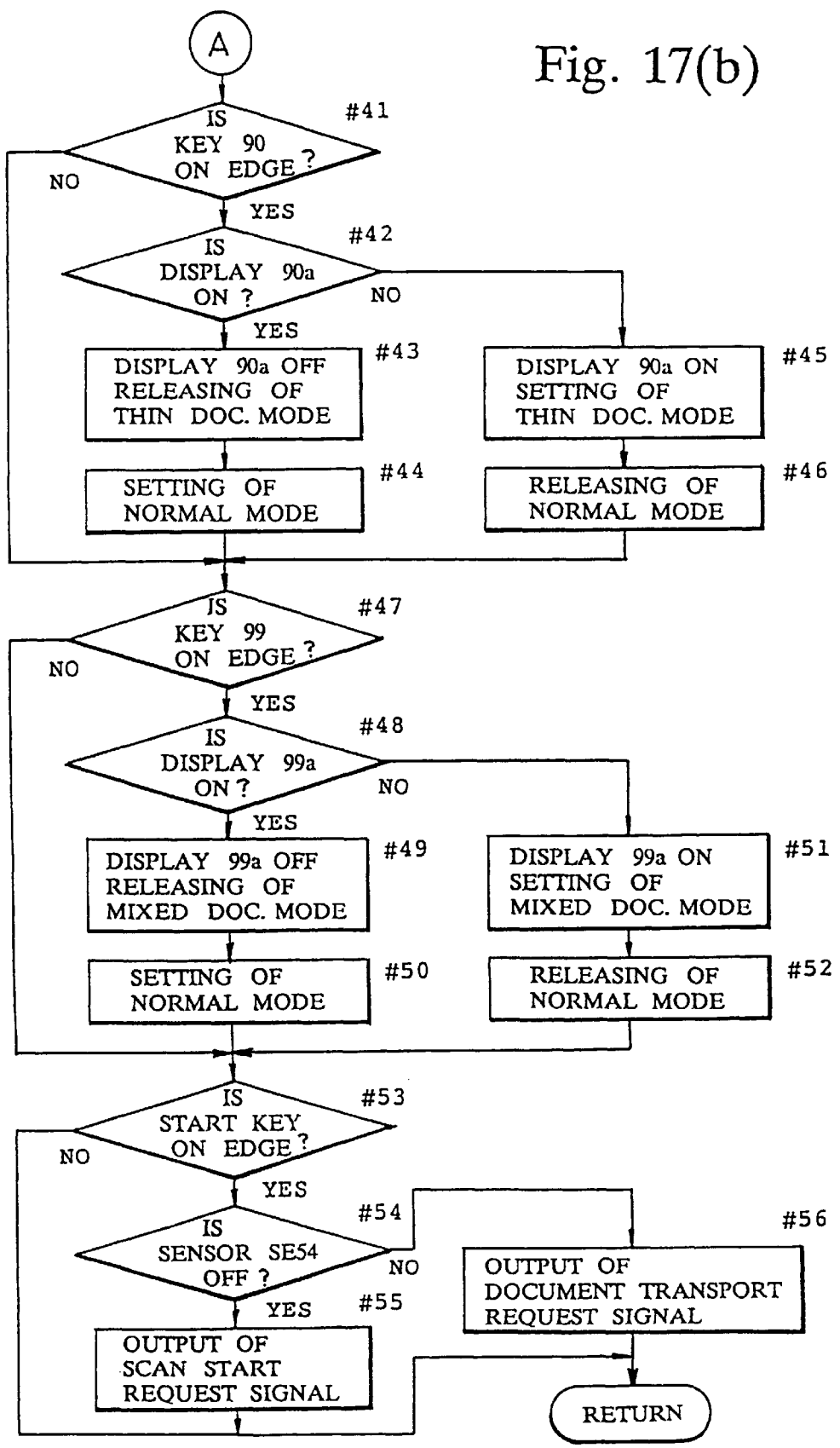

FIG. 17(a) and 17(b) are flowcharts showing, in detail, the input processing of the step #12 in the flowchart of FIG. 16. First, the document mode setting is determined by "on edge" of the output signal of the document mode set key 98 (step #31). In the case of "on edge", the lighting state of the display 98a, which shows selection of the single-sided document mode, is determined (step #32). When it is lit, the display 98a is switched off and the display 98b is lit so that the double-sided document mode is set (step #33). When the display 98a is not lit, the display 98b is switched off and the display 98a is lit so that the single-sided document mode is set (step #34).

The copy mode setting is determined by "on edge" of output signal of the copy mode set key 97 (step #35). In the case of "on edge", the lighting state of the display 97a, which shows selection of the single-sided copy mode, is determined (step #36). When it is lit, the display 97a is switched off and the display 97b is lit so that the 2 in 1 copy mode is set (step #37). When the display 97a is not lit, the lighting state of the display 97b is determined (step #38). When the latter is lit, the display 97b is switched off and the display 97c is lit so that the 4 in 1 copy mode is set (step #39). When also the display 97b is not lit, the display 97c is switched off and the display 97a is lit so that the single-sided copy mode is set (step #40).

Referring now to the flowchart of FIG. 17(b), the document sheet mode setting is first determined by "on edge" of the key 90 which sets the thin paper mode (step #41). In the case of "on edge", the lighting state of the display unit 90a, which shows selection of the thin paper mode, is determined (step #42). When it is lit, the display 90a is switched off, the thin paper mode is released and the normal mode is set (steps #43 and #44). When the display 90a is not lit, the display 90a is lit, the thin paper mode is set and the normal mode is released (steps #45 and #46).

The document sheet mode setting is further determined by "on edge" of the key 99 which sets the mixed paper mode (step #47). In the case of "on edge", the lighting state of the display 99a, which shows selection of the mixed paper mode, is determined (step #48). When it is lit, the display 99a is switched off, the mixed paper mode is released and the normal mode is set (steps #49 and #50). When the display 99a is not lit, the display unit 99a is lit, the mixed paper mode is set and the normal mode is released (steps #51 and #52).

Whether or not the start key 96, which commands start of copying, has been depressed, is determined by on edge. In the case of on edge, it is determined whether or not the sensor SE54 which detects the presence or absence of documents on the document tray of the automatic document feeder is OFF (step #54). When it is OFF, a scan start request signal which commands document scanning is output (step #55) and processing returns to the main routine. When the sensor SE54 is not OFF, a document transport request signal is output to the automatic document feeder (step #56) and processing returns to the main routine.

Figure 18:
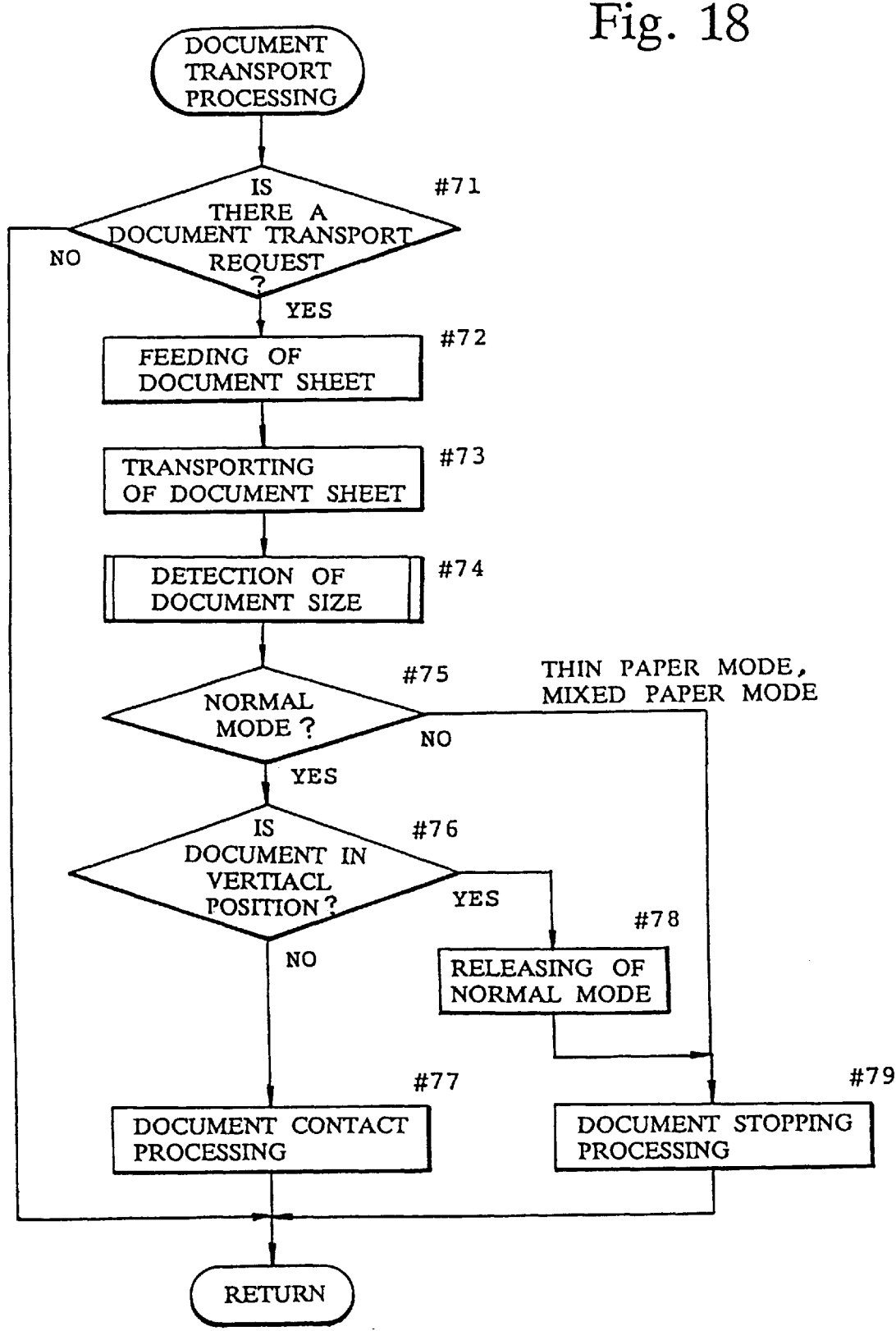
FIG. 18 is a flowchart showing details of a document transport process.

FIG. 18 is a flowchart showing, in detail, the document transport processing of the step #13 in the flowchart of FIG.

16. First, the presence or absence of a document transport request is determined (step #71).

If there is a request, a document sheet is fed up to the registration roller (step #72), and transport processing is performed until the rear edge of the sheet passes the document scale 512b (step #73).

The document size is detected from the outputs of the width size sensor SE53 which detects the document width and the registration sensor SE51 (step #74). It is determined whether the mode is the normal mode or not (step #75). When the mode is the normal mode, it is determined whether or not the document is vertically oriented (step #76). When it is not vertically oriented, the transport belt moves in the reverse direction to bring the rear edge of the sheet in contact with the document scale (step #77), and processing returns to the main routine.

When the document is vertically oriented, the normal mode is released so that processing is performed in the thin paper mode or mixed paper mode, the document is stopped in its present position (steps #78 and #79), and processing returns to the main routine. Also in the case when the mode is not determined to be the normal mode in the step #75, the document is stopped in its present position (step #79), and processing returns to the main routine.

Figure 19:
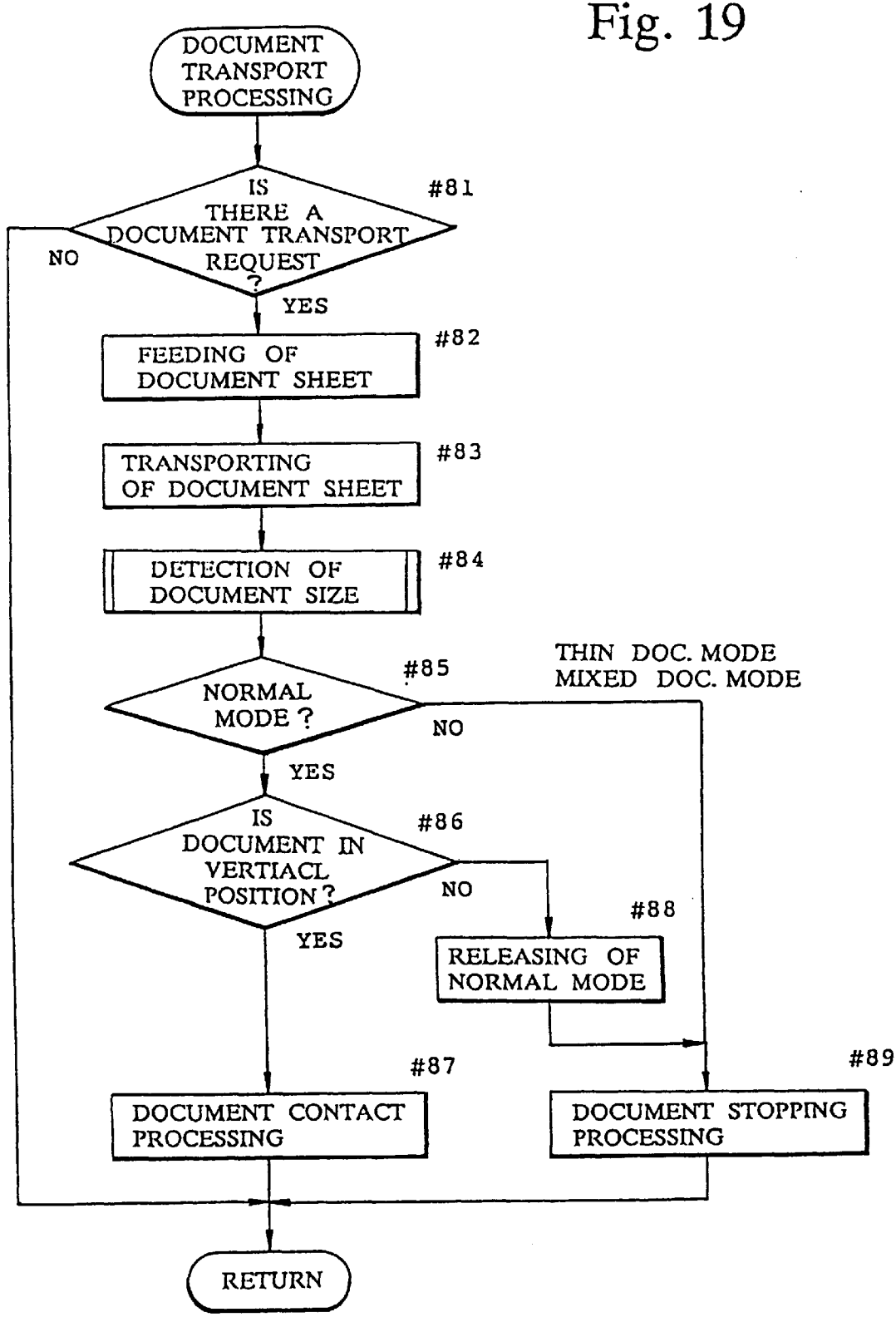
FIG. 19 is a flowchart showing details of another example of a document transport process.

In the aforesaid document transport processing, when the mode is the normal mode and the document is vertically oriented, contact processing may also be performed in which the transport belt is moved in the reverse direction so as to bring the rear edge of the sheet in contact with the document scale. A flowchart corresponding to an example of this modification is shown in FIG. 19. The difference from the flowchart of FIG. 18 lies in the determination result of a step #86, i.e. when the document is vertically oriented, contact processing is performed (step #87), and when the document is not vertically oriented, the normal mode is released and the document is stopped in its present position (steps #88 and #89). The remaining features are the same as for the flowchart of FIG. 18.

Figure 20:
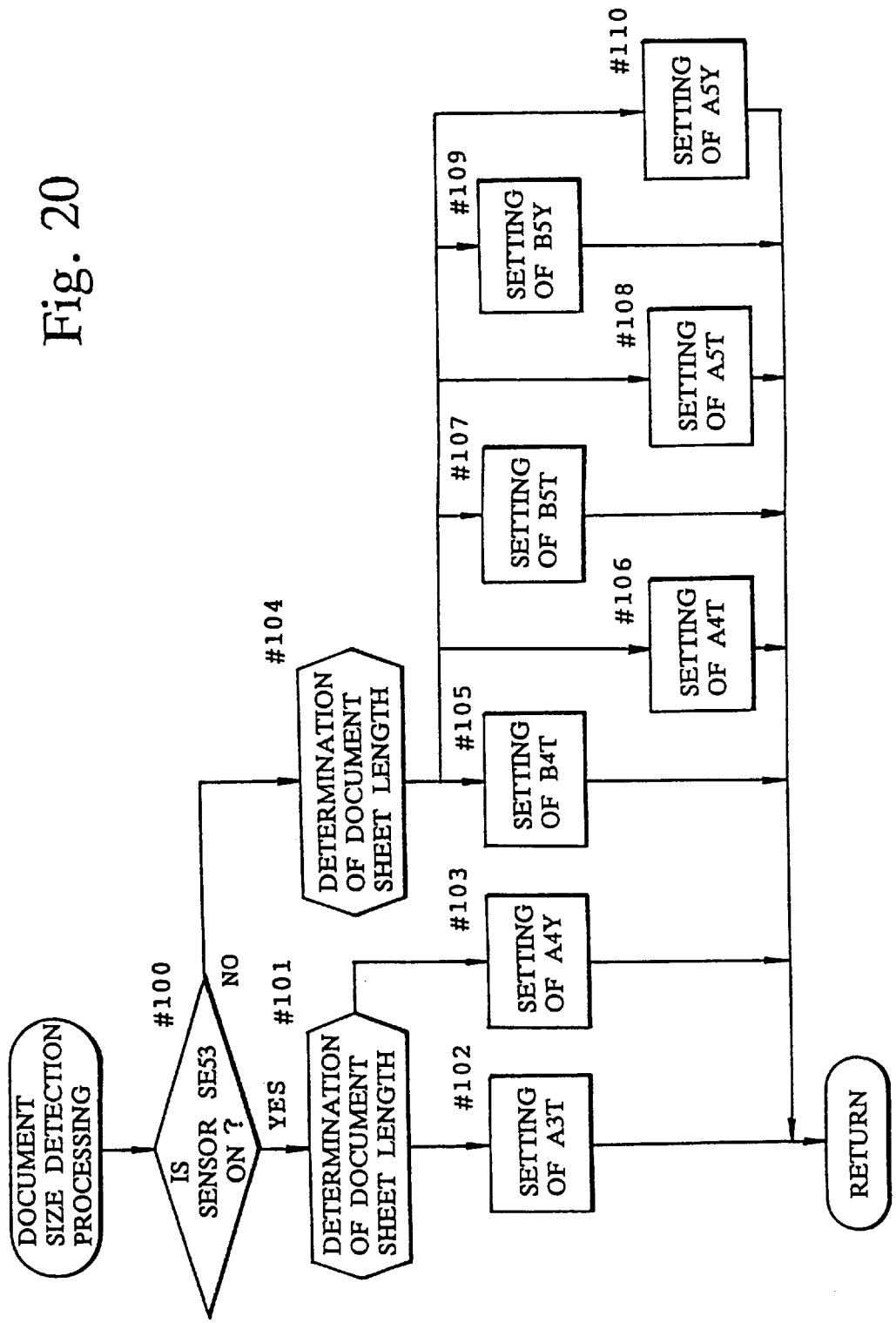
FIG. 20 is a flowchart showing details of a document size detection process.

FIG. 20 is a flowchart showing, in detail, document size detection processing of the step #74 in the flowchart of FIG. 18. First, it is determined whether the width size sensor SE53 which detects document width is ON (step #100). When it is ON, the sheet length is determined from the elapsed time when the registration sensor SE51 is ON (step #101), the document size is determined referring to the aforesaid document size table shown in FIG. 30 (steps #102 and #103), and processing returns to the main routine.

When the width size sensor SE53 is OFF, the sheet length is determined from the elapsed time when the registration sensor SE51 is ON (step #104), the document size is determined based on the sheet length referring to the value in the table shown in FIG. 30 (steps #105–#110), and processing returns to the main routine.

Figure 21:
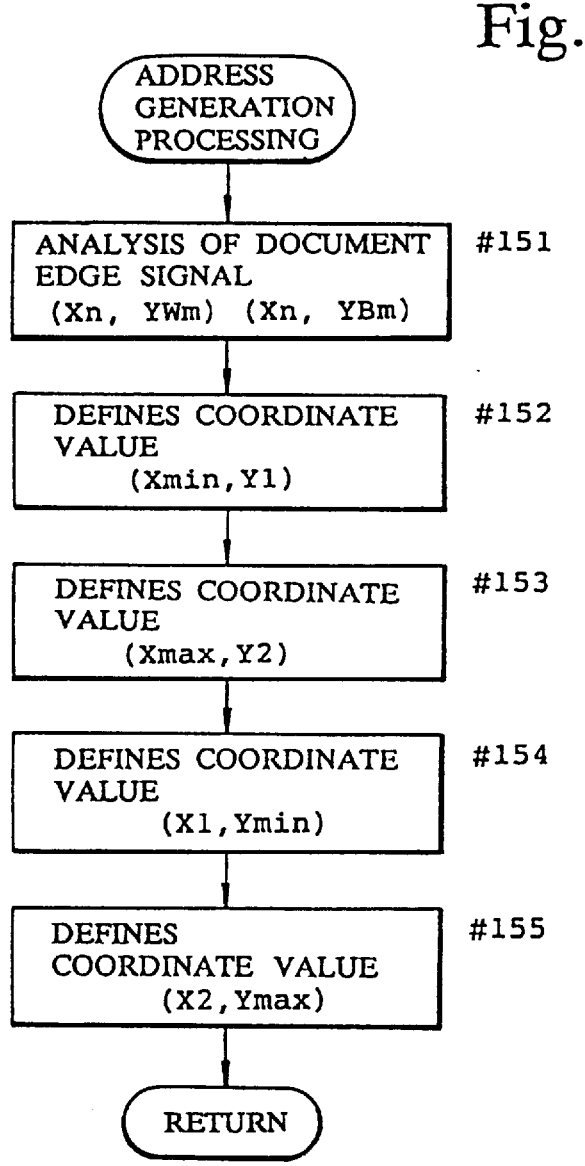
FIG. 21 is a flowchart showing details of an area address generation process.

FIG. 21 is a flowchart showing, in detail, an area address generation processing defining a document area of the step #21 in the flowchart of FIG. 16. First, a document edge detection signal stored in the stack memory 113 is analyzed and determined to be a scan line number (Xn) and +EDGE counter value (YWm), and a scan line number (Xn) and –EDGE counter value (YBm) (step #151).

Figure 23:
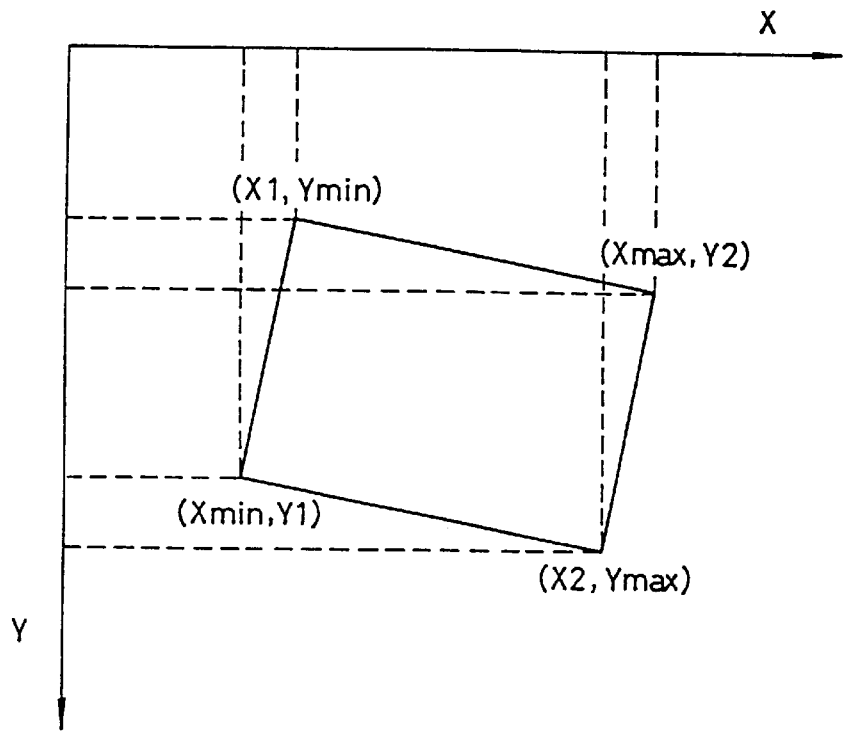
FIG. 23 is a drawing showing addresses of document areas.
Figure 25:
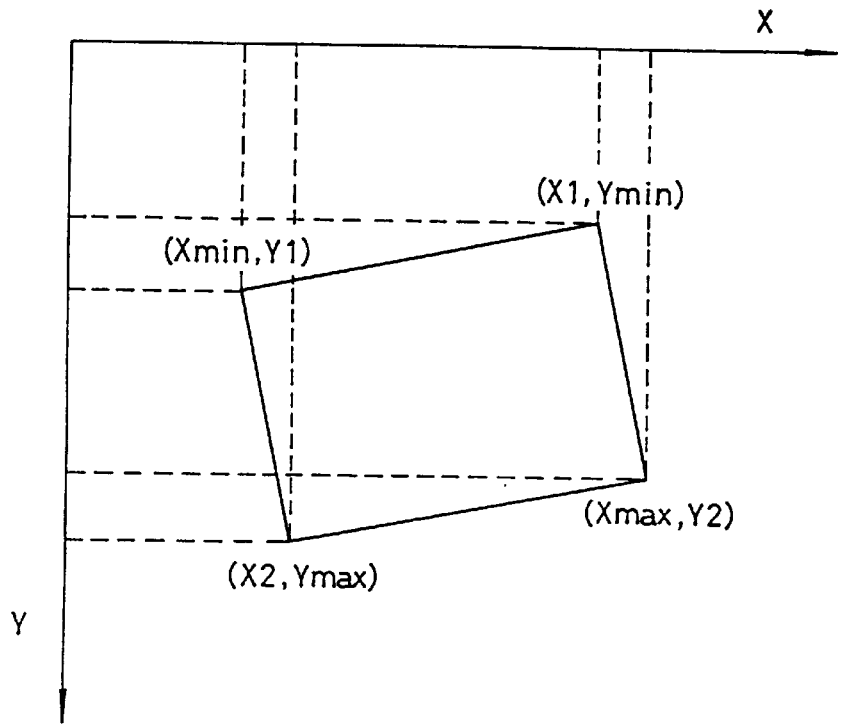
FIG. 25 is a drawing showing addresses of document areas.

Next, coordinate values (Xmin,Y1) representing a minimum value Xmin in the X axis direction, coordinate values (Xmax,Y2) representing a maximum value Xmax in the X axis direction, coordinate values (X1,Ymin) representing a minimum value Ymin in the Y axis direction, and coordinate values (X2,Ymax) representing a maximum value Ymax in the Y axis direction, are defined (steps #152–#155), and processing returns to the main routine. The document area addresses defined by this processing are as shown in FIGS. 23 and 25.

Figure 22:
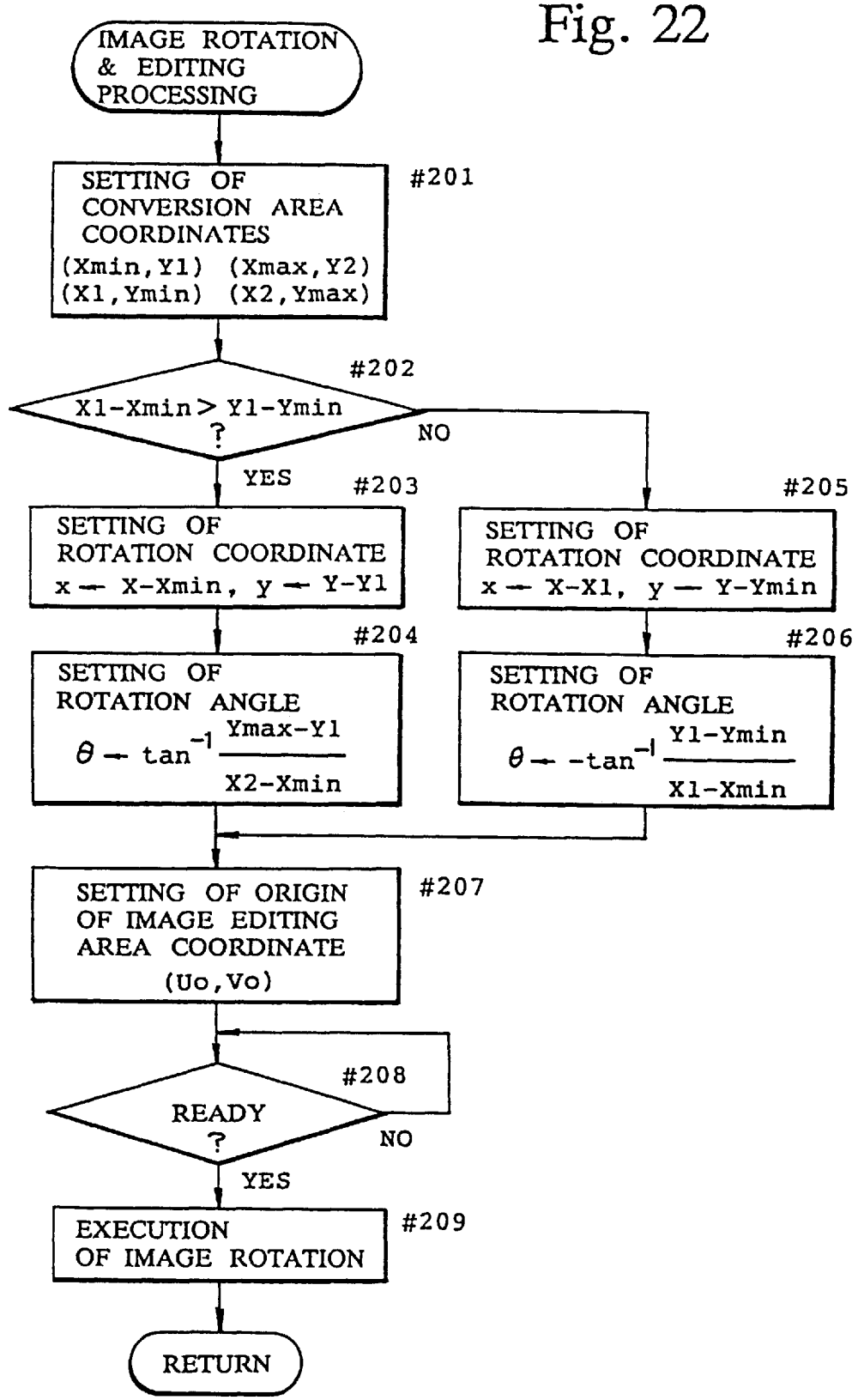
FIG. 22 is a flowchart showing details of an image rotation and editing process.

FIG. 22 is a flowchart showing, in detail, image rotation and editing of the step #22 in the flowchart of FIG. 16.

The document area coordinates (Xmin,Y1), (Xmax,Y2), (X1,Tmin), (X2,Ymax) determined by the area address generation processing described in FIG. 21, are set as converted area coordinates (step #201). Next, distances between specified pairs of coordinates are compared so as to determine the slant of the document (step #202), and a rotation coordinates and rotation angle are set (steps #203–#206).

Specifically, when the distance between two coordinates X1-Xmin>Y1-Ymin, the origin (x,y) of the rotation coordinates and the rotation angle $\theta$ are set as shown below (steps #203 and #204). The rotation direction is counterclockwise.

$x = (X - Xmin)$ $y = (Y - Y1)$ $\theta = \tan^{-1}(Ymax - Y1)/(X2 - Xmin)$

When the distance between two coordinates X1–Xmin <Y1–Ymin, the origin of the rotation coordinates (x,y) and the rotation angle $\theta$ are set as shown below (steps #205 and #206). The rotation direction is clockwise.

$x = (X - X1)$ $y = (Y - Ymin)$ $\theta = -\tan^{-1}(Y1 - Ymin)/(X1 - Xmin)$

By following the aforesaid conditions, the position of the document circumference which is a basis for correction and the position of reference coordinates are made to coincide at a small correction angle of 45° or less.

The coordinates (U0,V0) of the origin for image editing area are set at the origin of rotation coordinates (step #207), then after preparations are complete an image rotation is performed (steps #208 and #209), and processing returns to the main routine.

Figure 24:
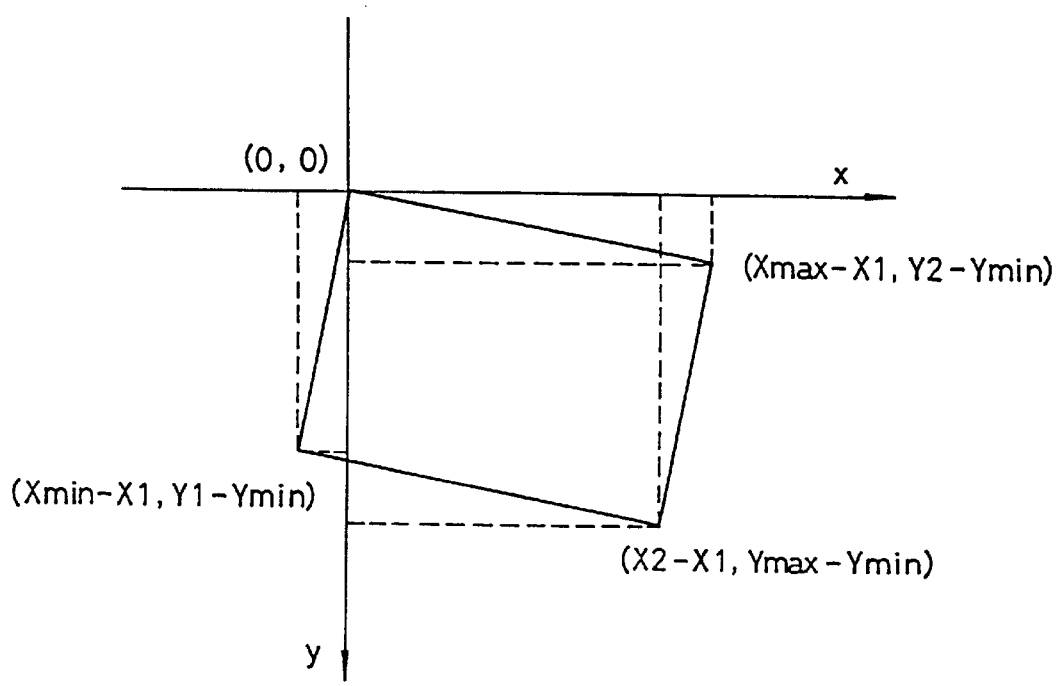
FIG. 24 is a drawing showing addresses of document areas in a new coordinate system.
Figure 26:
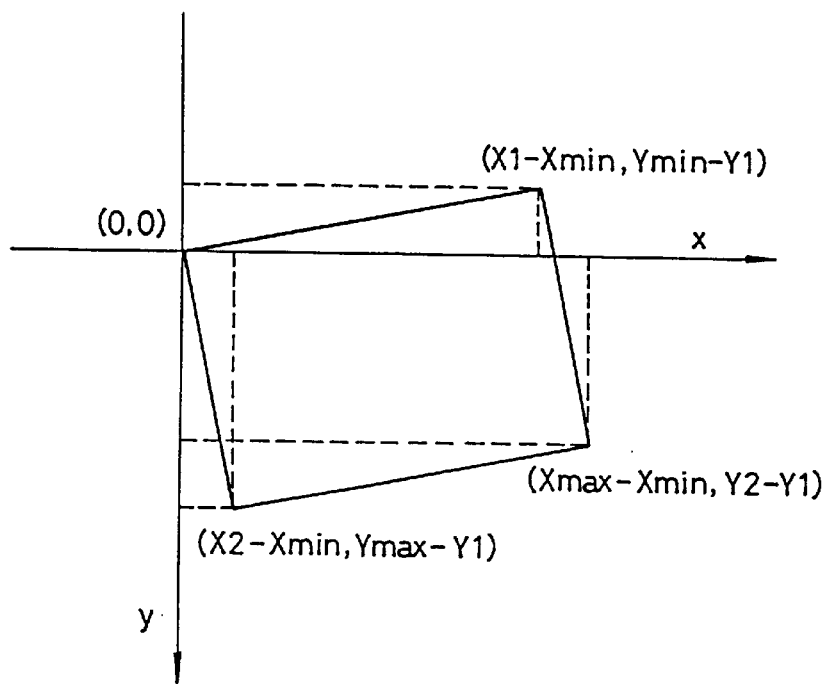
FIG. 26 is a drawing showing addresses of document areas in a new coordinate system.

When the document areas shown in FIGS. 23, 25 are expressed in new coordinates by the processing of the aforesaid step #207, they are as shown in FIGS. 24, 26 respectively.

Figure 27:
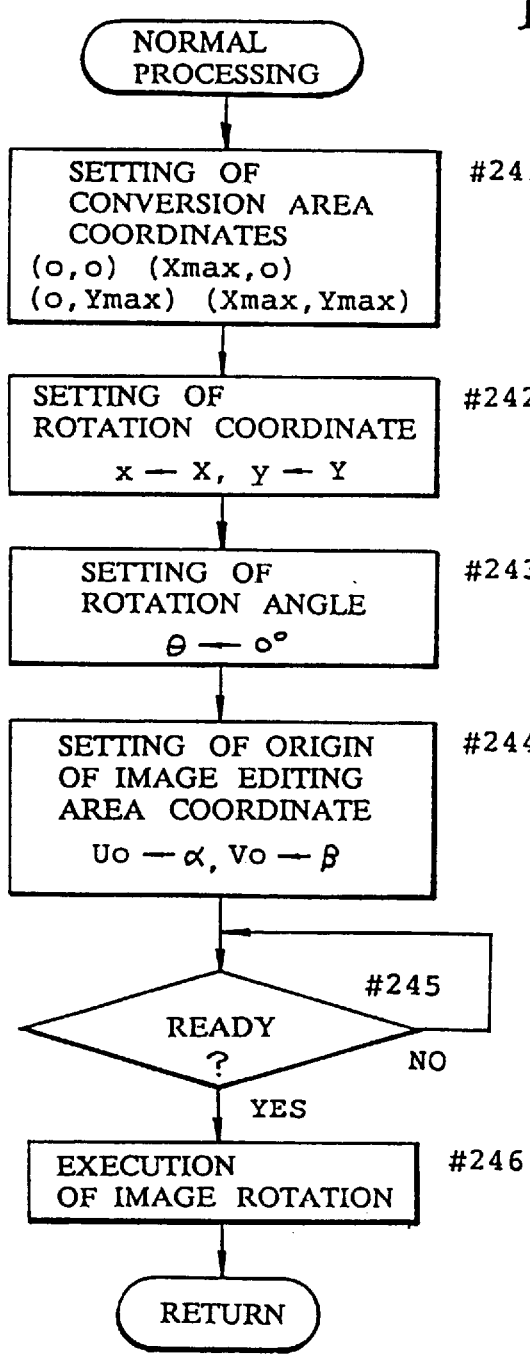
FIG. 27 is a flowchart showing details of normal processing.

FIG. 27 is a flowchart showing, in detail, the normal processing of the step #18 in the flowchart of FIG. 16. First, the coordinates of the 4 points of the maximum size of document sheet are set (step #241), the origin (x,y) of the rotation coordinates of the document image is set as the origin (0,0) of the document image, and the rotation angle $\theta$ is set to 0° (steps #242 and #243).

The coordinates (U0,V0) of the origin for image editing area are set to ($\alpha$, $\beta$) (step #244), then after preparations are complete an image rotation is performed (steps #245 and #246), and processing returns to the main routine.

Figure 28:
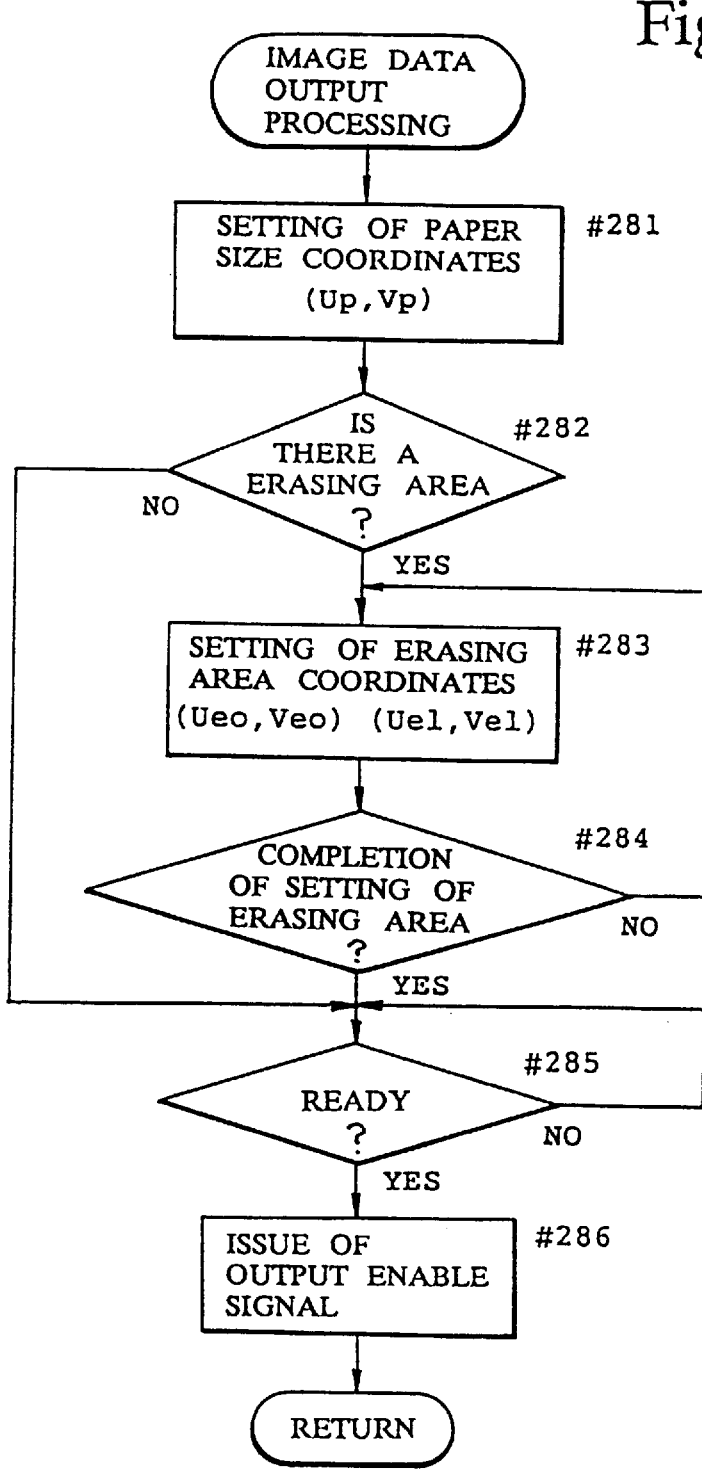
FIG. 28 is a flowchart showing details of an image data output process.

FIG. 28 is a flowchart showing, in detail, the image data output processing of the step #19 in the flowchart of FIG. 16. First, the coordinates (Up,Vp) showing paper size are set (step #281). It is determined whether or not an erase area is set (step 282). When an erase area is set, the coordinates of two points (Ue0, Ve0), (Ue1, Ve1) on the diagonals of the erase area are set (step #283), completion of erase area setting is awaited (step #284), then after preparations are complete an output enable state is set (steps #285 and #286), and processing returns to the main routine. When an erase area is not set in the determination of the step #282, processing immediately shifts to the step #285.

Embodiment 2

Next, a second embodiment of the invention will be described. According to the second embodiment, a step mode is provided as a document mode in addition to the single-sided document mode and double-sided document mode of the first embodiment. Differences from the first embodiment are input processing and document transport processing from the control panel due to the differences of document mode. As the remaining features are common to the first embodiment, they will not be described here, only the characteristic features of the second embodiment being described. Also in the second embodiment described below, the document sheet mode (thin paper mode and mixed mode) has been omitted from the discussion.

The step feed mode is a mode in which two sheets are continuously sent to the document platform. It may be applied to documents whose length in the document transport direction is ½ or less than ½ of the distance from the exposure reference position on the document platform to the nip position of the registration roller 505 of the automatic document feeder 500.

Figure 31:
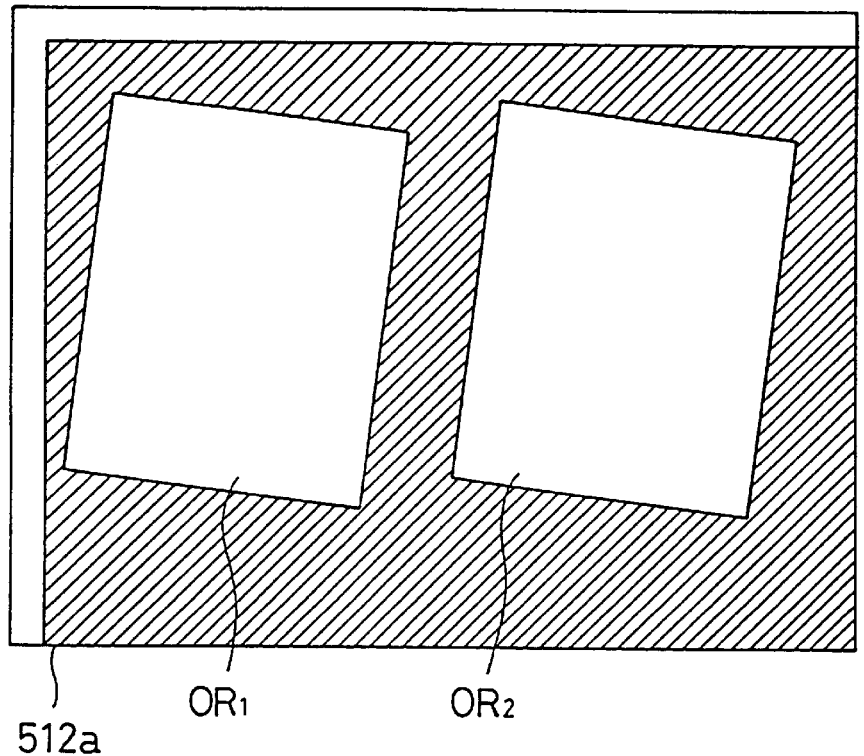
FIG. 31 is a drawing showing document sheets on a document platform according to a second embodiment.

A document sheet is set on the document feed tray 510 of the automatic document feeder 500. When the copy procedure is initiated, the sheet is transported, and as shown in FIG. 31, one edge of a first sheet OR1 is set at a slight distance away from the document scale 512a, a second sheet OR2 being set between the rear edge of the first sheet and the registration roller 505.

Figure 32:
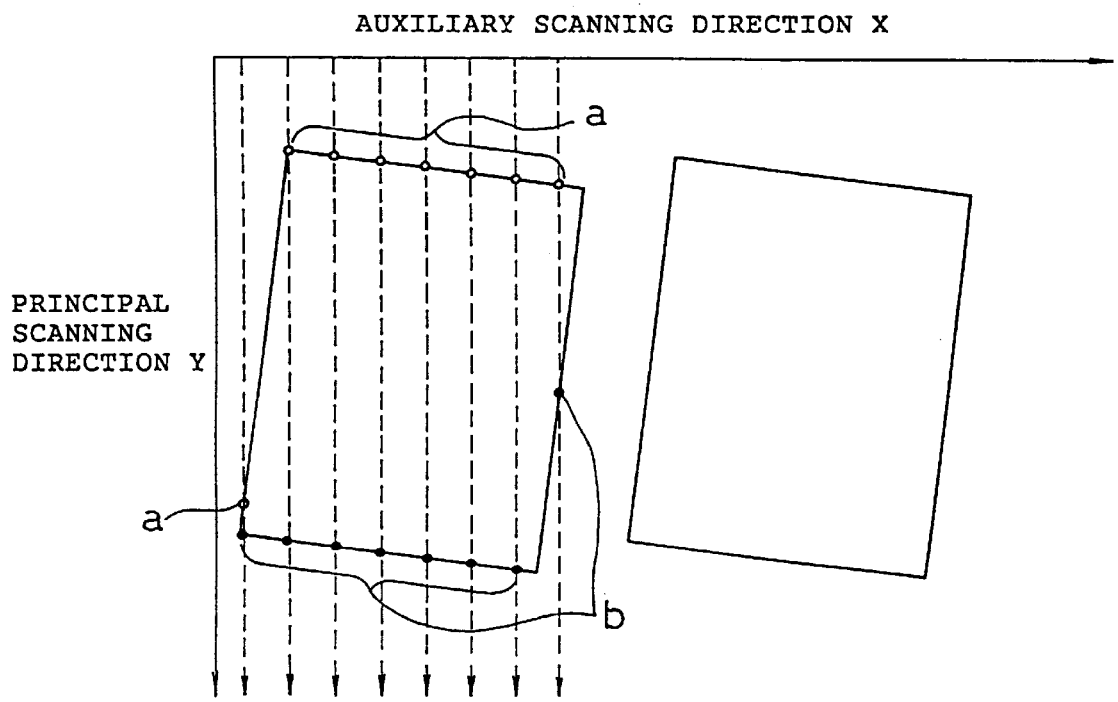
FIG. 32 is a drawing showing the scanning of a document sheet and detection of the document edge.

FIG. 32 is a diagram showing scanning of the document by a scanner. As the scanner moves in the X direction (auxiliary scanning direction), the sheet OR1 is scanned in the Y direction (principal scanning direction). An image signal is output in line units, and stored in an input page memory 103a.

At the same time, the edge of the document is detected. As shown in FIG. 32, white dots where the sheet OR1 was scanned are detected as a +EDGE in each scan line, and black dots b where a separation from the sheet OR1 was scanned are detected as a –EDGE in each scanning line. The scan line number (Xn), count value (YWm) of the +EDGE corresponding to the distance from the scan line start point to the white dots and count value (YBm) of the –EDGE from the scan line start point to the black dots, are stored in the stack memory 113 as a set of document edge detection signals.

The rotation control unit 103 determines the coordinates of the 4 corners of the document area in x–y coordinates based on the document edge detection signals in each scan line stored in the stack memory 113, and performs image rotation and editing.

When processing of the sheet OR1 is complete, the same processing is performed for the sheet OR2.

Figure 33:
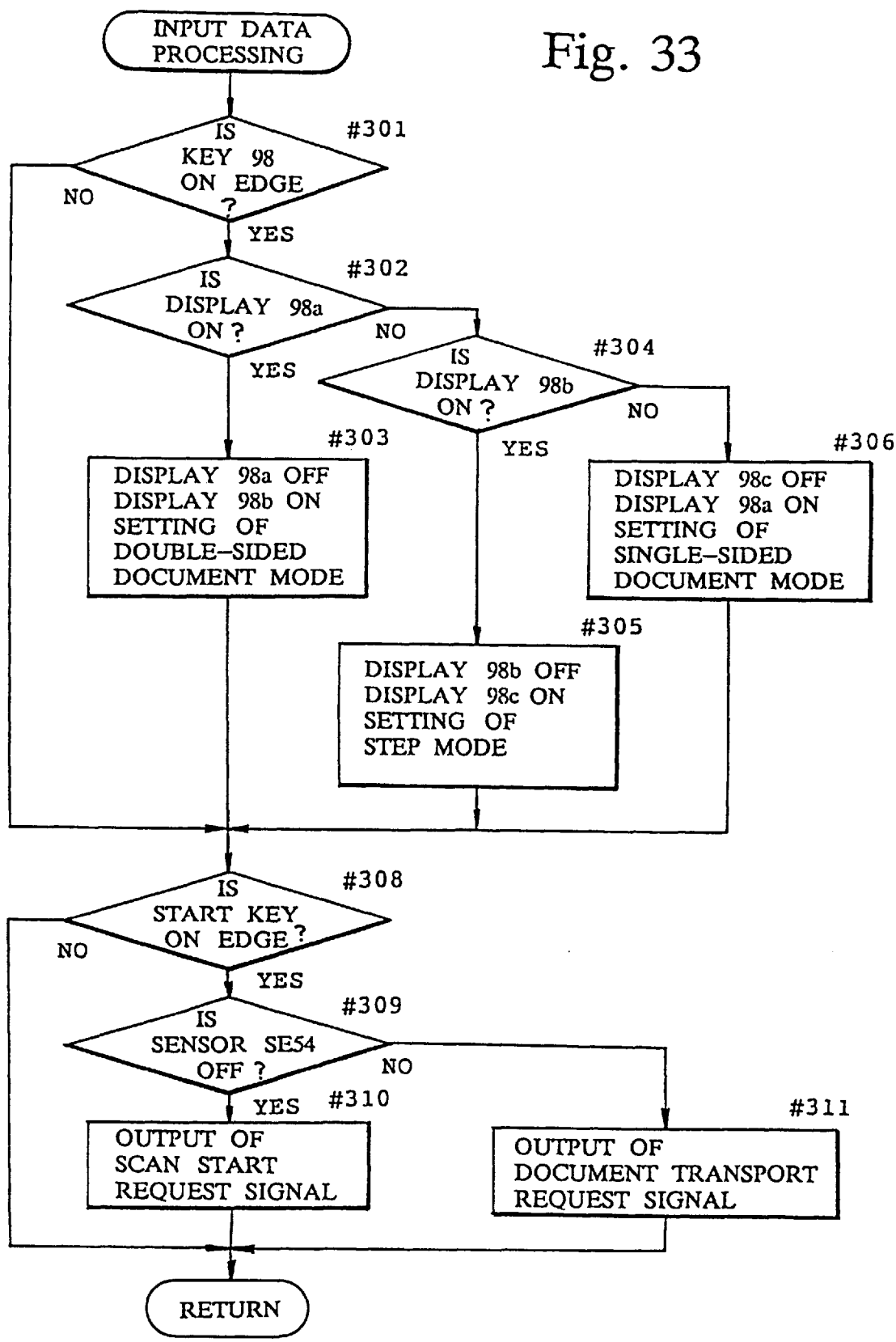
FIG. 33 is a flowchart showing details of an input data process.

FIG. 33 is a flowchart showing the details of input data processing, and showing, in detail, the step #12 of the flowchart describing the overall operation of the control system shown in FIG. 16 (the flowchart of FIG. 16 is common to the first and second embodiments).

First, the document mode setting is determined by "on edge" of the output signal of the document mode set key 98 (step #301). In the case of "on edge", the lighting state of the display 98a, which shows selection of the single-sided document mode, is determined (step #302). When it is lit, the display 98a is switched off and the display 98b is lit so that the double-sided document mode is set (step #303). When the display 98a is not lit, the lighting state of the display 98b showing selection of the double-sided document mode, is determined (step #304). When it is lit, the display 98b is switched off and the display 98c is lit so that the step mode is set (step #305). When the display 98b is not lit in the determination of the step #304, the display 98c lights which means that the step mode is set. The display 98c is therefore switched off, and the display 98a is lit so that the single-sided document mode is set (step #306).

Whether or not the start key 96, which commands start of copying, has been depressed, is determined by on edge of signal (step #308). In the case of on edge, it is determined whether or not the sensor SE54 which detects the presence or absence of documents on the document tray of the automatic document feeder is OFF (step #309). When it is OFF, a scan start request signal which commands document scanning is output (step #310) and processing returns to the main routine. When the sensor SE54 is not OFF, a document transport request signal is output to the automatic document feeder (step #312) and processing returns to the main routine.

Figure 34:
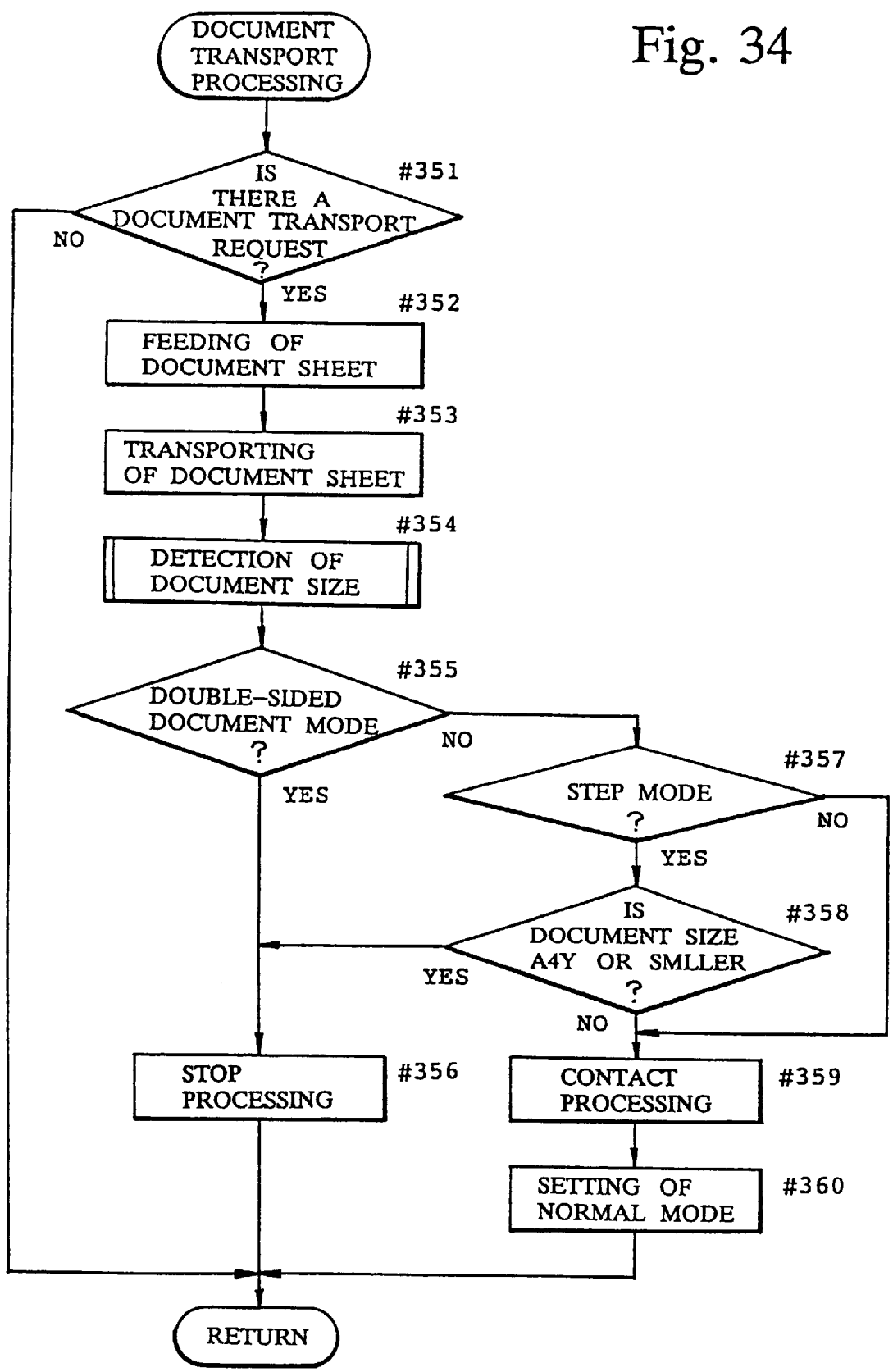
FIG. 34 is a flowchart showing details of a document transport process.

FIG. 34 is a flowchart showing the details of transport processing, and showing, in detail, the step #13 of the flowchart describing the overall operation of the control system shown in FIG. 16 (the flowchart of FIG. 16 is common to the first and second embodiments).

First, the presence or absence of the document transport request is determined (step #351). When there is a request, the document sheet is fed up to the registration roller (step #352), and transport processing is performed until the rear edge of the sheet passes the document scale 512b (step #353).

The document size is detected from the outputs of the width sensor SE53 which detects the document width, and the resist sensor SE51 (step #354).

Next, it is determined whether the doublesided document mode is set (step #355). When the double-sided document mode is set, stop processing is performed wherein the sheet is stopped just before it comes in contact with the document scale 512a (step #356), and processing returns to the main routine.

When the double-sided document mode is not set in the determination of the step #355, it is determined whether or not the step feed mode is set (step #357). When the step feed mode is set, it is determined whether or not the document size is A4Y or smaller (short side of the A4 size document is disposed parallel to the transport direction, abbreviated as A4Y) (step #358). When the document size is A4Y or smaller, the routine proceeds to a step #356, and stop processing is performed wherein the sheet is stopped just before it comes in contact with the document scale 512a.

When the step feed mode is not set in the determination of the step #357, and the document size is not A4Y or smaller in the determination of the step 358, two sheets cannot be transported onto the document platform and processed, so contact processing is performed wherein the front edge of the sheet is brought in contact with the document scale 512a (step #359), the normal mode is set (step #360), and processing returns to the main routine.

As document size detection, image area address generation, image rotation and editing are identical to the first embodiment, their description will be omitted here.

Embodiment 3

Next, a third embodiment of this invention will be described. When document sheets are repeatedly transported by the automatic document feeder for a long period, slight working errors and adjustment errors in the assembly of mechanical parts accumulate. This causes document sheets to be slanting when they are transported, so that the quality of the image formed on recording paper declines. Further, if sheets are slanting when they are transported, they tend to jam and the set position tends to slip. A service engineer may be called to perform adjustments so that the sheets are transported correctly. The third embodiment, however, corrects for the slant of the sheet by performing an image data rotation, thereby preventing decline of image quality even before performing these adjustments.

The construction of the copier, the automatic document feeder, control panel and control system are the same as in the first embodiment. These common points will therefore be omitted here, and only those features that serve to distinguish the third embodiment will be discussed.

According to the third embodiment, when the number of document sheet jams, total number of transported document sheets or cumulative detected image angle exceeds predetermined values, the image signal is electrically processed so as to correct the slant of the image.

According to the third embodiment, when the number of document sheet jams, total number of transported document sheets or cumulative detected image angle exceeds predetermined values, the document sheet OR transported by the automatic document feeder is set in a position a slight distance from the document scale 512a (or 512b), as in the case of the thin paper mode of the first embodiment. As the scanner moves in the X direction (auxiliary scanning direction), the document sheet OR is scanned in the Y direction (principal scanning direction)(see FIG. 15). The image signal is output in line units, and stored in the input page memory 103a.

Simultaneously, the document edge is detected. In other words, as shown in FIG. 15, white dots a where the document sheet OR was scanned are detected as a +EDGE in each scanning line, and black dots b where a separation from the document sheet OR was scanned are detected as a –EDGE in each scanning line. A scan line number (Xn), +EDGE count value (YWm) corresponding to the distance from the scan line origin to the white dots a and –EDGE count value (YBm) corresponding to the distance from the scan line origin to the black dots b, are stored in the stack memory 113 as a set of document edge detection signals.

The rotation control unit controller 103 determines the coordinates of the 4 corners of the document area in the x–y coordinate system, based on the document edge detection signals for each scanning line stored in the stack memory 113 as described hereinabove, and performs image rotation and editing.

Figure 35:
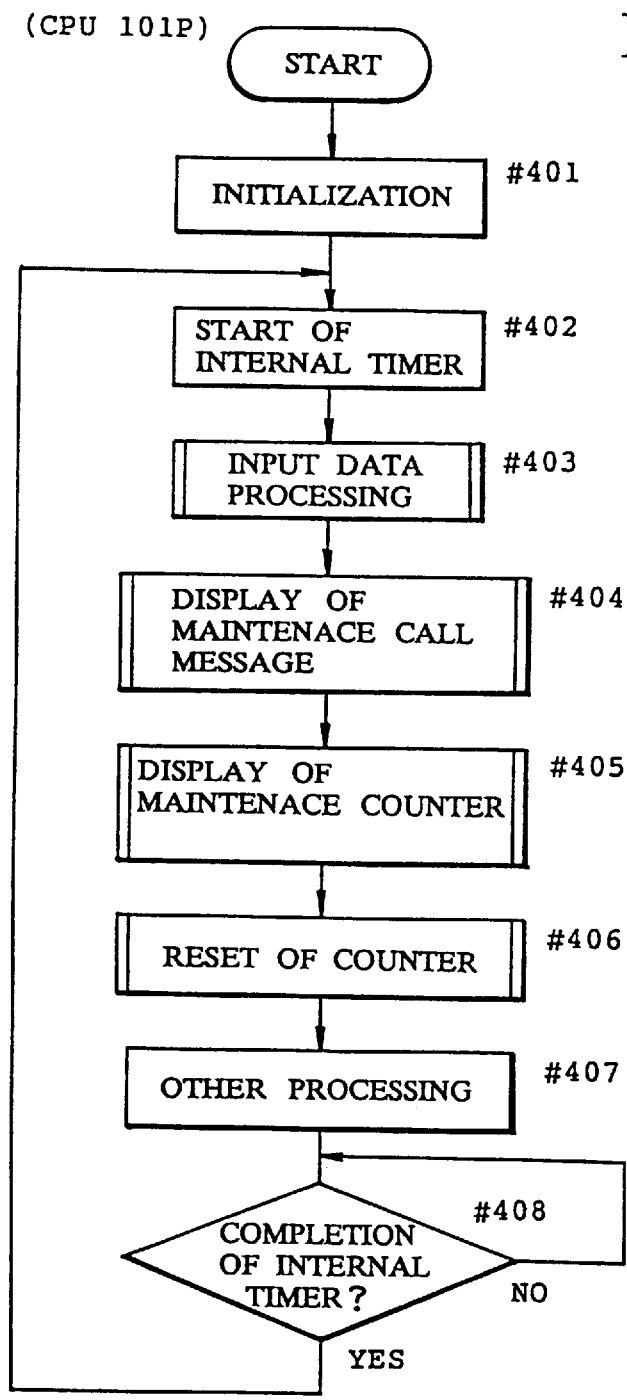
FIG. 35 is a flowchart schematically showing input/output and display processing of a control system according to a third embodiment.

FIG. 35 is a flowchart schematically showing input processing of signals received from the control panel, input processing of detection signals received from sensors and display processing of signals sent to the control panel performed by the control system CPU 101P (FIG. 3).

First, initialization is performed which initializes flags and other initial values, and timing of an internal timer which sets the processing time of 1 routine is started (steps #401 and #402).

Processing is then performed on inputs from the control panel, and on input of detection signals from sensors (step #403). Other processing includes display of maintenance call message which advise the user the need of maintenance operation according to counter values, such as a maintenance counter which counts the number of document jams, display of various counters which show the states of copier, and reset of maintenance counters (steps #404, #405, and #406).

Another control processing is also performed (step #407), counting up of the internal timer is awaited (step 408), and processing returns to the step 402. There is also other communication with the CPU, not shown in the drawings, which is performed by interrupt processing.

Figure 36:
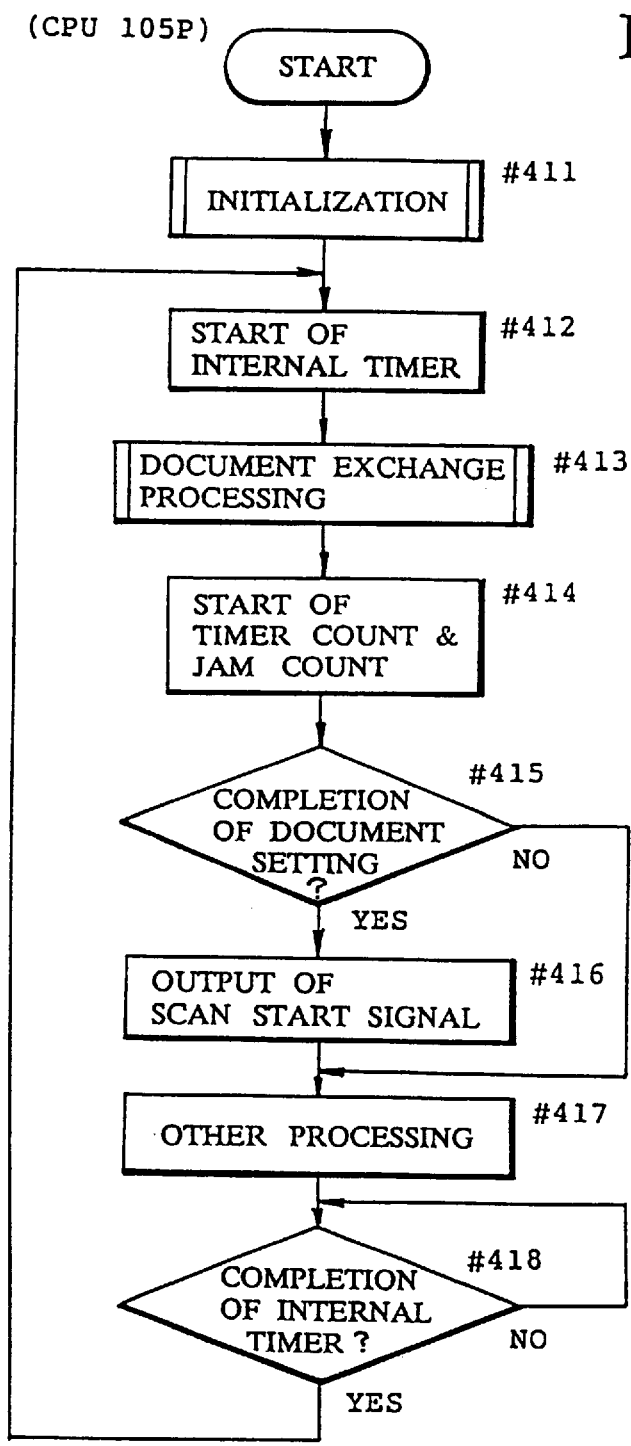
FIG. 36 is a flowchart schematically showing control processing of the document transport unit.

FIG. 36 is a flowchart schematically showing the control processing performed by a CPU 105P (FIG. 3) controlling the document transport unit 500.

First, initialization is performed which initializes flags and other initial values, and timing of an internal timer which sets the processing time of 1 routine is started (steps #411 and #412), then document sheet feed, transport and setting in a predetermined position, ejection of scanned document sheets and document exchange processing are performed (step #413).

A counting operation of a timer used for sheet transport control, and a counting operation of a jam counter which counts the number of times a document jam occurred are started (step #414), and it is determined whether or not document sheet setting is complete (step #415). When sheet setting is complete, a scanner start request signal which commands start of scanning is output (step #416), control processing of other internal mechanisms is performed (step #417), counting up of the internal timer is awaited (step #418), and processing returns to the main routine. There is also other communication with the CPU, not shown in the drawings, which is performed by interrupt processing.

Figure 37:
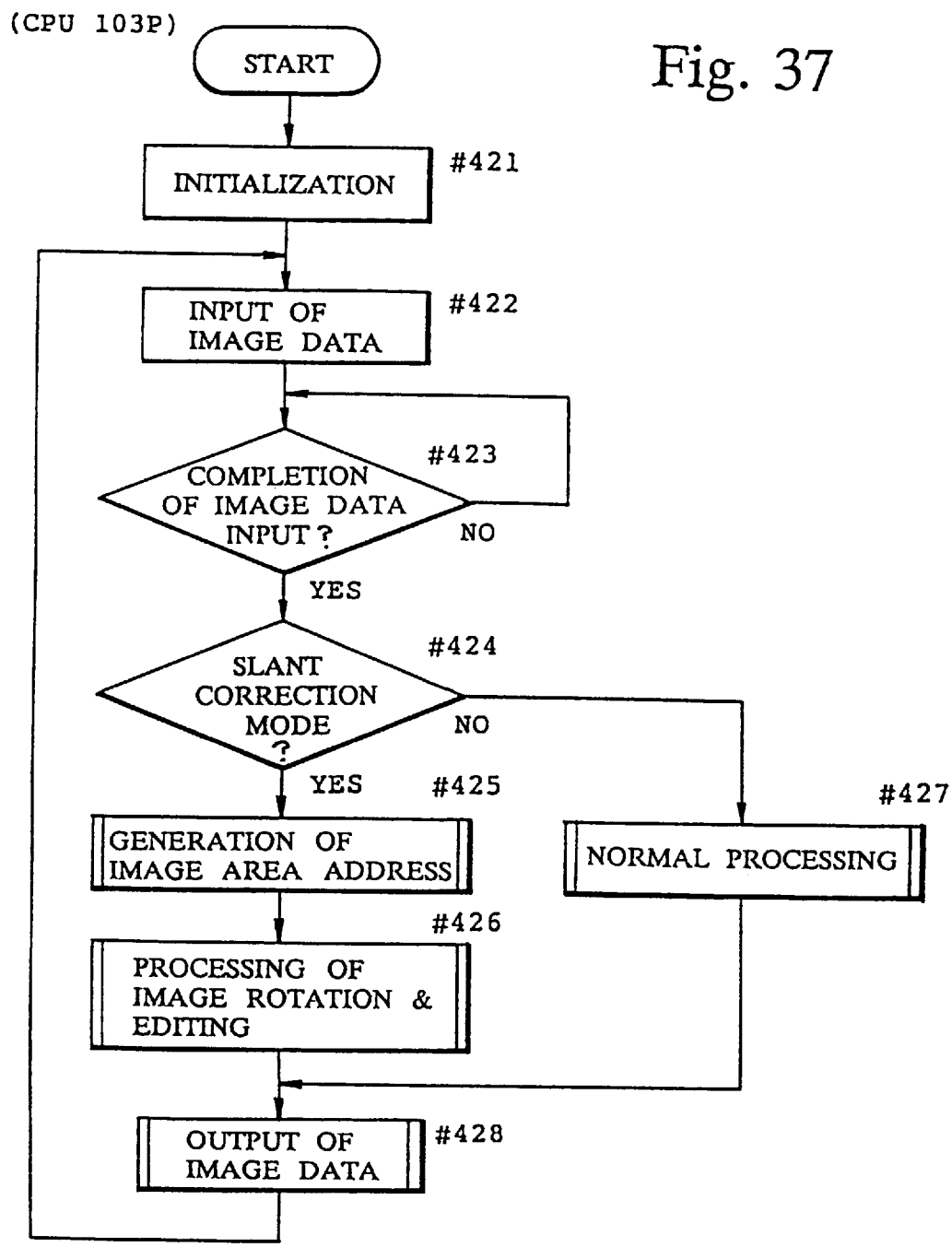
FIG. 37 is a flowchart schematically showing control processing of the rotation control unit.

FIG. 37 is a flowchart schematically showing the control processing performed by a CPU 103P (FIG. 3) controlling the rotation control unit 103.

First, after initialization which sets flags and other initial values (step #421), image data is input, and completion of image data input is awaited (steps #422 and #423). When image data input is complete, it is determined whether or not the slant correction mode is set (step #424). The slant correction mode is set by a step #507 in the flowchart of FIG. 39 described hereinafter.

When the slant correction mode is set, image address generation and image editing which specify the image area, are performed (steps #425 and #426), image data is output (step #428), and processing returns to the step #422. When the slant correction mode is not set, normal processing and image data output processing are performed (steps #427 and #428), and processing returns to the step #422.

Figure 38:
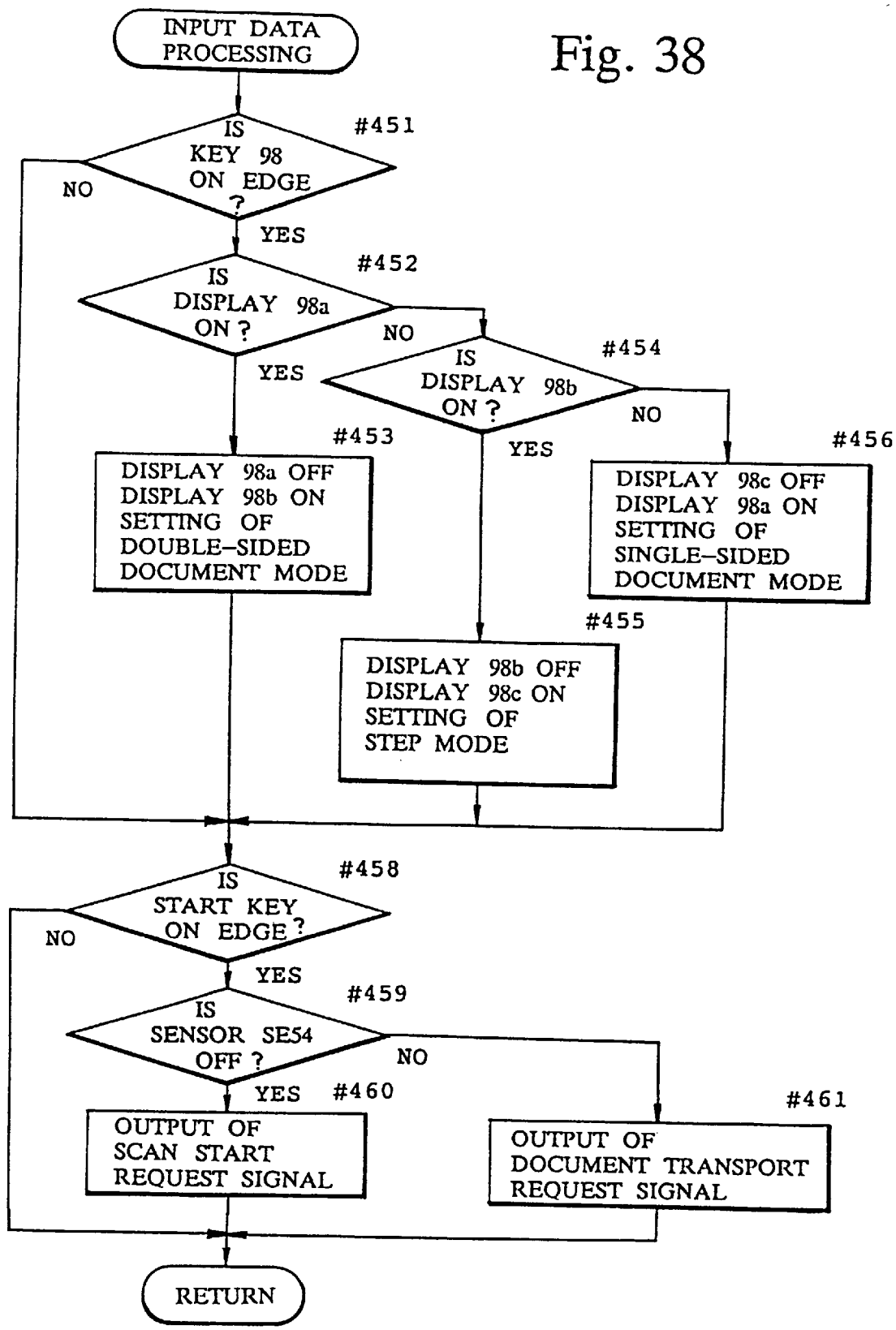
FIG. 38 is a flowchart showing details of I/O processing.

FIG. 38 is a flowchart showing, in detail, the input processing of the step #403 in the flowchart of FIG. 35.

First, the document mode setting is determined by "on edge" signal of the document mode set key 98 (step #451). In the case of "on edge", the lighting state of the display 98a, which shows selection of the single-sided document mode, is determined (step #452). When it is lit, the display 98a is switched off and the display 98b is lit so that the double-sided document mode is set (step #453). When the display 98a is not lit, the lighting state of the display 98b showing selection of the double-sided document mode, is determined (step #454). When it is lit, the display 98b is switched off and the display 98c is lit so that the step mode is set (step #455). When the display 98b is not lit in the determination of the step #304, the display 98c lights which means that the step mode is set. The display 98c is therefore switched off, and the display 98a is lit so that the single-sided document mode is set (step #456).

Whether or not the start key 96, which commands start of copying, has been depressed, is determined by on edge (step #458). In the case of on edge, the OFF state of the sensor SE54 which detects the presence or absence of documents on the document tray of the automatic document feeder is determined (step #459). When it is OFF, a scan start request signal which commands document scanning is output (step #460) and processing returns to the main routine. When the sensor SE54 is not OFF, a document transport request signal is output to the automatic document feeder (step #461) and processing returns to the main routine.

Figure 39:
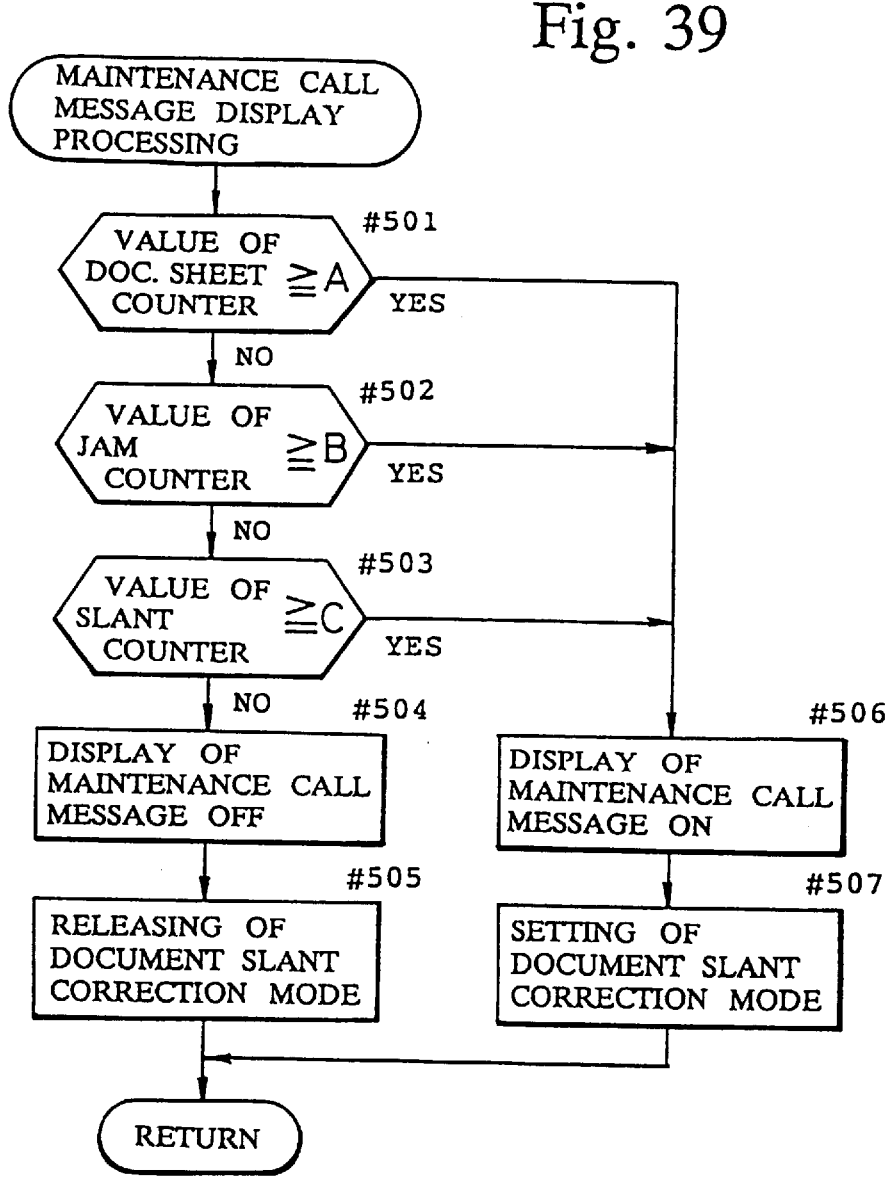
FIG. 39 is a flowchart showing details of a maintenance call display process.

FIG. 39 is a flowchart showing, in detail, the maintenance call message display processing of the step #404 in the flowchart of FIG. 35.

First, it is determined whether or not the count value of the document sheet counter which counts the number of document sheets processed is equal to or greater than a set value A (e.g. 30,000) (step #501). When the count value of the document sheet counter is not equal to or greater than the set value A, it is determined whether or not the count value of the jam counter which counts the number of document sheets jammed, is equal to or greater than a set value B (e.g. 50) (step #502). When the count value of the jam counter is not equal to or greater than the set value B, it is determined whether or not the count value of a slant counter which counts the cumulative slant angles of documents, is equal to or greater than a set value C (e.g. 5000) (step #503).

When the count value of the slant counter is not equal to or greater than the set value C, the number of document sheets processed, the number of documents jammed and cumulative value of document slant angles are all less than the set values, so the maintenance call message display on a liquid crystal touch panel 91 (FIG. 2) is switched OFF and the document slant correction mode is released (steps #504 and #505).

Figure 52A:
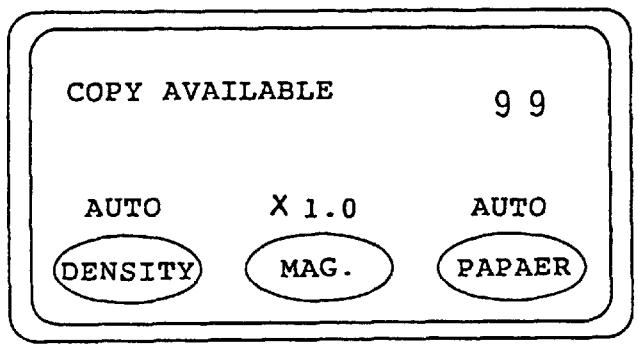
FIG. 52(a), FIG. 52(b), and FIG. 52(c) ar e drawings showing typical displays on an operating panel.
Figure 52B:
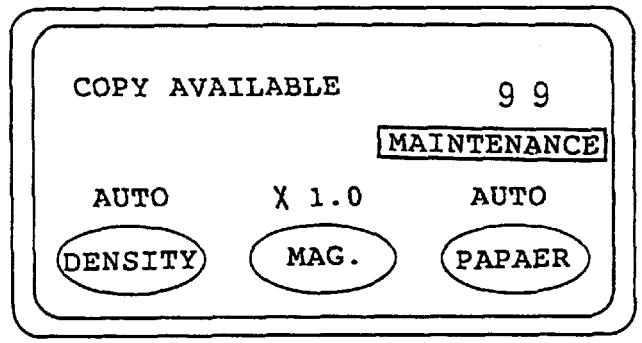

When the number of documents processed is equal to or greater than A in the step 501, the number of document sheets jammed is equal to or greater than B in the step #502, or the cumulative value of document slant angles is equal to or greater than C in the step 503, the maintenance call message display on the liquid crystal touch panel 91 (FIG. 2) is switched ON, and the document slant correction mode is set (steps #605 and #507). The display state of the liquid crystal touch panel 91 is shown in FIG. 52(b).

The counting operation of the document sheet counter (see step #501) is executed in a step #615 of the flowchart of FIG. 46 described hereinafter. The counting operation of the jam counter (see step #502) is executed in a step #629 of the flowchart of FIG. 46 and a step #710 of the flowchart of FIG. 50 described hereinafter. The counting operation of the slant counter (see step #503) which counts the cumulative value of document slant angles, is executed in a step #810 of the flowchart of FIG. 51 described hereinafter.

Figure 40:
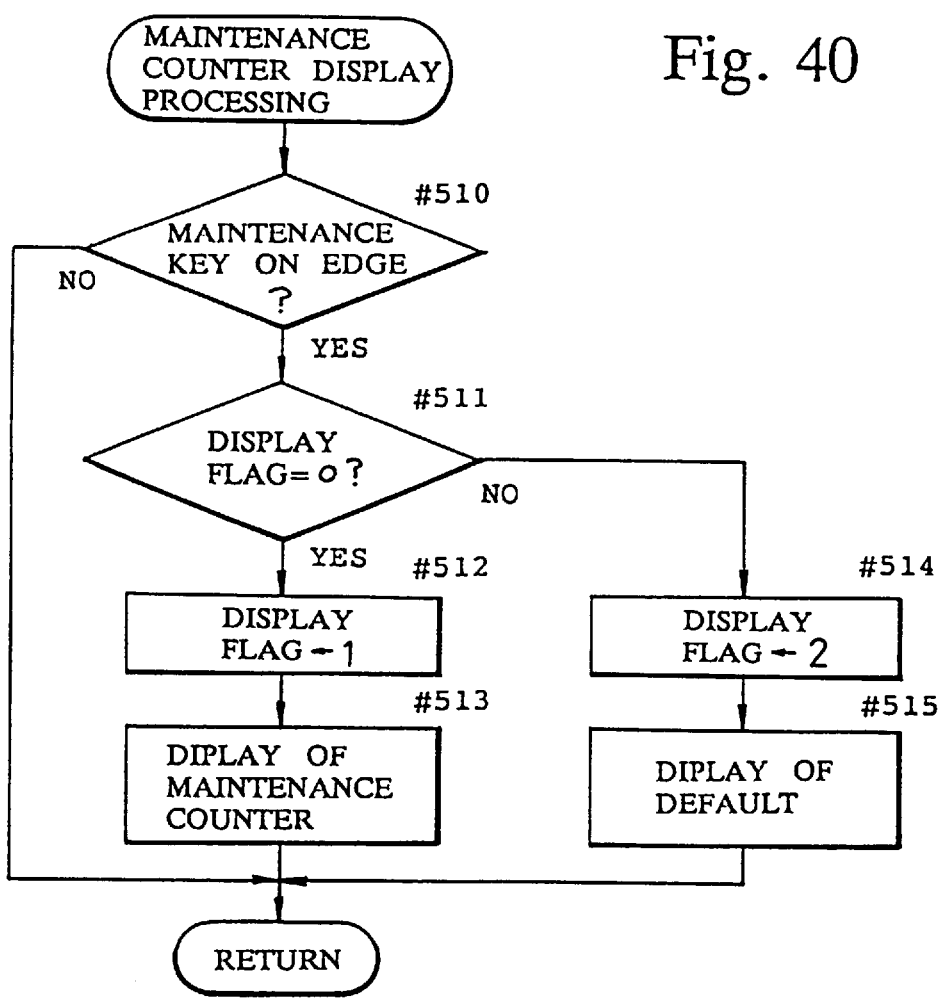
FIG. 40 is a flowchart showing details of a maintenance counter display process.

FIG. 40 is a flowchart showing, in detail, the maintenance counter display processing of the step #405 in the flowchart of FIG. 35.

Figure 52C:
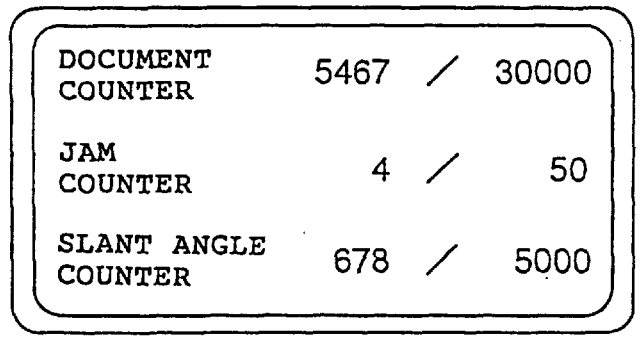

First, on edge of a signal issued from a maintenance key on the control panel, not shown, is determined, and it is determined whether or not the maintenance key has been operated (step #510). When the maintenance key has been operated (on edge), the state of a display flag showing a maintenance counter display is determined (step #511). When the display flag is "0", the flag is set to 1, and the maintenance counter is displayed on the liquid crystal panel 91 (FIG. 2) (steps #512 and #513). The display states of the maintenance counter on the panel 91 are shown in FIG. 52(c).

When the display flag is not 0 in the determination of the step #511, the flag is set to "0", and a default display is shown on the panel 91 (FIG. 2) (steps #514 and #515). The default display on the panel 91 is shown in FIG. 52(a).

Figure 41:
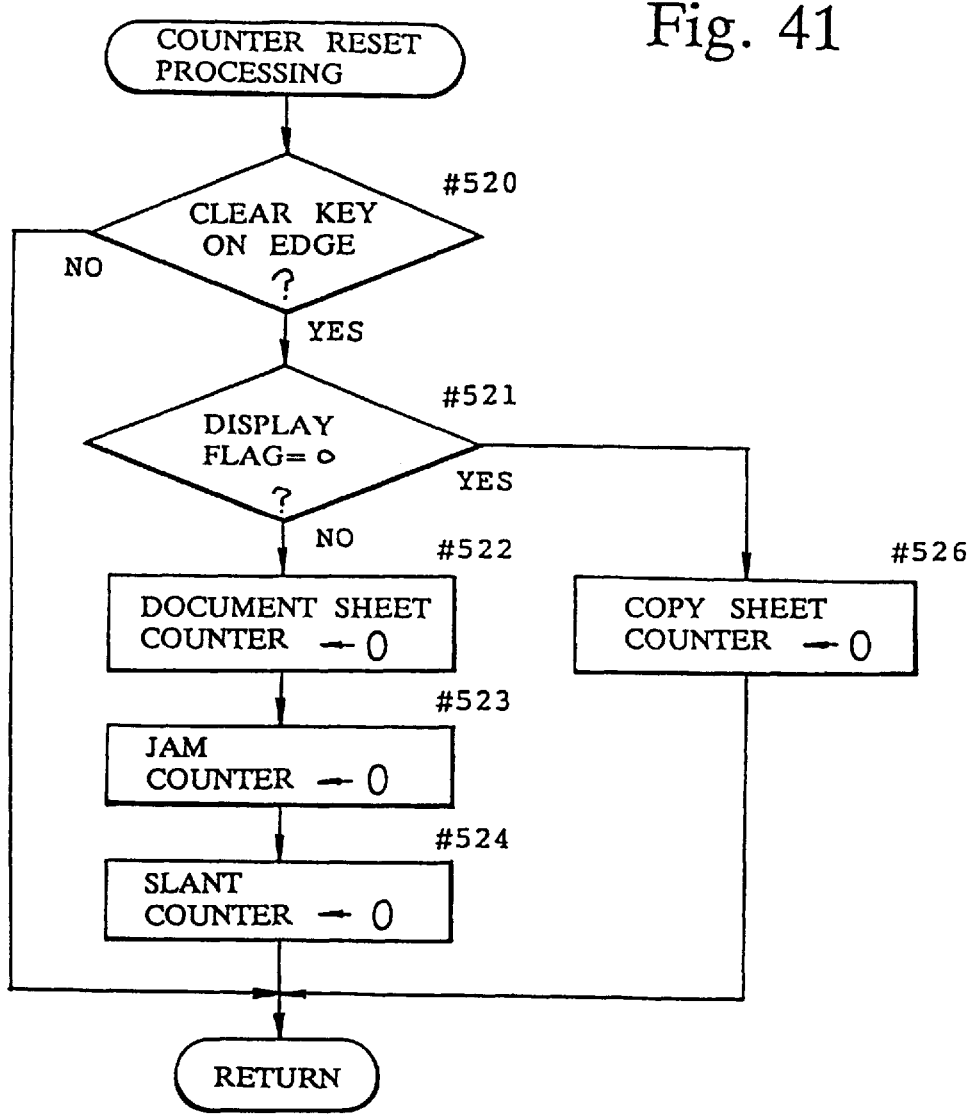
FIG. 41 is a flowchart showing details of a counter reset process.

FIG. 41 is a flowchart showing, in detail, the counter reset processing of the step #406 in the flowchart of FIG. 35.

First, on edge signal issued from a clear key 93 on the operating panel is determined, and it is determined whether or not the clear key has been operated (step #520). When the clear key has been operated (on edge), the state of the display flag showing the maintenance counter display is determined (step #521). When the display flag is not 0 it indicates that the display state is active, so the document sheet counter, jam counter and slant counter are reset (steps #522, #523, and #524), and processing returns to the main routine. When the display flag is 0 in the determination of the step #521, the copy sheet counter is reset (step #526), and processing returns to the main routine.

Next, transport of document sheets by the automatic document feeder will be described. A plurality of timers are used to set the timing of transport processing. Types of timers and their functions will now be discussed.

A timer T1 is a timer which sets the time from when the front edge of a document sheet passes the registration sensor SE51, and the sensor SE51 switches ON to when the orientation of the front edge changes so as to form a loop.

A timer T2 is a timer which sets the time from when the rear edge of a document sheet passes the registration sensor SE51, and the sensor SE51 switches OFF to when the rear edge travels beyond the magnetic scale 512b.

A timer T3 is a timer which sets the time from when the rear edge of a document sheet travels beyond the magnetic scale 512b and transport stops, to when the sheet is transported in the reverse direction so that the rear edge comes in contact with the scale 512b.

A timer T4 is a timer which sets the time at which ejection is completed after the rear edge of the document sheet passed the ejection sensor SE52 and the sensor SE52 switched OFF.

A jam timer JT1 is a timer which detects the jams occurring in this interval, based on a reference transport time from document sheet feed start to when the front edge of the document sheet reaches the registration sensor SE51 (a jam being deemed to occur when the sheet does not reach the resist sensor SE51 within the reference transport time).

A jam timer JT2 is a timer which detects the jams occurring in this interval, based on a reference transport time from starting of document sheet conveying operation by the document sheet transport belt 506 to when the rear edge of the document sheet passes the registration sensor SE51 and the sensor SE51 switches OFF.

A jam timer JT3 is a timer which detects the jams occurring in this interval, based on a reference transport time from when the document sheet transport belt 506, inversion roller 507 and ejection roller 509 switch ON and starting of document sheet conveying operation, to when the front edge of the sheet reaches the ejection sensor SE52.

A jam timer JT4 is a timer which detects the jams occurring in this interval, based on a reference transport time from when the front edge of the document sheet reaches the ejection sensor SE52 to when its rear edge passes the ejection sensor SE52.

Figure 42:
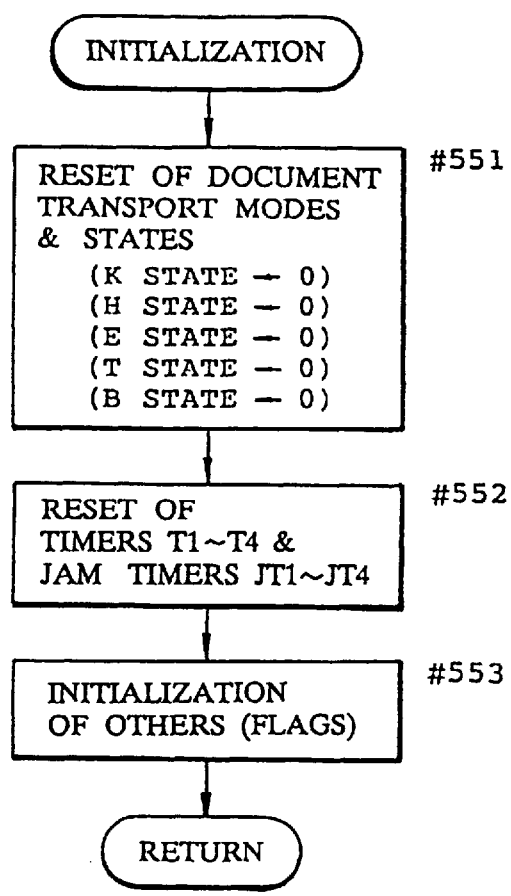
FIG. 42 is a flowchart showing details of an initialization process.

FIG. 42 is a flowchart showing the detail of the initialization of the step #411 in the flowchart of FIG. 36.

The transport mode showing the document transport state and states (K, H, E, T, B) specifying a processing sequence are reset, the timers T1 to T4 are reset, the jam timers JT1 to JT4 are reset (steps #551, 552), other flags are initialized (step #553), and processing returns to the main routine.

Figure 43:
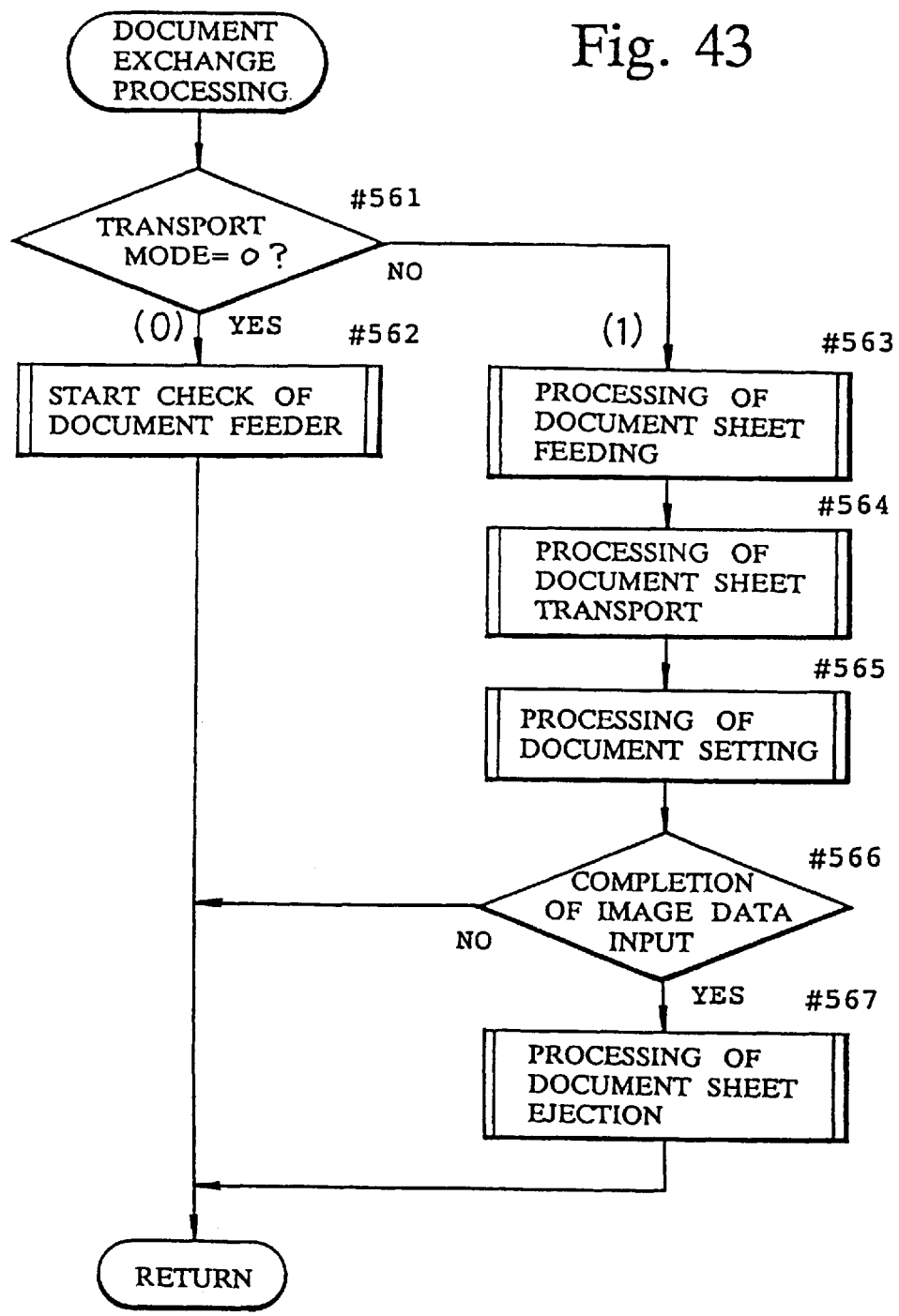
FIG. 43 is a flowchart showing details of a document exchange process.

FIG. 43 is a flowchart showing the detail of the document exchange processing of the step #413 in the flowchart of FIG. 36.

The transport mode is determined (step #561). When the transport mode is 0 it indicates that document exchange has been initiated, so a start check is performed on the automatic document feeder (step #562), and processing returns to the main routine. When the transport mode is 1, document sheet feeding, transporting and setting are performed (steps #563, #564, and #565), and it is determined whether or not image data input has been completed (step #566). When image data input is not complete, processing immediately returns to the main routine. Further, when image data input has been completed, document sheet ejection is performed (step #567) and processing returns to the main routine.

Figure 44:
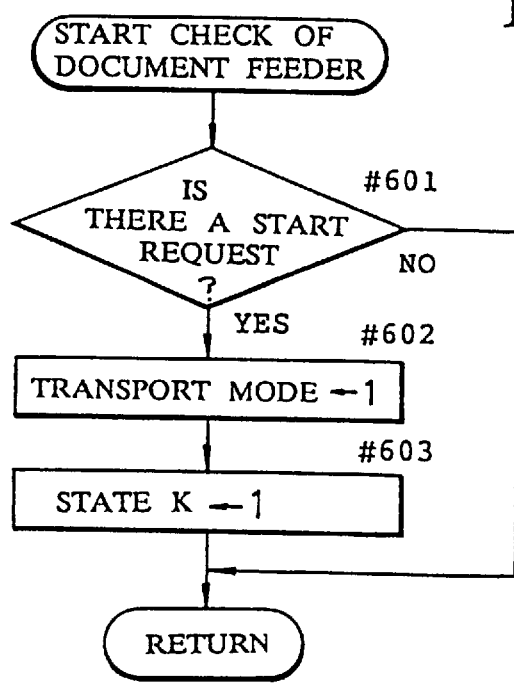
FIG. 44 is a flowchart showing details of a start check process.

FIG. 44 is flowchart showing, in detail, the start check of the step #562 in the flowchart of FIG. 43. The presence or absence of a start request is determined (step #601). When there is a start request, the transport mode is set to 1, the number of the state K is set to 1 (steps #602 and #603), and processing returns to the main routine. When there is no start request, processing immediately returns to the main routine.

Figure 45:
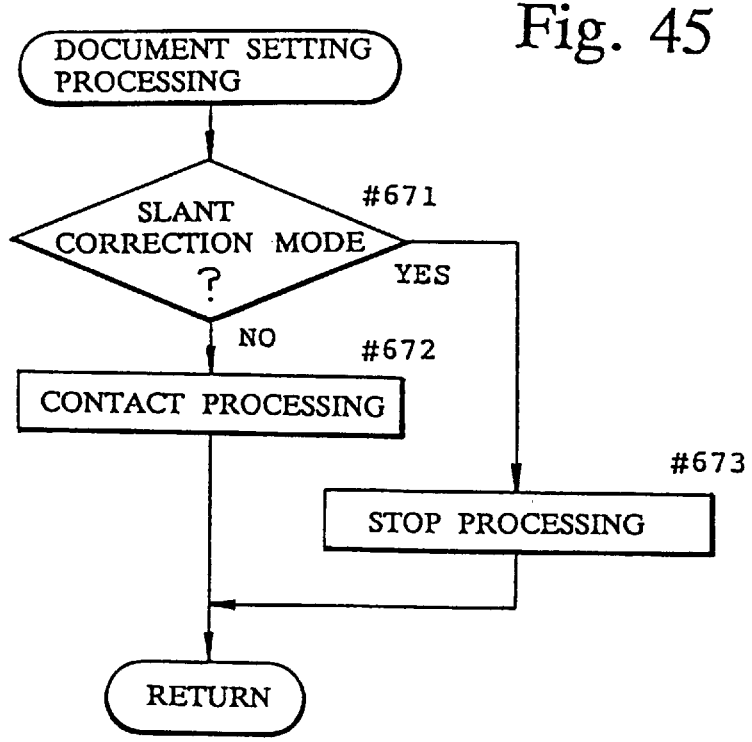
FIG. 45 is a flowchart showing details of a document setting process.

FIG. 45 is a flowchart showing, in detail, the processing of document setting of the step #565 in the flowchart of FIG. 43. It is determined whether or not the slant correction mode which corrects document slant (see FIG. 39, step #507) is set (step #671). When the slant correction mode is not set, contact processing is performed wherein the rear edge of the sheet is brought in contact with the document scale 512b (step #672). When the slant correction mode is set, stop processing is performed wherein the front edge of the sheet is stopped at a position slightly away from the document scale 512b (step #673), and processing returns to the main routine.

Figure 46:
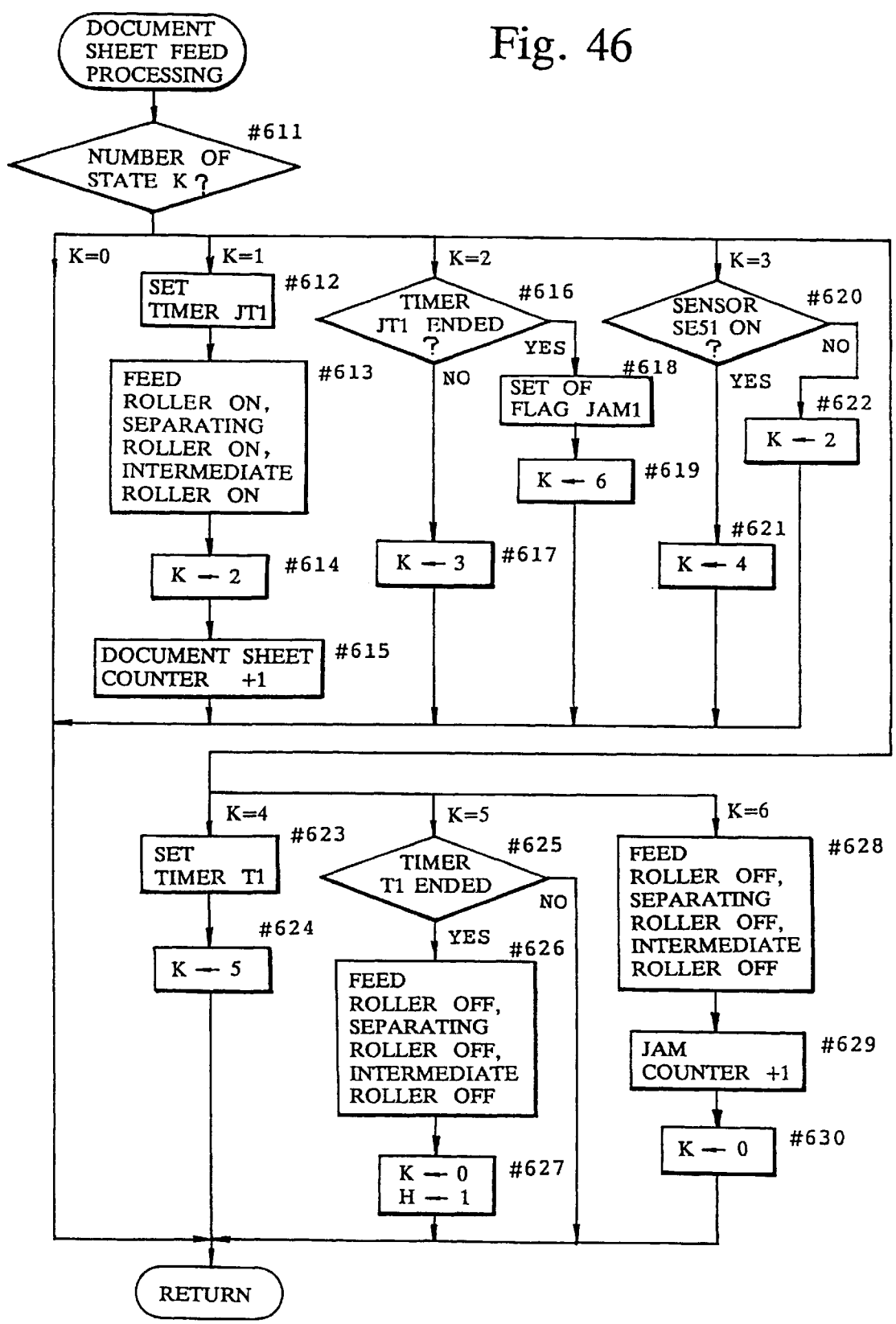
FIG. 46 is a flowchart showing details of a paper feeding process.

FIG. 46 is a flowchart showing, in detail, the document sheet feed processing of the step #563 in the flowchart of FIG. 43.

First, the number of the state K is determined (step #611), and processing is performed corresponding to this number, from state K=0 to state K=6, as described hereinafter.

When state K=0, no other processing is performed, and processing returns to the main routine.

When state K=1, the jam timer JT1 is set and timing starts (step #612). The document feed roller, separating roller and intermediate roller are switched ON and start driving operation, the state K=2 is set, the document sheet counter is incremented by 1 (steps #613, #614, and #615), and processing returns to the main routine.

When state K=2, it is determined whether or not timing by the jam timer JT1 has ended (step #616). When timing has not ended, the state K=3 is set (step #617). When timing has ended, it means that a jam has occurred, jam flag jam 1 which is a flag showing the jam position is set, the state K=6 is set (steps #618 and #619), and processing returns to the main routine.

When state K=3, the state of the registration sensor SE51 which detects the sheet, is determined (step #620). When this sensor is ON, the state K=4 is set, when the sensor is not ON, the state K=2 is set (steps #621 and #622), and processing returns to the main routine.

When state K=4, the timer T1 is set, timing is started (step #623), the state K=5 is set (step #624) and processing returns to the main routine.

When state K=5, it is determined whether or not timing by the timer T1 has ended (step #625). When timing has ended, it means that normal paper feed is complete, so the paper feed roller, separating roller and intermediate roller are switched OFF to stop driving the mechanism, the states K=0 and H=1 are set (steps #626 and #627), and processing returns to the main routine. When timing has not ended in the determination of the step #625, processing immediately returns to the main routine.

When state K=6, a jam has occurred, so the paper feed roller, separating roller and intermediate roller are switched OFF to stop driving the mechanism (step #628), the jam counter is incremented by 1, the state K=0 is set (steps #629 and #630), and processing returns to the main routine.

Figure 47:
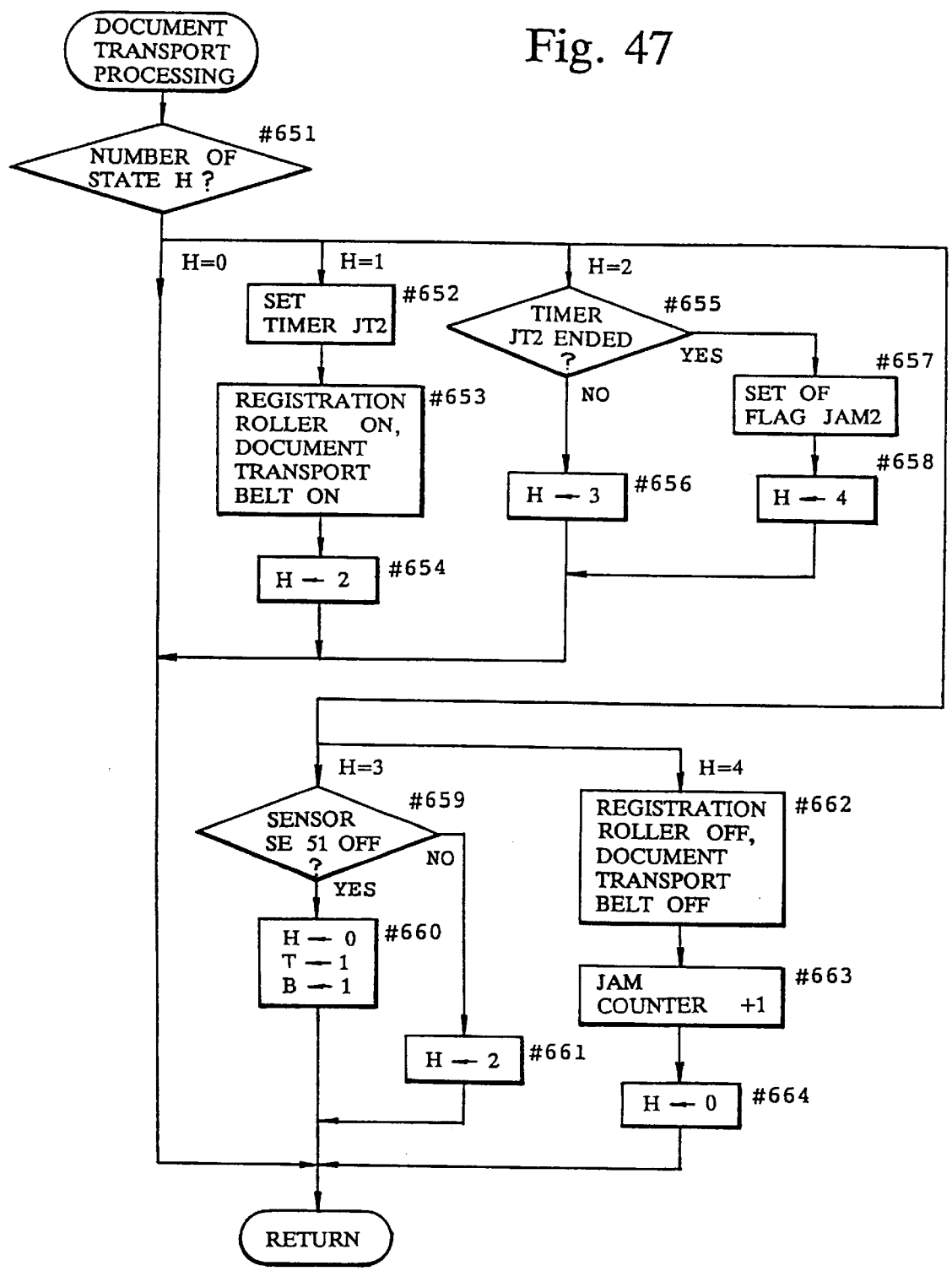
FIG. 47 is a flowchart showing details of a document transport process.

FIG. 47 is a flowchart showing, in detail, the document sheet transport processing of the step #564 in the flowchart of FIG. 43.

First, the number of the state H is determined (step #651), and processing is performed corresponding to this number, from state H=0 to state H=4, as described hereinafter.

When state H=0, no other processing is performed, and processing returns to the main routine.

When state H=1, the jam timer JT2 is set and timing starts (step #652). The registration roller and document transport belt are switched ON to start driving operation, the state H=2 is set (steps #653 and #654), and processing returns to the main routine.

When state H=2, it is determined whether or not timing by the jam timer JT2 has ended (step #655). When timing has not ended, the state H=3 is set (step #656). When timing has ended, it means that a jam has occurred, so jam flag jam 2 which is a flag showing the jam position is set, the state H=4 is set (steps #657 and #658), and processing returns to the main routine.

When state H=3, the state of the registration sensor SE51 which detects the sheet, is determined (step #659). When this sensor is OFF, it means that normal transport is complete, so the states H=0, T=1, B=1 are set (step #660). When this sensor is not OFF, the state H=2 is set (step #661), and processing returns to the main routine.

When state H=4, a jam has occurred, so the registration roller and document transport belt are switched OFF to stop driving operation, the jam counter is incremented by 1, the state H=0 is set (steps #662, #663, and #664) and processing returns to the main routine.

Figure 48:
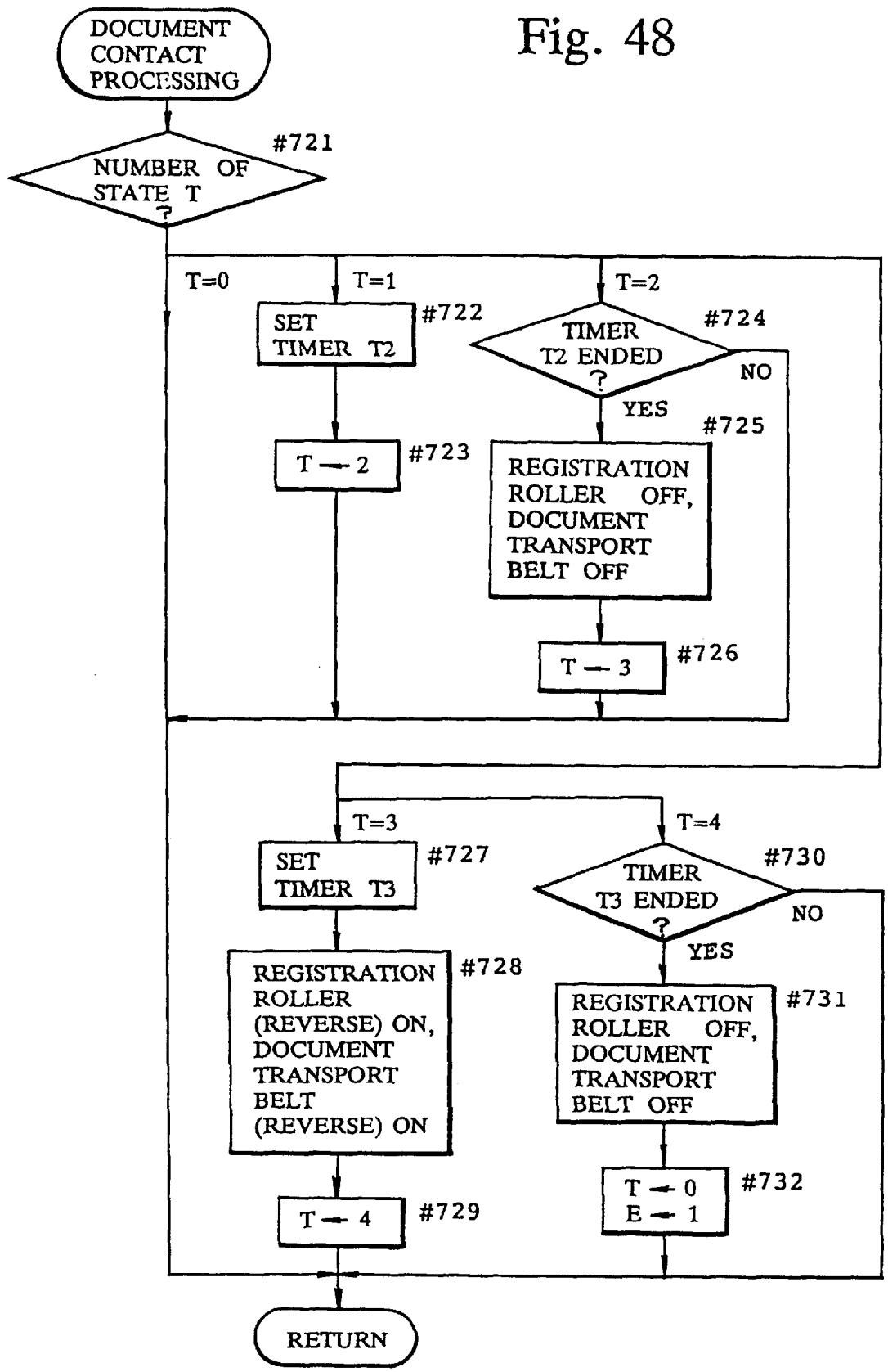
FIG. 48 is a flowchart showing details of a document contact process.

FIG. 48 is a flowchart showing the detail of the document sheet contact processing of the step #672 in the flowchart of FIG. 45.

First, the number of the state T is determined (step #721), and processing is performed corresponding to this number, from T=0 to T=4, as described hereinafter.

When state T=0, no other processing is performed, and processing returns to the main routine.

When state T=1, the timer T2 is set, timing is started, the state T=2 is set (steps #722 and #723), and processing returns to the main routine.

When T=2, it is determined whether or not timing by the timer T2 has ended (step #724). When timing has ended, it means that the rear edge of the sheet has passed the document scale, so the registration roller and the transport belt are switched OFF to stop driving operation, the state T=3 is set (steps #725 and #726), and processing returns to the main routine. When timing has not ended in the determination of the step #724, processing immediately returns to the main routine.

When state T=3, the timer T3 is set and timing begins (step #727), and as the rear edge of the sheet contacts the document scale, the registration roller and document transport belt are reversed, the state T=4 is set (steps #728 and #729) and processing returns to the main routine.

When state T=4, it is determined whether timing by the timer T3 has ended (step #730). When timing has ended, it indicates the end of contact processing, so the resist roller and document transport belt are switched OFF to stop reverse drive, the states T=0 and E=1 are set (steps #731 and #732), and processing returns to the main routine. When it is determined that timing has ended in the determination of the step #730, processing immediately returns to the main routine.

Figure 49:
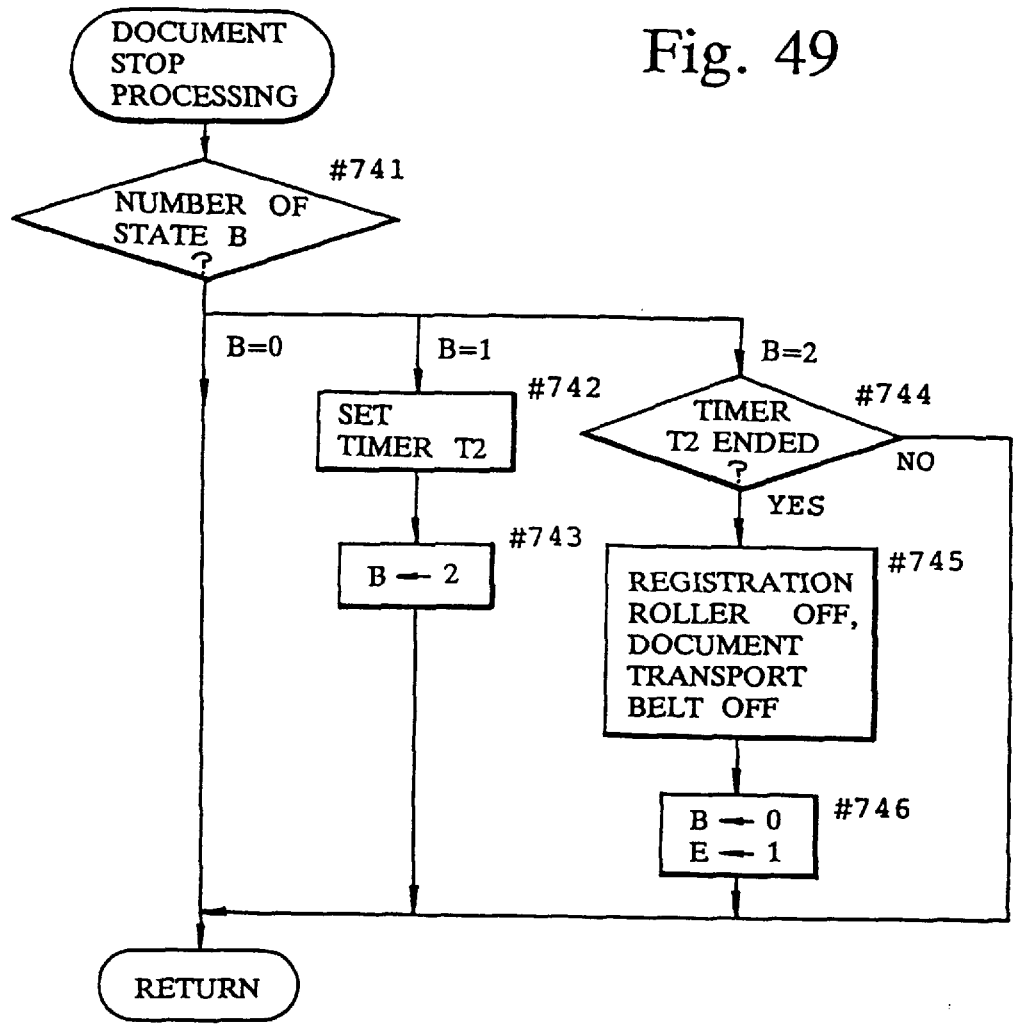
FIG. 49 is a flowchart showing details of a document stop process.

FIG. 49 is a flowchart showing, in detail, the document sheet stop processing of the step #673 in the flowchart of FIG. 45.

First, the number of a state B is determined (step #741), and processing is performed corresponding to this number, from state B=0 to state B=2, as described hereinafter.

When state B=0, no other processing is performed, and processing returns to the main routine.

When state B=1, the timer T2 is set, timing is started, the state B=2 is set (steps #742 and #743), and processing returns to the main routine.

When state B=2, it is determined whether or not timing by the timer T2 has ended (step #744). When timing has ended, it means that the rear edge of the sheet has passed the document scale, so the registration roller and the transport belt are switched OFF to stop driving operation, the states B=0 and E=1 are set (steps #745 and #746), and processing returns to the main routine. When timing has not ended in the determination of the step #744, processing immediately returns to the main routine.

Figure 50A:
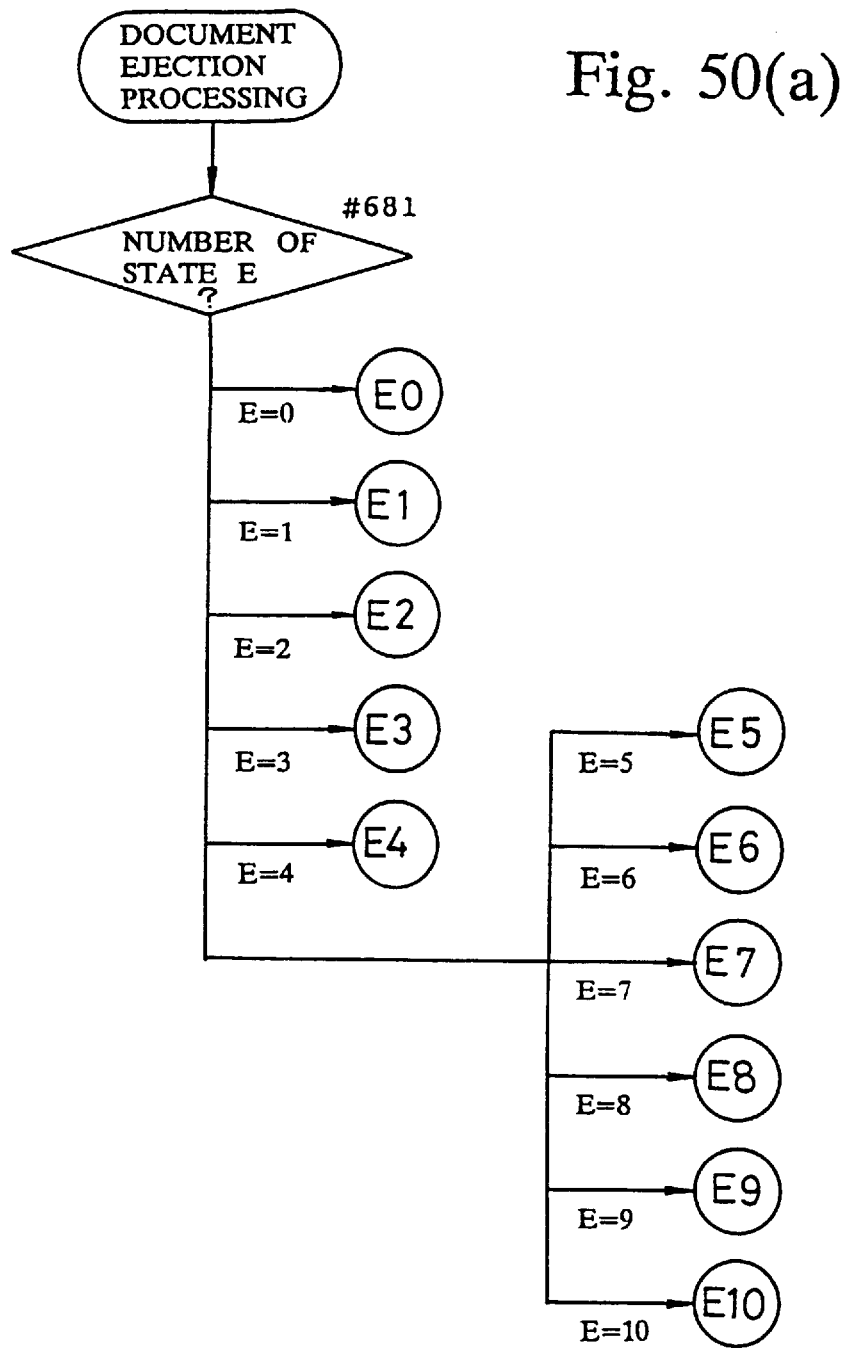
Figure 50B:
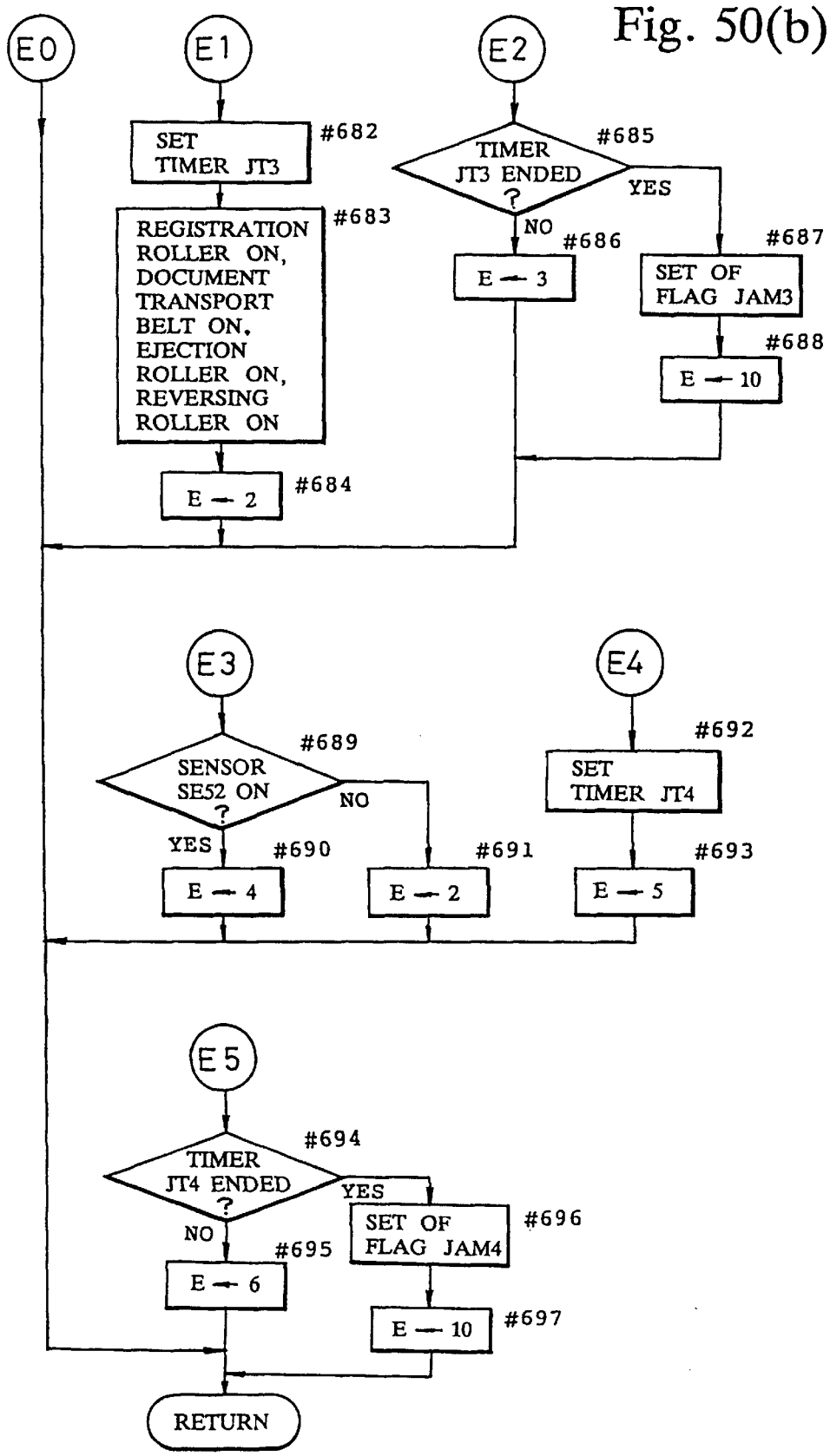
Figure 50C:
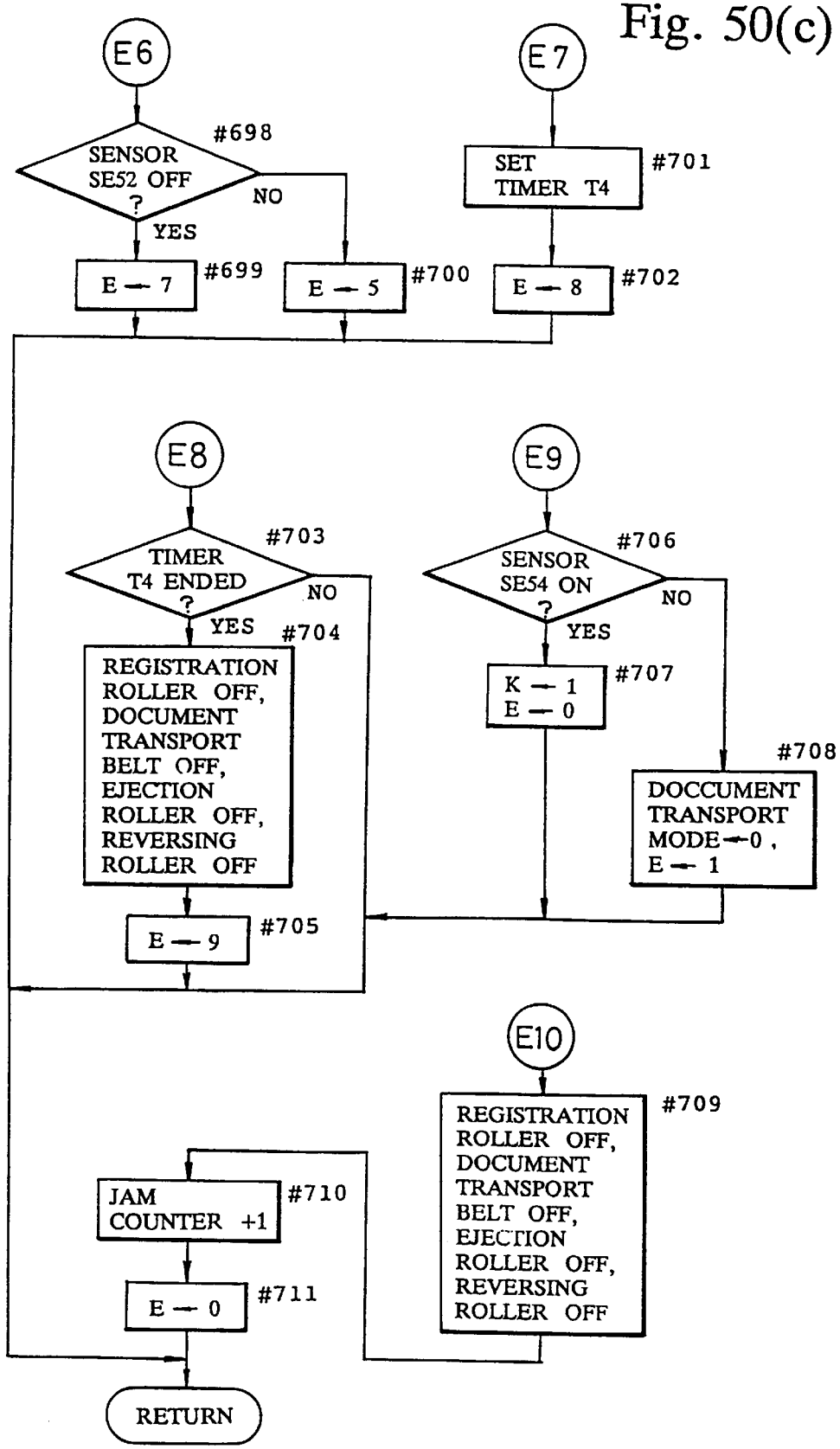

FIGS. 50(a), 50(b), and 50(c) are flowcharts showing, in detail, the document sheet ejection processing of the step #567 in the flowchart of FIG. 43.

First, the number of the state E is determined (step #681), and processing is performed corresponding to this number, from state E=0 to state E=10, as described hereinafter.

When state E=0, no other processing is performed, and processing returns to the main routine.

When state E=1, the jam timer JT3 is set and timing starts (step #682). The registration roller and document transport belt, ejection roller and reversing roller are switched ON to start driving operation, the state E=2 is set (steps #683 and #684), and processing returns to the main routine.

When state E=2, it is determined whether or not timing by the jam timer JT3 has ended (step #685). When timing has not ended, the state E=3 is set (step #686). When timing has ended, it means that a jam has occurred, so jam flag jam 3 which is a flag showing the jam position is set, the state E=10 is set (steps #687 and #688), and processing returns to the main routine.

When state E=3, the state of the registration sensor SE52 which detects the sheet, is determined (step #689). When this sensor is ON, the state E=4 is set, and when it is not ON, the state E =2 is set (steps #690 and #691) and processing returns to the main routine.

When state E=4, the jam timer JT4 is set, timing is started (step #692), the state E=5 is set (step #693), and processing returns to the main routine.

When state E=5, it is determined whether or not timing by the jam timer JT4 has ended (step #694). When timing has not ended, the state E=6 is set (step #695). When timing has ended, it means that a jam has occurred so jam flag jam 4 which is a flag showing the jam position is set, the state E=10 is set (steps #696 and #697), and processing returns to the main routine.

When state E=6, the state of the resist sensor SE52 which detects the sheet, is determined (step #698). When this sensor is OFF, the state E=7 is set. When it is not OFF, the state E=5 is set (steps #699 and #700) and processing returns to the main routine.

When state E=7, the timer T4 is set, timing is started (step #701), the state E=8 is set (step #702), and processing returns to the main routine.

When state E=8, it is determined whether or not timing by the timer T4 has ended (step #703). When timing has ended, the document transport belt, reversing roller and ejection roller are switched OFF to stop driving operation, the state E=9 is set (steps #704 and #705), and processing returns to the main routine. When timing has not ended in the determination of the step 703, processing immediately returns to the main routine.

When state E=9, the state of the sensor SE54 which detects the sheet, is determined (step #706). When this sensor is ON, state K=4, state E=0 are set (step #707). When it is not ON, the transport mode is reset to 0, the state E=1 is set (step #708) and processing returns to the main routine.

When E=10, it means that a jam has occurred so the document transport belt, reversing roller and ejection roller are switched OFF to stop driving the mechanism, 1 is added to the jam counter, the state E=0 is set (steps #709, #710, and #711), and processing returns to the main routine.

Figure 51:
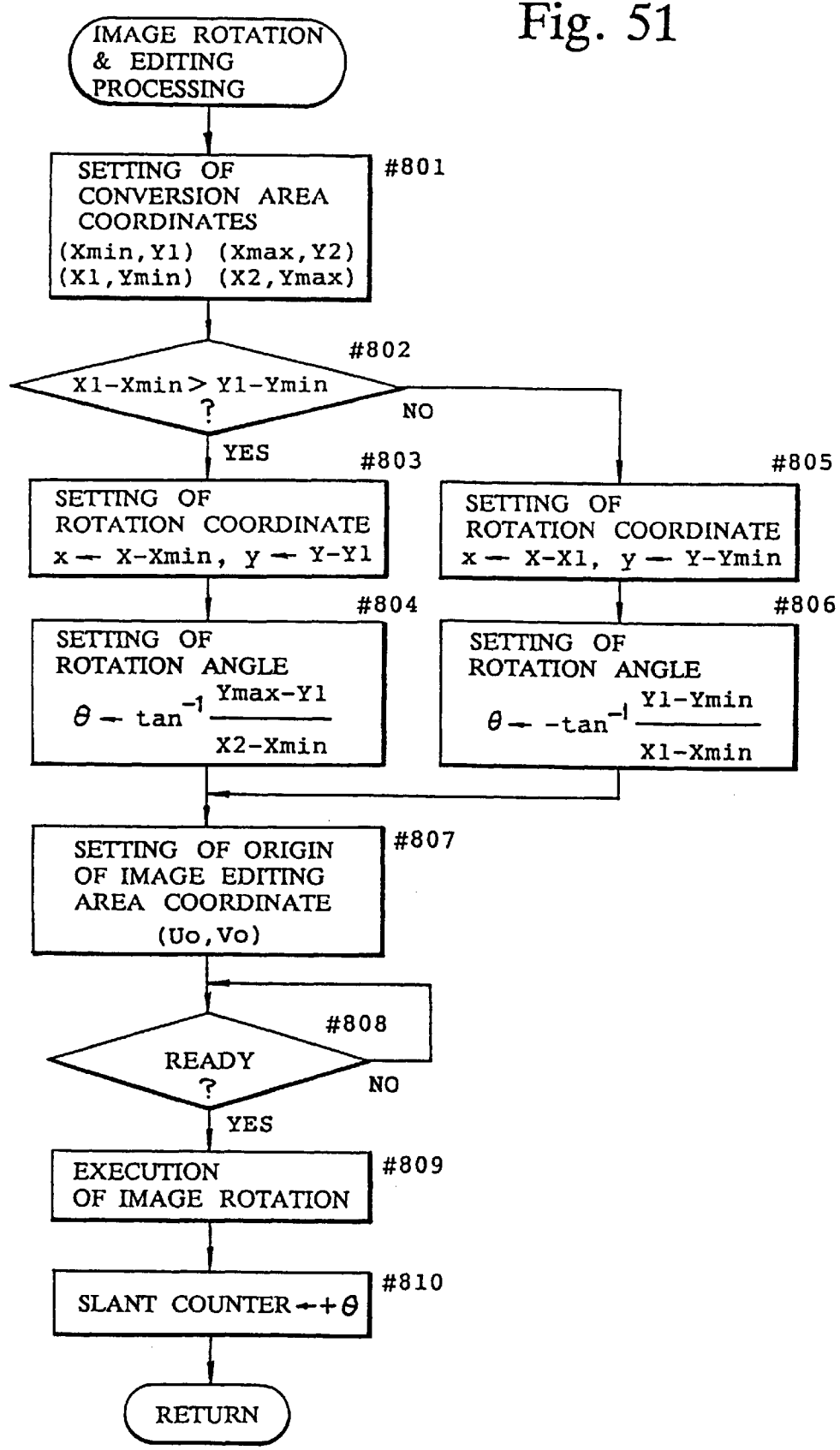
FIG. 51 is a flowchart showing details of an image rotation and editing process.

FIG. 51 is a flowchart showing, in detail, the image rotation and editing of the step #426 in the flowchart of FIG. 37. The processing performed in steps #801–#809 is the same as that of the first embodiment in the steps #201–#209 in the flowchart of FIG. 22, but a step #810 for adding an angle θ to the slant counter which counts the cumulative slant angle of the image is new. This flowchart may be easily understood by referring to the flowchart of FIG. 22.

Document size detection, image area address generation and image data output are the same as in the first embodiment, and therefore will be omitted here.

As described hereintofore, the document sheet is brought in contact with the document scale, its slant is corrected (correction by first correcting means), an image slant is computed from an image area address obtained by processing the read image signal, and image rotation and editing is performed to correct this slant (correction by second correcting means). However, when it is unnecessary to correct the image slant, neither the first correcting means nor the second correcting means need be selected so that this correction is not performed. In this way, by not correcting image slant, image processing time is reduced.

As described hereinabove, the image forming apparatus according to claim 1 of this invention comprises first slant correcting means which physically corrects an slant of a document sheet transported onto the document platform so as to correct an slant of the image to be recorded, and second slant correcting means which electrically processes the image signal obtained by scanning the document transported onto the platform so as to correct an slant of the image to be recorded. Control is performed so that either the first or second slant correcting means is selected based on the type of document sheet and sheet transport method, in order to correct the slant of the image formed on the recording paper.

In the case of an ordinary document sheet, the first slant correcting means is selected to correct the slant of the sheet, and thereby rapidly correct the slant of the image to be recorded. When thin paper is used or document sheets of different size or type are mixed, when double-sided documents are used, or in step feed when a plurality, e.g. two, document sheets are successively transported onto the document platform, the second slant correcting means is selected and the image signal is electrically processed to correct the slant of the image to be recorded. Hence, even when the document sheet is set on the document platform at a slant, the slant of the image to be recorded is corrected without fail, and a recording of high image quality is obtained.

In the image forming apparatus according to claim 11, the aforesaid first or second correcting means are selected based on the operating history of the device, e.g. the total number of sheets transported, the number of jams that occurred or the cumulative slant angle of the image.

Hence, the first slant correcting means is normally selected so as to obtain a recording by rapidly correcting the image slant. Further, when slant of sheets transported onto the document platform increases due to temporal changes as a result of long periods of use, when reliability of sheet transport declines due to increased frequency of jams or when maintenance becomes necessary, the second slant correcting means is then selected so as to correct the slant of the image without fail and obtain a recording of high image quality.

Finally, when it is unnecessary to correct the image slant, image processing speed may be increased by selecting neither the first nor the second slant correcting means.

What is claimed:

1. An image reading apparatus comprising:

image signal generating means for scanning a document image to generate an image signal, first slant correcting means for physically correcting a slant of a document sheet on a document platform, second slant correcting means for electrically processing an image signal obtained by scanning a document image so as to correct slant of said image, and control means for selecting either said first slant correcting means or said second slant correcting means, according to predetermined imaging conditions including the type of document sheet, so as to correct a slant of an image to be read and output a corrected image signal.

2. An image reading apparatus according to claim 1, wherein said first slant correcting means is a document scale disposed on a document platform, and one edge of a document sheet is brought in contact with said scale so as to correct a slant of said sheet.

3. An image reading apparatus according to claim 1, wherein said second slant correcting means determines a slant relative to an image area and a reference direction of said image area based on an image signal obtained by scanning a document image, and correcting a slant of said image area so as to output an image signal.

4. An image reading apparatus according to claim 1, wherein said control means selects either said first correcting means or said second correcting means based on information indicating the type of document sheet input from a control panel, corrects a slant of an image to be read, and outputs a corrected image signal.

5. An image reading apparatus according to claim 4, wherein the information indicating the type of document sheet input from said control panel is information relating to the paper type of the document sheet.

6. An image reading apparatus according to claim 4, wherein the information indicating the type of document sheet input from said control panel is information relating to the disposition of the recording surface of said sheet indicating whether the sheet is a single-sided document or a double-sided document.

7. An image reading apparatus according to claim 4, wherein the information indicating the type of document sheet input from said control panel is information indicating whether the size of the sheet is not standard.

8. An image reading apparatus according to claim 4, wherein the information indicating the type of document sheet input from said control panel is information relating to a method of transporting the sheet.

9. An image reading apparatus according to claim 4, wherein said control means selects said second slant correcting means when said information indicating the type of document sheet shows that the sheet is thin paper, that the size of the sheet is not standard or that a plurality of sheets are successively transported on a document platform said.

10. An image reading apparatus according to claim 1, wherein said control means is prohibited from selecting either said first slant correcting means or said second slant correcting means when it is unnecessary to correct a slant of said image.

11. An image reading apparatus comprising:

image signal generating means for scanning a document image to generate an image signal, first slant correcting means for physically correcting a slant of a document sheet on a document platform, second slant correcting means for electrically processing an image signal obtained by scanning a document image so as to correct a slant of said image, operating history calculating means for integrating information relating to the operation of said image reading means so as to generate an operating history, and control means for selecting either said first slant correcting means or said second slant correcting means based on information relating to said operating history so as to correct a slant of an image to be read and output a corrected image signal.

12. An image reading apparatus according to claim 11, wherein said operating history calculated by said operating history calculating means comprises the total number of documents processed.

13. An image reading apparatus according to claim 11, wherein said operating history calculated by said operating history calculating means comprises the number of times transported sheets have jammed.

14. An image reading apparatus according to claim 11, wherein said operating history calculated by said operating history calculating means comprises the cumulative value of the slant angle of detected document images.

15. An image forming apparatus comprising:

image signal generating means for scanning a document image to generate an image signal, image forming means for forming an image on a recording medium based on said image signal, document transport means for transporting a document sheet to a predetermined position on a document platform, slant correcting means for physically correcting a slant of said document sheet transported onto said document platform, and control means for determining whether said slant correcting means is effective according to predetermined imaging conditions so as to correct a slant of an image to be recorded and output a corrected image signal to said image forming means.

16. An image forming apparatus according to claim 15, wherein said slant correcting means is a document scale disposed at a predetermined position on said document platform, and one edge of a document sheet transported onto said platform is brought in contact with said scale so as to correct the slant of said sheet.

17. An image forming apparatus according to claim 15, wherein said control means selects said correcting means based on information indicating the type of document sheet input from a control panel, corrects a slant of an image to be recorded, and outputs a corrected image to said image forming means.

18. An image forming apparatus according to claim 17, wherein the information indicating the type of document sheet input from said control panel is information relating to the paper type of the document sheet.

19. An image forming apparatus according to claim 17, wherein the information indicating the type of document sheet input from said control panel is information relating to the disposition of the recording surface of said sheet indicating whether the sheet is a single-sided document or a double-sided document.

20. An image forming apparatus according to claim 17, wherein the information indicating the type of document sheet input from said control panel is information indicating whether the size of the sheet is not standard.

21. An image forming apparatus according to claim 17, wherein the information indicating the type of document sheet input from said control panel is information relating to the method of transporting the sheet onto said platform by said document transport means.

22. An image forming apparatus according to claim 17, wherein said control means selects said slant correcting means when said information indicating the type of document sheet indicates that the sheet is not thin paper, that the size of the sheet is standard, or that a plurality of sheets are not successively transported onto said platform by said document transport means.

23. An image forming apparatus comprising:
   image signal generating means for scanning a document image to generate an image signal,
   image forming means for forming an image on a recording medium based on said image signal,
   document transport means for transporting a document sheet to a predetermined position on a document platform,
   slant correcting means for electrically processing an image signal obtained by scanning a document image so as to correct a slant of said image, and
   control means for determining whether said slant correcting means is effective according to predetermined imaging conditions so as to correct a slant of an image to be recorded and output a corrected image signal to said image forming means.

24. An image forming apparatus according to claim 23, wherein said slant correcting means determines a slant relative to an image area and a reference direction of said image area based on an image signal obtained by scanning a document image, and correcting a slant of said image area so as to output an image signal.

25. An image forming apparatus according to claim 23, wherein said control means selects said correcting means based on information indicating the type of document sheet input from a control panel, corrects a slant of an image to be recorded, and outputs a corrected image to said image forming means.

26. An image forming apparatus according to claim 25, wherein the information indicating the type of document sheet input from said control panel is information relating to the paper type of the document sheet.

27. An image forming apparatus according to claim 25, wherein the information indicating the type of document sheet input from said control panel is information relating to the disposition of the recording surface of said sheet indicating whether the sheet is a single-sided document or a double-sided document.

28. An image forming apparatus according to claim 25, wherein the information indicating the type of document sheet input from said control panel is information indicating whether the size of the sheet is not standard.

29. An image forming apparatus according to claim 25, wherein the information indicating the type of document sheet input from said control panel is information relating to the method of transporting the sheet onto said platform by said document transport means.

30. An image forming apparatus according to claim 25, wherein said control means selects said slant correcting means when said information indicating the type of document sheet indicates that the sheet is thin paper, that the size of the sheet is not standard or that a plurality of sheets are successively transported onto said platform by said document transport means.

31. An image forming apparatus comprising:
   image signal generating means for scanning a document image to generate an image signal,
   image forming means for forming an image on a recording medium based on said image signal,
   document transport means for transporting a document sheet to a predetermined position on a document platform,
   slant correcting means for physically correcting a slant of said document sheet transported onto said document platform,
   operating history calculating means for integrating information relating to the operation of said image forming means so as to generate an operating history, and
   control means for determining whether said slant correcting means is effective, based on information relating to said operating history so as to correct a slant of an image to be recorded and output a corrected image signal to said image forming means.

32. An image forming apparatus according to claim 31, wherein said operating history calculated by said operating history calculating means comprises the total number of documents processed.

33. An image forming apparatus according to claim 31, wherein said operating history calculated by said operating history calculating means comprises the number of times transported sheets have jammed.

34. An image forming apparatus according to claim 31, wherein said operating history calculated by said operating history calculating means comprises the cumulative value of the slant angle of detected document images.

35. An image forming apparatus comprising:
   image signal generating means for scanning a document image to generate an image signal,
   image forming means for forming an image on a recording medium based on said image signal,
   document transport means for transporting a document sheet to a predetermined position on a document platform,
   slant correcting means for electrically processing an image signal obtained by scanning a document image so as to correct a slant of said image,
   operating history calculating means for integrating information relating to the operation of said image forming means so as to generate an operating history, and
   control means for determining whether said slant correcting means is effective, based on information relating to said operating history so as to correct the slant of an image to be recorded and output a corrected image signal to said image forming means.

36. An image forming apparatus according to claim 35, wherein said operating history calculated by said operating history calculating means comprises the total number of documents processed.

37. An image forming apparatus according to claim 35, wherein said operating history calculated by said operating history calculating means comprises the number of times transported sheets have jammed.

38. An image forming apparatus according to claim 35, wherein said operating history calculated by said operating history calculating means comprises the cumulative value of the slant angle of detected document images.

39. An image forming apparatus comprising:

image signal generating means for scanning a document image to generate an image signal, image forming means for forming an image on a recording medium based on said image signal, document transport means for transporting a document sheet to a predetermined position on a document platform, slant correcting means for correcting a slant of said image, and control means for determining whether said slant correcting means is effective according to predetermined imaging conditions so as to correct a slant of an image to be recorded and output a corrected image signal to said image forming means.

40. An image forming apparatus comprising:

image signal generating means for scanning a document image to generate an image signal, image forming means for forming an image on a recording medium based on said image signal, document transport means for transporting a document sheet to a predetermined position on a document platform, slant correcting means for correcting a slant of said document sheet transported onto said document platform, and operating history calculating means for integrating information relating to the operation of said image forming apparatus so as to generate an operating history, and control means for determining whether said slant correcting means is effective based on information relating to said operating history so as to correct a slant of an image to be recorded and output a corrected image signal to said image forming means.

41. An image reading apparatus comprising:

image signal generating means for scanning a document image to generate an image signal, slant correcting means for physically correcting a slant of a document sheet, and control means for determining whether said slant correcting means is effective according to predetermined imaging conditions so as to correct a slant of an image to be read and output a corrected image signal.

42. An image reading apparatus according to claim 41, wherein said slant correcting means is a document scale disposed on a document platform, and one edge of a document sheet transported onto said platform is brought in contact with said scale so as to correct the slant of said sheet.

43. An image reading apparatus according to claim 41, wherein said control means selects said slant correcting means based on information indicating the type of document sheet input from a control panel, corrects a slant of an image to be read, and outputs a corrected image signal.

44. An image reading apparatus according to claim 43, wherein the information indicating the type of document sheet input from said control panel is information relating to the paper type of the document sheet.

45. An image reading apparatus according to claim 43, wherein the information indicating the type of document sheet input from said control panel is information relating to the disposition of the recording surface of said sheet indicating whether the sheet is a single-sided document or a double-sided document.

46. An image reading apparatus according to claim 43, wherein the information indicating the type of document sheet input from said control panel is information indicating whether the size of the sheet is not standard.

47. An image reading apparatus according to claim 43, wherein the information indicating the type of document sheet input from said control panel is information relating to the method of transporting the sheet.

48. An image reading apparatus according to claim 43, wherein said control means selects said slant correcting means when said information indicating the type of document sheet indicates that the sheet is not thin paper, that the size of the sheet is standard, or that a plurality of sheets are not successively transported onto said platform by said document transport means.

49. An image reading apparatus comprising:

image signal generating means for scanning a document image to generate an image signal, slant correcting means for electrically processing an image signal obtained by scanning a document image so as to correct a slant of said image, and control means for determining whether said slant correcting means is effective according to predetermined imaging conditions so as to correct a slant of an image to be read and output a corrected image signal.

50. An image reading apparatus according to claim 49, wherein said slant correcting means determines a slant relative to an image area and a reference direction of said image area based on an image signal obtained by scanning a document image, and correcting a slant of said image area so as to output an image signal.

51. An image reading apparatus according to claim 49, wherein said control means selects said slant correcting means based on information indicating the type of document sheet input from a control panel, corrects a slant of an image to be read, and outputs a corrected image signal.

52. An image reading apparatus according to claim 51, wherein the information indicating the type of document sheet input from said control panel is information relating to the paper type of the document sheet.

53. An image reading apparatus according to claim 51, wherein the information indicating the type of document sheet input from said control panel is information relating to the disposition of the recording surface of said sheet indicating whether the sheet is a single-sided document or a double-sided document.

54. An image reading apparatus according to claim 51, wherein the information indicating the type of document sheet input from said control panel is information indicating whether the size of the sheet is not standard.

55. An image reading apparatus according to claim 51, wherein the information indicating the type of document sheet input from said control panel is information relating to a method of transporting the sheet.

56. An image reading apparatus according to claim 51, wherein said control means selects said slant correcting means when said information indicating the type of document sheet indicates that the sheet is thin paper, that the size of the sheet is not standard or that a plurality of sheets are successively transported on a document.

57. An image reading apparatus comprising:

image signal generating means for scanning a document image to generate an image signal, slant correcting means for physically correcting a slant of the document sheet transported onto a document platform, operating history calculating means for integrating information relating to the operation of said image reading means so as to generate an operating history, and control means for determining whether said slant correcting means is effective based on information relating to said operating history so as to correct a slant of an image to be read and output a corrected image signal.

58. An image reading apparatus according to claim 57, wherein said operating history calculated by said operating history calculating means comprises the total number of documents processed.

59. An image reading apparatus according to claim 57, wherein said operating history calculated by said operating history calculating means comprises the number of times transported sheets have jammed.

60. An image reading apparatus according to claim 57, wherein said operating history calculated by said operating history calculating means comprises the cumulative value of the slant angle of detected document images.

61. An image reading apparatus comprising:

image signal generating means for scanning a document image to generate an image signal, slant correcting means for electrically processing an image signal obtained by scanning a document image so as to correct a slant of said image, operating history calculating means for integrating information relating to the operation of said image reading means to generate an operating history, and control means for determining whether said slant correcting means is effective based on information relating to said operating history so as to correct a slant of an image to be read and output a corrected image signal.

62. An image reading apparatus according to claim 61, wherein said operating history calculated by said operating history calculating means comprises the total number of documents processed.

63. An image reading apparatus according to claim 61, wherein said operating history calculated by said operating history calculating means comprises the number of times transported sheets have jammed.

64. An image reading apparatus according to claim 61, wherein said operating history calculated by said operating history calculating means comprises the cumulative value of the slant angle of detected document images.

65. An image reading apparatus comprising:

image signal generating means for scanning a document image to generate an image signal, slant correcting means for correcting a slant of said image, operating history calculating means for integrating information relating to the operation of said image reading means to generate an operating history, and control means for determining whether said slant correcting means is effective based on information relating to said operating history so as to correct a slant of an image to be read and output a corrected image signal.

* * * * *